(12) United States Patent
Crampton et al.

(10) Patent No.: US 6,415,196 B1
(45) Date of Patent: Jul. 2, 2002

(54) MANUFACTURING SCHEDULING PROCESS WITH IMPROVED MODELING, SCHEDULING AND EDITING CAPABILITIES FOR SOLVING FINITE CAPACITY PLANNING PROBLEMS

(75) Inventors: Myrick D. Crampton, Greenwood Village; James L. Roadifer; Kevin J. Smith, both of Highlands Ranch; John K. Willoughby, Littleton, all of CO (US)

(73) Assignee: Manugistics, Inc., Rockville, MD (US)

( * ) Notice: Subject to any disclaimer, the term of this patent is extended or adjusted under 35 U.S.C. 154(b) by 0 days.

(21) Appl. No.: 09/143,545

(22) Filed: Aug. 28, 1998

Related U.S. Application Data

(60) Provisional application No. 60/056,243, filed on Aug. 28, 1997.

(51) Int. Cl.[7] .............................. G06F 19/00; G06F 9/00
(52) U.S. Cl. ...................... 700/100; 700/106; 709/104
(58) Field of Search .............................. 700/32, 96, 97, 700/99, 100, 103, 106; 705/8; 707/102, 2; 717/2, 8, 11; 709/104

(56) References Cited

U.S. PATENT DOCUMENTS

| | | | | |
|---|---|---|---|---|
| 5,231,567 A | * | 7/1993 | Matoba et al. | 700/100 |
| 5,233,533 A | * | 8/1993 | Edstrom et al. | 700/103 |
| 5,463,555 A | * | 10/1995 | Ward et al. | 700/96 |
| 5,546,576 A | * | 8/1996 | Cochrane et al. | 707/2 |

* cited by examiner

*Primary Examiner*—Leo Picard
*Assistant Examiner*—Sheela S. Rao
(74) *Attorney, Agent, or Firm*—Hogan & Hartson LLP

(57) ABSTRACT

A method for solving finite capacity problems such as how to satisfy a customer's request for a manufactured product, by describing the environment in which the problem exists in the form of a demand (e.g., customer order), including the available resources for satisfying the demand, defining the demand, selecting a plan for achieving the various objectives of the demand in an optimal order, and evaluating whether the plan will work. Also disclosed is a computer program product implementing the invention, and a system for coordinating multiple sources of input into a system implementing the disclosed invention.

19 Claims, 33 Drawing Sheets

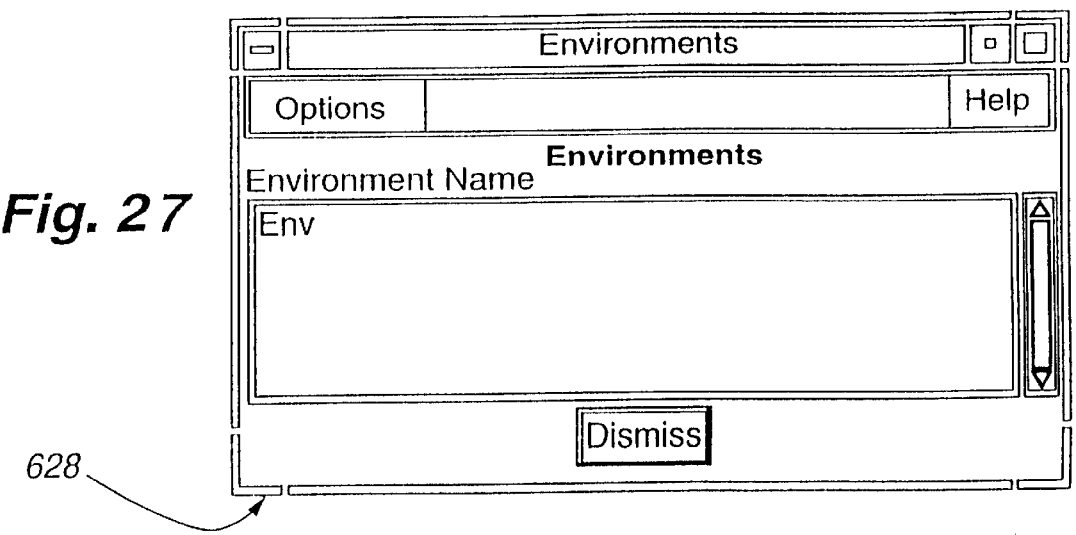
Fig. 27
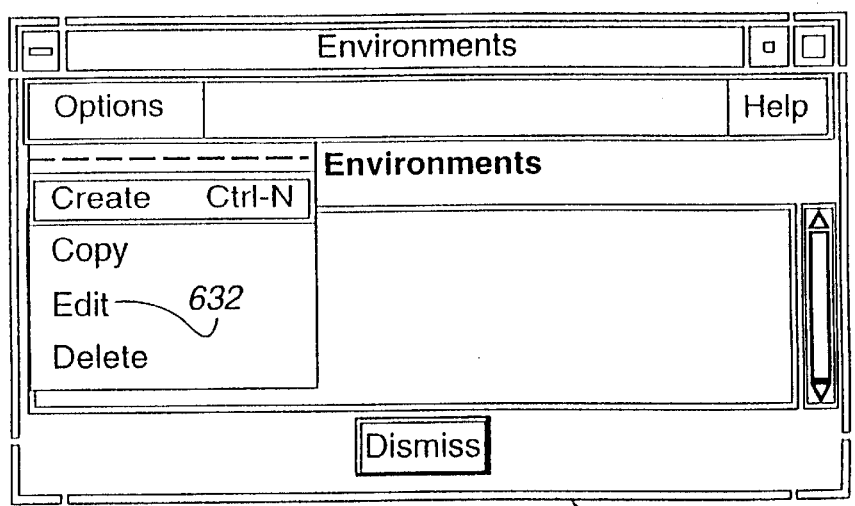
Fig. 28
Fig. 29
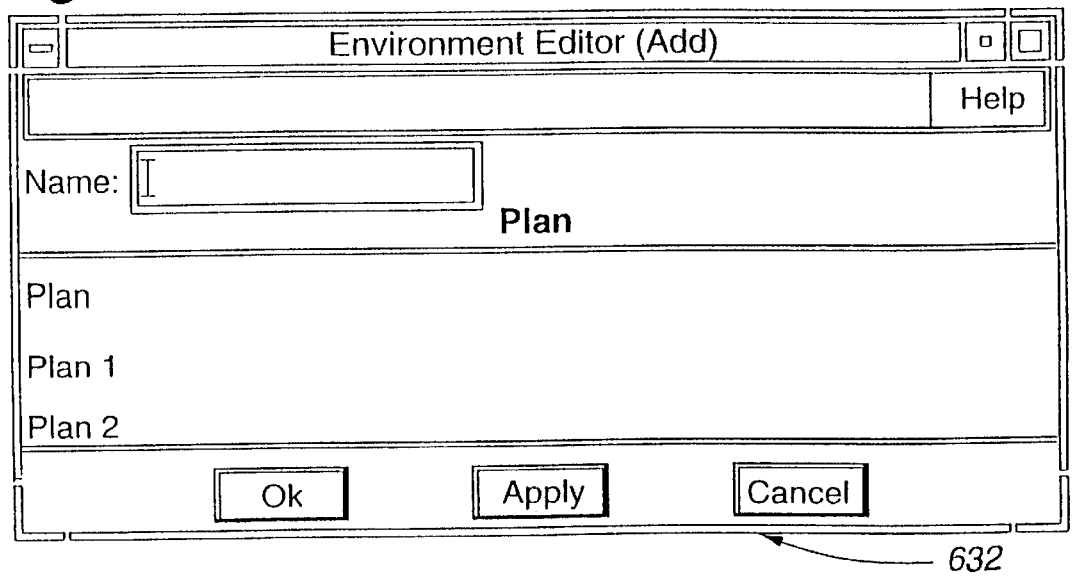

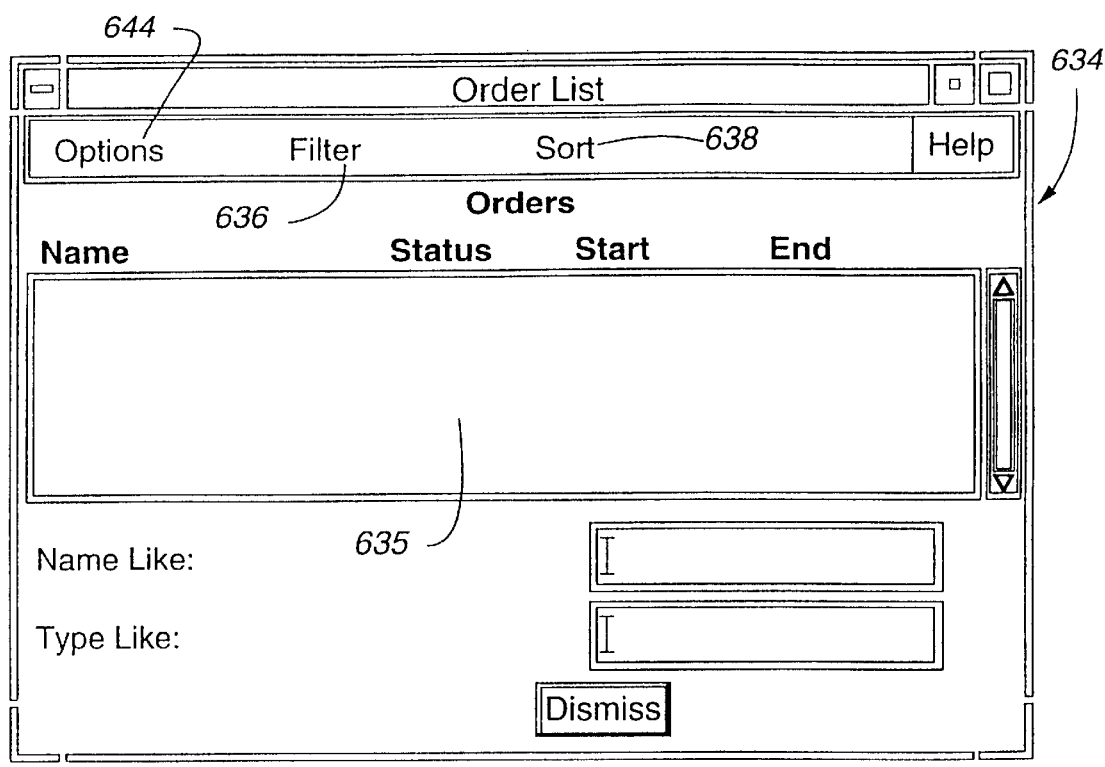
Fig. 30
Fig. 31
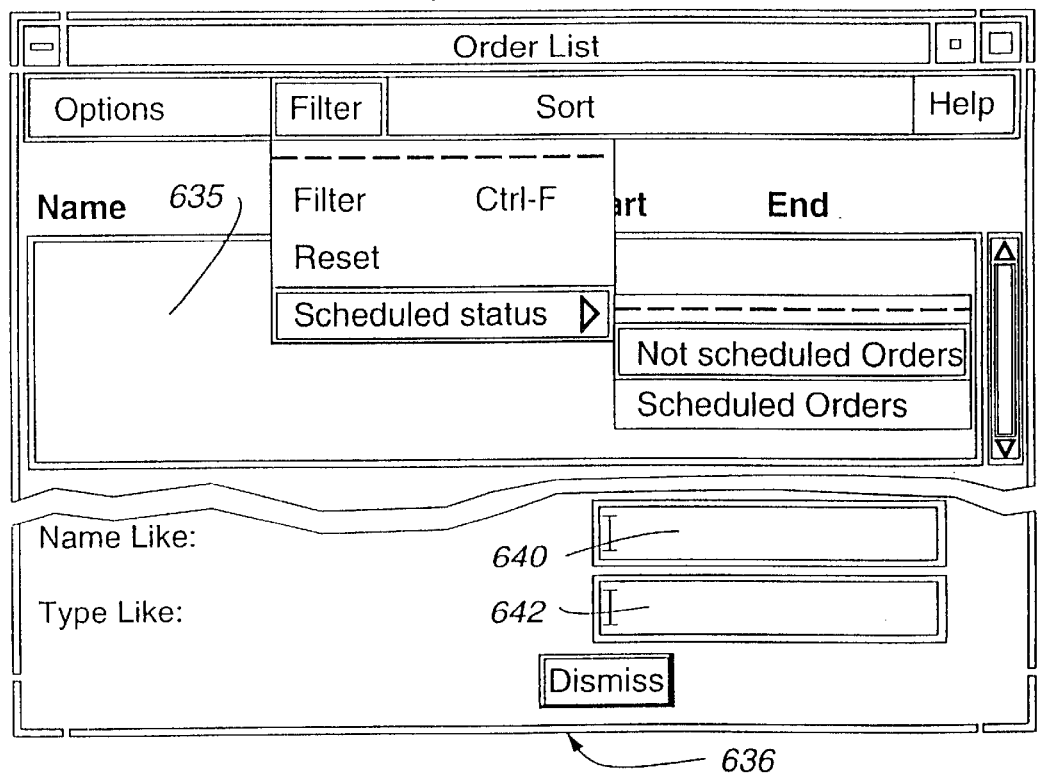

Metrics Editor

Plan Name: Plan

Start Time: 01/01/1995 00:00

End Time: 01/01/1996 00:00

Down Times: ◇ Include Downtimes  ◇ Ignore Downtimes

Hierarchy: ◇ Include Children  ◇ Ignore Children

Number of Activities 0    Scheduled 0    % 0

Number of Orders 0    Scheduled 0    % 0

Average Cycle Time (Days) 0    % on Time 0

Number of resources 0    Avg % Util 0

Number Pooled 0    Avg % Util 0

Number Reusable 0    Avg % Util 0

Number Individuall 0    Avg % Util 0    Cost ($) 0

[Dismiss]

| MCL | SMCL | DMCL | PMCL | IMCL | GMCL | AMCL | FMCL |
|-----|------|------|------|------|------|------|------|
| RCL | SRCL | DRCL | PRCL | IRCL | GRCL | ARCL | FRCL |
| BCL, DCL, TLCL, ICL |||||||||

*Fig. 54*

MANUFACTURING SCHEDULING PROCESS WITH IMPROVED MODELING, SCHEDULING AND EDITING CAPABILITIES FOR SOLVING FINITE CAPACITY PLANNING PROBLEMS

CROSS REFERENCE TO RELATED APPLICATION

This application is based on provisional application Serial No. 60/056,243, filed Aug. 28, 1997, and applicants claim the benefit of said filing date.

BACKGROUND OF THE INVENTION

1. Field of the Invention

This invention relates to the field of solutions to manufacturing-scheduling (MS) problems. More particularly, this invention relates to a new and improved MS process or program flow for solving finite capacity planning (FCP) problems in which the logic and data models used to derive the solution are generically applicable to a wide variety of different types of businesses, and as such, are highly flexible and adaptable to accommodate the individual circumstances associated with different businesses. Further still, the new and improved program flow of the present invention more effectively derives schedules or plans for solving MS problems by use of a more generic and expressive utilization of resources to execute a derived plan for solving the problem.

2. Description of Background Art

Scheduling the use of equipment and facilities to manufacture products has been a significant concern and problem in the field of manufacturing for almost as long as products have been manufactured. The best use of the facilities and equipment results in greater productivity and profit. The vast majority of MS problems have been resolved by humans without the aid of computing tools, particularly in businesses where the maximum use of the manufacturing equipment and facilities has not been essential to the success of the business.

The increasing size of businesses in general, coupled with increased competitive pressure, have magnified the difficulties of MS problems to the point where efficient human resolution of the issues posed has become impossible or at best inefficient. Consequently, MS software tools and processes have been developed to address these issues.

In general, however, existing MS software tools and processes are extremely complex to use and understand, and, in general, do not adapt conveniently to a variety of different businesses in an efficient way to address the particular issues associated with the individual business. Undoubtedly, the limited adaptability of prior MS software processes is simply further confirmation of the complexity of the MS problem. From a generic standpoint, the complexity of the MS problem results from the interaction of a relatively large number of factors necessary to create an adequate solution to the MS problem. The complexity of the MS software development process to accommodate the magnitude of issues involved, and the complexity of MS modeling of the business which is emulated by the software, have not permitted previous MS software processes to be as successful as expected. As a consequence, most prior MS software has required the business characteristics to fit a relatively fixed model, rather than to allow the individual business characteristics to form the model.

After a functional MS model has been developed, the developer is extremely reluctant to change that model in any significant manner. It is difficult and time-consuming to derive a new MS model or to make changes in a previous model. The complexity of a MS program is considerable, typically requiring tens or hundreds of thousands lines of software code. Writing an extensive amount of software code creates opportunities for numerous errors, thereby requiring extensive trial and error use to eliminate the unforeseen errors which are revealed from use. Therefore, writing additional code is not a desirable approach to solving individual MS problems.

This complexity exists despite the fact that many of the basic concepts involved in the MS model itself seem almost intuitive. Concepts which may appear intuitive in MS situations are usually accomplished in MS software only with considerable difficulty, effort and creativity.

Under the constraints of inflexible modeling, the individual characteristics of the business being modeled are made to fit the pre-existing MS model. Forcing the business to fit the model usually results in a less than satisfactory MS solution. Since the individual differences and aspects of a business can not be completely accommodated by the single, relatively-inflexible model, the resulting solutions are usually not complete. Users must still apply logic and intuition based on experience to further refine and apply solutions derived from the previous MS software processes. Furthermore, the human adjustment to the software-derived schedule or plan has made it difficult to track the use and application of the equipment and resources, and has made it very difficult to interrelate numerous schedules for manufacturing different products. Most sizable manufacturing businesses employ numerous schedules to maximize the effective use of their equipment and facilities. A partial solution obtained from a less effective MS software program does not adequately address the complete problems of a business, and may complicate an already highly complex problem.

Despite the difficulties encountered in solving MS problems with software, basic software concepts have evolved over the last three to four decades. The original MS processes were referred to as materials requirements planning (MRP). MRP is generally regarded as inadequate to meet current problems, primarily because MRP focused solely on the procedures for manufacturing a product, referred to as "routes," and the timing associated with completion of the product.

The problem with MRP is that it assumed an infinite capacity for each of the resources (e.g., work stations, tools or people) available for use in the machining, assembly and production of the product. To manufacture a product there is a bill of materials which describes all of the components. MRP is good at exploding the bill of materials and working backwards from the completion date to schedule the production and acquisition of the materials on the bill to complete the project at the desired time. The problem is that MRP assumes an infinite capacity of resources. The assumption is not realistic. There are finite restrictions on resources in the real situation. The present invention solves these problems because it takes into consideration the practical and finite limits on capacity to produce. This finite capacity is what needs to be taken into consideration.

In more general terms, MRP ignores the operational constraints which limit how you can execute the manufacturing process. Capacity is just one subset of the constraints. There are other constraints such as sequencing relationships among operations and natural and man-made phenomenon which limit those operations. MRP provides the recipe and how much is needed, but it does not yield a plan that could be effectively executed in view of the operational constraints. The bill of materials and master schedule created by MRP cannot be followed because they ignore the operational constraints associated with executing the manufacturing process.

MRP results in an unrealistic schedule or plan. MRP does not take into consideration the limits of the dynamic process, which can become operational constraints in the process. The reality is a very dynamic process of determining what is needed, when it is needed, the operations required to assemble it, the relationship between those operations, and the things which may alter the relationships by interacting with the elements.

MRP is generally acknowledged as doing a good job of calculating, but not providing decision support, responding to changes in the environment, or providing qualitative information. MRP is a big calculator that tells one how much is needed and when it is needed, but it ignores the execution of the manufacturing process and the operational constraints thereof.

A problem with prior art is that in the past the demand on the system came from the manufacturer. The manufacturer itself decided what it wanted to make and long production runs of the same thing were favored (not many changes in the product). Due to worldwide competition in manufacturing, long production runs are less prevalent and smaller, more quickly changing runs are becoming more prevalent. Current trends in manufacturing indicate that cycle times between customer specification and delivery is compressing. Unfortunately, MRP cannot accept customer demands.

The next generation of evolution in MS processes, which emerged approximately one decade ago, has generally been referred to as manufacturing resources planning (MRP II). The name change from materials requirement planning (MRP) to materials resources planning (MRP II) indicates that MRP II involves consideration of some of the constraints applicable to manufacturing, such as the available resources. However, MRP II failed to consider capacity issues associated with the manufacturing process as well as other constraints on the business. Capacity issues are simply limitations on the available resources. To address the deficiency relating to capacity, current MS software is referred to as finite capacity planning (FCP) software, sometimes also alternatively referred to as finite capacity scheduling. By considering the finite limitations of capacity that might be encountered, a more realistic and usable solution to MS problems results from the use of FCP.

SUMMARY OF THE INVENTION

The present invention addresses the essence of what is required to produce N units of a company's products, and do that in the most efficient, optimal manner. The approach is unique in that it has a few key concepts which are unique and which do a very good job of capturing the essence of the process. The efficiency of the manufacturing process determines the success of the company. How well they evaluate all of the alternatives is a key component of the process.

The present invention will scale—in other words, will solve—big problems, offer high quality, achieve high reuse, and will use proven concepts as well as new concepts.

One of the important aspects of the present invention is an FCP process which is generic and sufficiently encompassing to incorporate the unique considerations associated with many different businesses into a single MS solution which is effective for all of those businesses. The broader, more encompassing aspects of the present invention are achieved by accommodating four foundational components in a FCP process. Those components describe the environment, define the demand, schedule the demand and evaluate the plan. Consideration of the environment, demand, schedule and plan offers the generic ability to deal with all of the important and individual aspects associated with almost any type of business. As a consequence, the solution to the MS problem available from the present invention is more useful and adaptable than known, previous MS processes.

Every FCP problem domain breaks down into a few key pieces. Product demand, meaning someone wants what is made. Resources to make the products, such as machines, people and materials. Operations are the events or activities. The operations use the resources to satisfy the demands. Constraints limit or govern how the resources can be deployed and when the activities can be performed. Sometimes constraints are very closely related to resources. For example, a machine can create 10 products per day. Resources are the nouns, activities are the performance words or verbs, constraints are the reality which control or govern or limit how the activities can be executed and how the resources can be deployed. These are combined in a manner which meets demand.

Resources must be used, activities need to be performed and constraints must be considered. To a large extent MRP and MRP II ignore a large subset of all three of these considerations. The present invention is a very flexible framework for representing these considerations which matches reality very well.

The way to decompose a problem is into resources, activities and constraints. The primary driver for mobilizing resources and activities is demand, normally a customer order. Demand can be broken down further, such as independent demand and dependent demand, but it is essentially demand.

One aspect of the present invention can be used to create new software decision support system solutions that include a model of the resources, activities, constraints and demands.

Resources and activities are driven by the demand. Activities are related to the knowledge of the operations necessary to manufacture the product. The term "mass balance" is used to evaluate the material being input and output at a particular step in the process/model. Normally the constraints limit the deployment of the resources and the execution of the activities. The typical sequence which drives the process would be requested, and the demand allows understanding of what activities are required to meet demand, allowing the derivation of the resources used to meet the demand, and the constraints limit the deployment of the resources and the execution of the activities.

The generic applicability of the present invention to a variety of diverse businesses is further enhanced by the more specific consideration of the environment and the plan in the FCP process. The resources which form part of the environment are modeled by type, units, constraint enforcement, bucketless divisions or intervals, consumables, reusables, state through time information, rate information and changeover information. The plan may ultimately be selected from one of multiple different alternative plans, each of which is based on hypothetical changes incorporated in the environment, demand or schedule by the user.

The present invention may be customized for a particular solution. One of the advantages is that the customizing capability avoids the difficulty of creating a particular tool for a particular solution. Since the existing tool can be modified, approximately 90 percent of the time required to achieve a solution is saved since the original tool can be used with only about 10 percent customization. Consequently, the time needed to achieve a solution is significantly shortened. Because the tool exists, the addition of modifications to it will result in a very high quality base tool, since the whole tool need not be created. Starting with very high quality components and making small modifications to them will result with a very high quality product.

Another important aspect of the present invention relates to the scheduling model. The scheduling model employed in the present invention incorporates a resource utilization structure, which is flexible and encompassing enough to accommodate virtually any type of business. The utilization structure involves the considerations of objectives, sequences, operations, steps, relationships and requirements. The objective is the end result which is obtained by sequences of operations. Each operation includes a series of steps, and each step may be subject to certain requirements and relationships. Not only will almost any problem of scheduling resources be adequately represented by this utilization structure, the structure itself provides information which is effectively used for evaluating the environment, demand and plan.

Another important aspect of the present invention relates to the ability of the user to practice the MS FCP process in different ways. To accommodate a single effective solution and to create multiple different plans, the FCP software process of the present invention offers the capability to edit and view information previously entered, to readily enter new information, and to readily develop multiple plans. The ability to adequately change the information upon which the process is dependent allows alternative planning and closer conformance of the MS solution to the actual performance of the business.

In accordance with this aspect of the present invention, a graphical user interface is employed. The graphical user interface includes a series of display screens by which to enter and display information. The display screens provide opportunities for the user to access virtually all levels of information contained within the system and to change that information to accommodate new and different situations, as well as to accommodate alternative planning derived by changing environment, demand and/or scheduling information.

A preferred embodiment includes an internal order editor to allow a customer order to be restructured for internal purposes. The preferred embodiment is used to create a model of the order and an algorithm that controls the scheduling of the order, and it observes the preferences. A user interface is used to illustrate the scheduling and details associated with the performance of the order such as the amount of the order completed, and the amount of the resources used to perform the activities. The preferred embodiment allows the manufacturer to implement the correct solution for the problem. The preferred embodiment also has the capability of interfacing with relational data bases.

Another important aspect of the present invention relates to its ability to reliably and generically accommodate different MS solutions executed by FCP software. This aspect of the present invention avoids the necessity of writing substantial amounts of software code for providing adequate MS solutions to a wide variety of businesses. This aspect of the present invention also assures a high quality software product which inherently carries a lesser possibility of unforeseen errors.

In accordance with this aspect, the FCP software solutions available from the present invention are derived from and based on an object-oriented framework. The framework includes class libraries of limited software routines which are linked in a hierarchial manner to make the derivation of individual solutions generic and relatively error-free.

A further significant aspect of the present invention relates to the ability of the FCP process to continually update the information concerning the environment, demand, schedule and plan and provide that information on a rapid basis to other users of the system. In multiple user circumstances, the act of scheduling a plan will affect the capabilities of the business to accommodate other aspects of demand. Without accommodating the changed circumstances, subsequent and other plans can not be effectively confirmed or scheduled.

In accordance with this aspect, the present invention achieves inter-process communication (IPC) among all of the users to continually and dynamically update the status of the environment, demand and schedule, based on current use and the scheduling of plans by other users.

A more complete appreciation of the aspects of the present invention and its scope may be obtained from the accompanying drawings, which are briefly summarized below, from the following detailed description of a presently preferred embodiment of the invention, and from the appended claims. The headings employed in the detailed description are for convenience and organization, and the subject matter of each heading is not to be considered apart of the whole of the detailed description.

BRIEF DESCRIPTION OF THE DRAWINGS

FIGS. 13–53 are complete and partial views of display screens presented on a display shown in FIG. 12, illustrating features available of a graphical user interface of the present invention; and FIG. 54 is an illustration of a software framework of class libraries organized to create manufacturing scheduling software to solve finite capacity scheduling problems according to the flow diagrams shown in FIGS. 1–11.

DETAILED DESCRIPTION OF THE PREFERRED EMBODIMENTS

Figure 1:
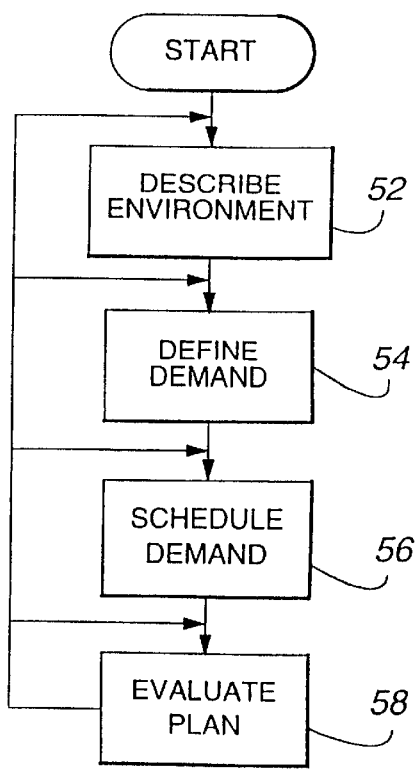
FIG. 1 is a flow diagram illustrating the generic steps involved at a highest level of a FCP process according to the present invention.

The description is divided into the following subjects:
1. Introduction
2. Glossary
3. Acronyms
4. General Program Flow—FIG. 1
    4a. Describe Environment—FIG. 2
    4b. Define Demand—FIG. 3
    4c. Schedule Demand—FIG. 4
    4d. Evaluate Plan—FIG. 5
    4e. Schedule Orders or Schedule Demand—FIGS. 6A and 6B
    4f. Create Activity Lists for Sequences—FIG. 7
    4g. Create Opportunities for Line Items—FIG. 8
    4h. Select Opportunities—FIG. 9
    4i. Schedule Activities—FIG. 10
    4j. Create Opportunities for Activities—FIG. 11
5. Computer System
6. Graphical User Interface
    6a. Main Screen—FIG. 13
    6b. Options—FIG. 14
        6b.1. Scheduling Parameters—FIG. 22
        6b.2. Plans—FIGS. 23–26
        6b.3. Environments—FIGS. 27–29
        6b.4. Demands
    6c.6c.1. Orders—FIG. 15
        6c.2. Filter and Sort—FIGS. 31–32
        6c.3. Options—FIG. 33
            6c.3.1. Order Editor—FIGS. 34–36
            6c.3.2. Order Timeline
            6c.3.3. Order Associations—FIGS. 37–38
    6d. Resources—FIG. 16
        6d.1. Resource List
        6d.2. Filter and Sort
        6d.3. Options—FIG. 39
            6d.3.1. Resource Editor—FIG. 40
            6d.3.2. Resource Timeline
            6d.3.3. Resource Profile
            6d.3.4. Resource Downtime Editor—FIG. 42
            6d.3.5. Resource Profile Editor—FIG. 43
            6d.3.6. Metrics Editor—FIG. 44
    6e. Customers—FIG. 17
        6e.1. Customer List
        6e.2. Filter and Sort
        6e.3. Options
    6f. Utilization Structure—FIG. 18
        6f.1. Objectives
            6f.1.1. Lists, Filter and Sort, and Options
            6f.1.2. Objective Editor—FIG. 45
        6f.2. Sequences
        6f.3. Operations
            6f.3.1. Operation Editor—FIG. 46
        6f.4. Steps
    6g. Actuals—FIG. 19
        6g.1. Activity Actual Editor—FIGS. 47–48
        6g.2. Resource Actual Editor
    6h. Activities—FIG. 20
        6h.1. Activity Editor—FIGS. 49–50
        6h.2. Activity Relationships—FIG. 51
            6h.2.1. Relationship Editor—FIG. 52
        6h.3. Activity Requirements
            6h.3.1. Requirements Editor—FIG. 53
7. Information Communication Capability
    7a. Inter-Process Communications
    7b. Relational Database Schemas
8. Software Framework Each subject is described in a correspondingly numbered Part of the detailed description below.

1. Introduction

In its most basic and general terms, the present invention relates to a method which may be implemented as software instructions or code executed on a conventional general purpose computer system, to solve finite capacity planning (FCP) or finite capacity scheduling problems. The software instructions of a preferred embodiment of the present invention are developed by collecting information relevant to the particular business, entering the collected information in an expressive and flexible code structure developed from an object oriented framework to accommodate processing and presenting the information, processing the information, deriving one or more manufacturing-scheduling (MS) plans for solving the FCP problem, and evaluating the plans or schedules to select the desired plan.

The following description of the invention makes reference to various terms many of which are broadly defined in the Glossary of Part 2 below. Many terms employed in the present description are abbreviated into acronyms, and a List of Acronyms appears in Part 3 below.

The details associated with the software process flow of the present invention are described more completely in Part 4. Part 5 generally illustrates a computer system upon which the software of a preferred embodiment of the present invention may be executed. Part 6 describes features of a graphical user interface which is a part of the software of a preferred embodiment of the present invention, and which is useful in performing the steps of the FCP process of the present invention.

The description contained in Part 6 is also useful in more completely understanding the aspects of the software process described in Part 4. Part 7 describes communication features available from the present invention which are useful in communicating updated information to all users of the system on an almost instantaneous basis. Part 8 describes the framework which is used to derive and establish the software code of the present invention.

2. Glossary

Activity. One of the components of demand. The essential equivalent of a step in the utilization model. The lowest level active step or function involved in the production of an object. Each activity has requirements and relationships associated with it.

Activity List. A sequence of schedulable functions or steps, each of which represents a meaningful event.

Actuals. A measure of the actual productivity resulting from use of the utilization structure. Actuals refers to quantities produced or consumed. Actuals are typically derived on a real time basis, and the information represented by actuals is used to continually update the capabilities of the system and develop information which indicates whether the scheduled plan remains feasible or is driven infeasible.

Allocation. An assignment of a resource to an activity.

Assignment. An association of a resource and an activity.

Bucketless. A description typically applied to time or resources which refers to the absence of any artificial intervals or quantities. A bucket represents a finite quantity or interval.

Changeover. A requirement which involves reconfiguration of a resource to change its capabilities or its nature, thereby allowing a new use or a reuse of that resource itself in a plan.

Constraint enforcement. The application of business rules to satisfy demand.

Consumable. A resource which is used up. Replenishment of a consumable resource restores its state.

Demand. One of the basic component descriptors of the business. The demand describes the orders for products or sub-products of the business. The demand may be external, in the sense of customer orders, or it may be internal, in the sense of work in progress. The demand may be customer driven or independent of specific customer orders. Downtime. A time when operations of a business do not normally occur, such as a weekend. Downtime may also relate to the unavailability of a resource, such as when a machine is not useable due to maintenance.

End slot. A time at which an activity or request could end.

Enumerative. A description of an attempt to schedule in all possible locations available in a plan, to allow consideration of each attempt before the final schedule for the plan is selected.

Environment. One of the basic component descriptors of the business. The environment describes the capabilities and limitations of the business to produce objectives. The environment describes the resources of the business. The environment generally includes all of the information necessary to formulate a plan for producing the objectives. Rate models and changeover models are examples of components of the environment.

Horizon. The time interval in which scheduling may occur.

Independent Demand. A demand which originates outside manufacturing business and typically is manifested as customer orders. A set of Independent Orders.

Independent Order. An order which originates outside the manufacturing business and is typically represented by a customer order.

Just in time (JIT). A manufacturing process in which the objective is completed at the last possible time. JIT minimizes inventory.

Line Item. A component or one objective of an order. Every line item has a quantity, and possibly an acceptable quantity which is less than the desired quantity.

List. A collection of items used in the process flow of the present invention.

Model. A representation of a basic component descriptor of the business, or of an aspect of the business.

Objective. The goal or end result, or even an immediate result, of a sequence of operations. The objective may be the output item or product of the business, or a sub-component of the product.

Order. A specific example of demand. A designator or container for all line items. An order is complete when all of the line items contained in it have been completed.

Operation. A schedulable event accomplished by the performance of one or more steps. A component of a sequence.

Opportunity. A time when an activity can be accomplished and scheduled on a resource for a plan.

Plan. One of the basic component descriptors of the business. A plan is a series of events necessary to produce the objective. A plan is a schedule of how the resources are going to be tasked to meet the objective. It represents the application of the resources to meet demand. A plan involves one or more operations which are assigned specific start times, end times and resources.

Recursive. A characteristic of defining or expressing a process or part of a process in terms of itself.

Recursive Objective. An objective captured as a part of another objective.

Relationship. A defined dependence between activities and requests.

Requirement. A characteristic associated with a step that describes the before and after relationships necessary to accomplish that step. A requirement may be temporal or logical.

Resource Request. A request for a resource as part of the manufacturing process.

Resource. A person, place or thing of the business which has a state through time, which is typically made or used by an operation.

Schedule. The assignment of one or more start times and end times to operations.

Sequence. A logically related group or combination operations necessary for accomplishing an objective. More than one sequence may exist to produce the objective. An activity list forms the sequence.

Start slot. A time at which an activity or request could start.

Step. An individual or singular activity performed as a part of accomplishing the objective. A component of an operation.

Utilization. One of the basic component descriptors of the business. A description for producing the objectives.

Utilization structure. The interaction of objectives, sequences, operations, steps and requirements and relationships (the latter two being at the same level) for the purpose of responding to and satisfying demand. The hierarchical model for the utilization structure is as follows:

Objectives
      Sequences
        Operations
          Steps
            Requirements and Relationships Window. An opportunity for accommodating a slot during which a requirement can be accomplished.

Work in process. An intermediate and incomplete state of an objective which may be transitory during the production of the objective.

3. List of Acronyms

The acronyms in the following list are described at various locations herein. The meaning of the terms referenced by these acronyms is more completely understood from the complete description.

AMCL means application manufacturing class library.

ARCL means application resource class library.

CL means class library.

BCL means base class library.

DCL means display class library.

DMCL means display manufacturing class library.

DRCL means display resource class library.

FCP means finite capacity planning, which is alternatively referred to as finite capacity scheduling.

FMCL means file manufacturing class library.

FRCL means file resource class library.

GMCL means generic manufacturing class library.

GRCL means generic resource class library.

GUI means graphical user interface.

ICL means inter-process communications class library.

IMCL means inter-process communication manufacturing class library.

IRCL means inter-process communications resource class library.

IPC means inter-process communications.

JIT means just in time.

MCL means manufacturing class library.

MS means manufacturing-scheduling.

MRP means materials requirements planning.

MRP II means manufacturing resources planning.

PMCL means persistence manufacturing class library.

PRCL means persistence resource class library.

RCL means resource class library.

SMCL means schedule manufacturing class library.

SRCL means scheduling resource class library.

TLCL means time line class library.

4. General Program Flow—FIG. 1

A process or program flow for solving finite capacity planning (FCP) problems according to the present invention is shown at 50 in FIG. 1 in its most generic and high-level state.

The process flow 50 involves four generic steps which are applicable to any type of business. Those steps describe the environment, define the demand, schedule the demand and evaluate the plan, shown at steps 52, 54, 56 and 58, respectively.

In general, the step 52 of describing the environment involves identifying and characterizing the capabilities and limitations of the business, including the resources of the business, in terms which are relevant to the solution of the FCP problem. Depending upon the characteristics of the particular business, more than one environment may exist for solving the FCP problem. For example, the business may have more than one assembly line for producing a product, and the capabilities and limitations of the different assembly lines are different. The information associated with describing the environment may be better appreciated from the description associated with FIGS. 27–29 described in Part 6.

The step 54 of defining the demand involves characterizing the requests for performance of the business. Generally the demand is considered to be the orders for products of the business. The orders are usually related to objectives, although some requests for performance of the business may not follow the traditional pattern of an order. An order may contain a single line item, or it may comprise multiple line items. The requests are determined from line item objectives in a utilization structure. The process flow 50 of the present invention allows each line item to be dealt with independently of the total number of line items in an order, and allows orders to be dealt with independently of other orders. The features of the step of defining the demand are also described in conjunction with FIGS. 1, 3, 4 and 27–29 appearing in Part 6.

The step 56 of scheduling the demand involves establishing a plan for using and scheduling the environment to meet the demand. The plan addresses all of the constraints applicable to the business and attempts to best satisfy the demand. The complexity involved in establishing a workable and effective plan has resulted in the development of a highly effective utilization structure. The utilization structure breaks down each activity into an encompassing and expressive list of considerations. Employing the utilization structure results in a complete consideration of all of the relevant FCP issues.

Many of the more detailed steps involved in accomplishing the generic step 54 of defining the demand are illustrated and explained in conjunction with FIGS. 6–11. A greater appreciation of the capabilities associated with those steps is presented throughout Part 6.

The process flow 50 will establish more than one plan or schedule, if possible to do so. Similarly, if it is not possible to arrive at a suitable plan, the reasons for the inability to arrive at a suitable plan are made available to the user. The step 58 allows the user the opportunity to evaluate the plan or the multiple plans which have been presented, and to attempt to make adjustments that will result in the derivation of a satisfactory plan when the derivation of a satisfactory plan was not previously possible. The user evaluates the plan by use of an editor, which allows the user to view the components of the plan or the reasons for the inability to derive the plan. Thereafter the user makes adjustments in the environment, demand and/or plan to allow the plan to be scheduled or to improve the scheduling previously derived for the plan. For example, the inability to derive a plan may result from the insufficiency of certain resources. By evaluating the plan at step 58, the user will recognize the necessity to obtain the additional resources.

As another example, an order may be scheduled only if certain line items in the order are rejected, which the user can do at step 58. As a third example, the user may adjust the schedule of plans established for other customers, thereby freeing the availability of the resources at a critical time to allow the plan in question to be scheduled.

To make adjustments or revisions, the process flow from step 58 may revert back to the commencement of any one of the steps 52, 54, or 56, as shown in FIG. 1. Once the adjustments or revisions have been made, a new plan may be derived, or a new attempt at a plan may be made. For these reasons, each step 52, 54 and 56 in the program flow may be reconsidered or redefined throughout the process. In addition, step 58 also allows the user to view and understand the components of the plan, even though changes to the plan are not made. Allowing reconsideration or redefinition of the plan at step 58 obtains the dynamic flexibility to adjust the solution to the problem. This flexibility results primarily because of the generic capability of the process flow to capture information and deal effectively with that information.

In general, the FCP process flow of describing the environment, defining the demand, scheduling the demand and evaluating the plan, is an important basic model for addressing and effectively resolving substantially all FCP problems in substantially all types of businesses. The generic nature of the model accommodates virtually all types of information that may be important to a particular business, without requiring the business to adapt its information to a fixed, inflexible program flow which is not capable of creating a complete solution to the FCP problem. The steps 54 and 56 of defining and scheduling the demand are particularly important because most previous MS processes do not adequately consider the demand. Indeed, many MS processes do not even consider the demand at all.

More details concerning the general FCP program flow or process are described below in sub-sections 4a–4j of Part 4.

4a. Describe Environment—FIG. 2

Figure 2:
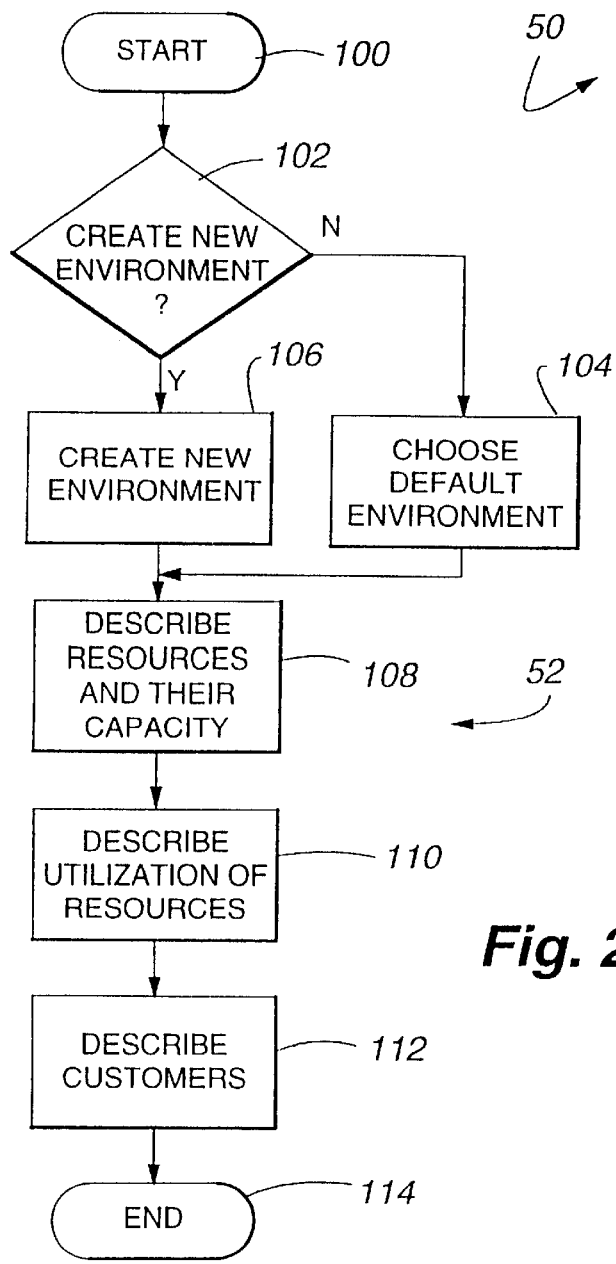
FIG. 2 is a flow diagram of steps involved in performing the more generic step of "Describe Environment" shown in FIG. 1.

The preferred activities which constitute the step 52 of describing the environment are presented in greater detail in FIG. 2. The program flow involved in describing the environment at 52 begins at 100 and moves to step 102 where it is determined whether a new environment is to be created or not. Creating an environment refers to the process of adding new or additional information which describes the environment in terms which are recognized and capable of use. If a new environment is not created, the program flow proceeds to step 104 where a pre-existing default environment is chosen. If a new environment is created, the program flow proceeds to step 106 where the necessary templates and other information necessary to describe the environment are presented to the user. The discussion appearing below in conjunction with FIGS. 27–29 describes in greater detail the information which is required to be supplied to create the environment.

The step 108 involves adding information which describes each of the resources in the environment and the capacity of each resource. The discussion appearing below in conjunction with the display screens shown in FIGS. 13, 16, 30–33, 39–44 presents a preferred approach to the process of describing the resources and their capacity.

The step 110 involves describing the utilization of the resources. The step 110 employs the utilization structure to generically describe the use of substantially all of the resources and the limitations associated with their use. A more detailed description of the utilization structure is presented in the following sub-sections 4f–4j, and is also illustrated and discussed in greater detail in conjunction with the display screens shown in FIGS. 13 and 16.

After describing the utilization at step 110, the customers are described at step 112. A more detailed description of a preferred method of describing the customers is presented in conjunction with the display screens shown in FIGS. 13 and 17.

Completing the steps 52 involved in describing the environment results in reaching step 114, from which a transition to the step 54 of defining the demand, shown in FIG. 1, occurs.

4b. Define Demand—FIG. 3

Figure 3:
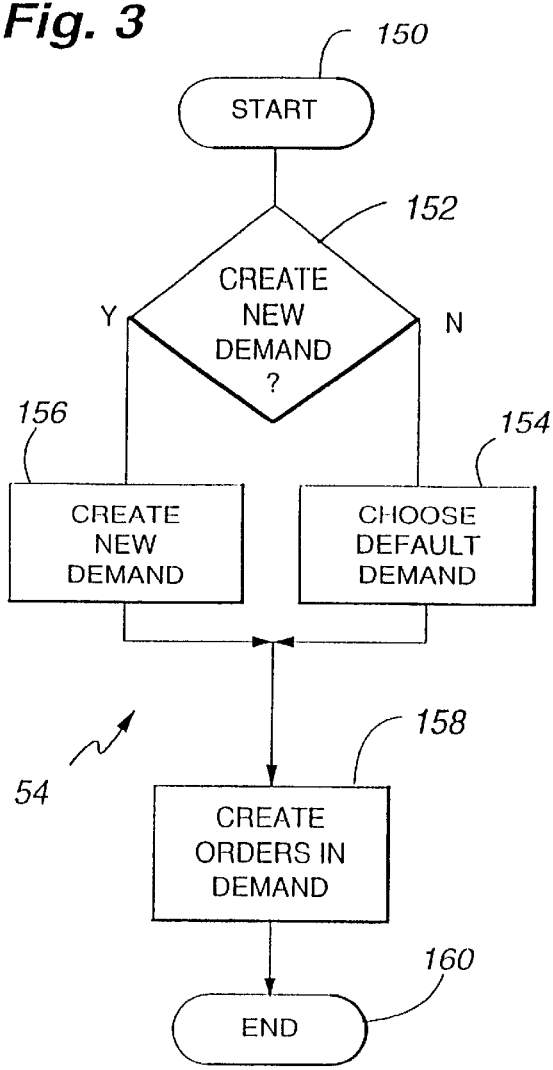
FIG. 3 is a flow diagram of steps involved in performing the more generic step of "Define Demand" shown in FIG. 1.

The program flow associated with the step of defining the demand, shown at 54 in FIG. 3, starts at 150 and proceeds to a determination at 152 of whether to create a new demand or not. As noted previously, the demand is typically defined in terms of customer orders. In the case, creating a new demand involves entering information describing a new customer order. If a new demand is not created, a pre-existing default demand is chosen at step 154. A pre-existing demand is represented by the structure and format of an existing order, and that structure and format is used to enter the new information. If a new demand is created, that entry of the structure and format for the new order is initiated at step 156. A more detailed description of a preferred method of creating demand by entering orders is presented in conjunction with the display screens shown in FIGS. 27–29.

The program flow from either of steps 154 and 156 leads to the step of creating orders in demand, as shown at step 158. The orders specify the demand, and the information describing the orders is entered for use at step 158, by a process more completely described in conjunction with the display screens shown in FIGS. 34–38. Once the orders have been defined to establish the demand, the program flow associated with step 54 terminates at 160. The program flow then transitions to the schedule demand step shown at 56 in FIG. 1.

4c. Schedule Demand—FIG. 4

Figure 4:
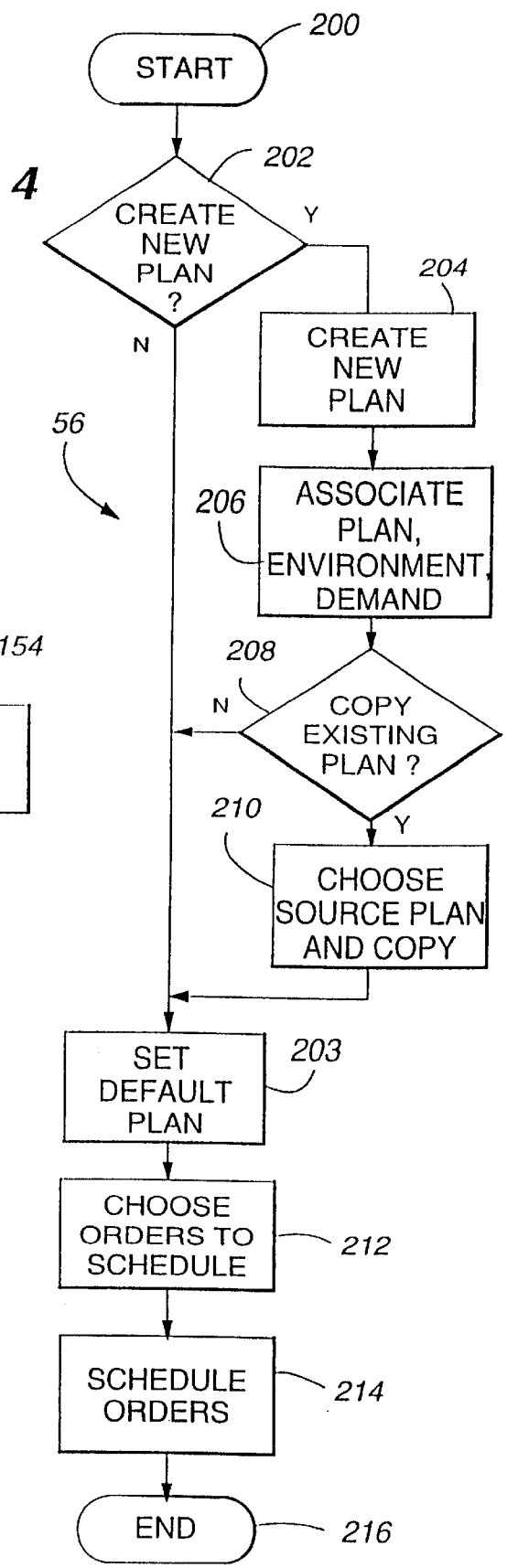
FIG. 4 is a flow diagram of steps involved in performing the more generic step of "Schedule Demand" shown in FIG. 1.

The program flow 56 associated with scheduling the demand is initiated at step 200 shown in FIG. 4. A plan is selected to schedule the demand. A determination at 202 identifies whether a new plan is to be created or not. If a new plan is not created, an existing plan will be used to schedule the demand. The existing plan then becomes the default plan which is set at step 203. Alternatively, the first step 204 is the creation of the plan, which involves selecting a plan presented based on the scheduling model and the information supplied at steps 52 and 54 (FIG. 1). The step 204 is also described in greater detail in association with FIGS. 24 and 26. The plan is thereafter associated with an environment and the demand at step 206. The step 206 is also further described in conjunction with FIGS. 23–26.

After accomplishing steps 204 and 206, it may be determined that a new plan might be better created by copying an existing plan. Step 208 allows the user to copy an existing plan. If an existing plan is copied, the plan to be copied (the source plan), will be selected at step 210 and then copied.

The plan obtained at step 203 will be the default plan. The default plan will be a pre-existing plan if a new plan is not created at step 202 or if an existing plan is copied at step 208, or will be a plan created at step 204 and chosen at step 210.

The user chooses orders to schedule at step 212. Thereafter the chosen orders are scheduled at step 214. More details j concerning the step 214 of scheduling the orders is presented in conjunction with the description associated with FIGS. 6–11. Thereafter the program flow of scheduling demand (step 56) terminates at step 216, and a transition occurs to the step 58 shown in FIG. 1.

4d. Evaluate Plan—FIG. 5

Figure 5:
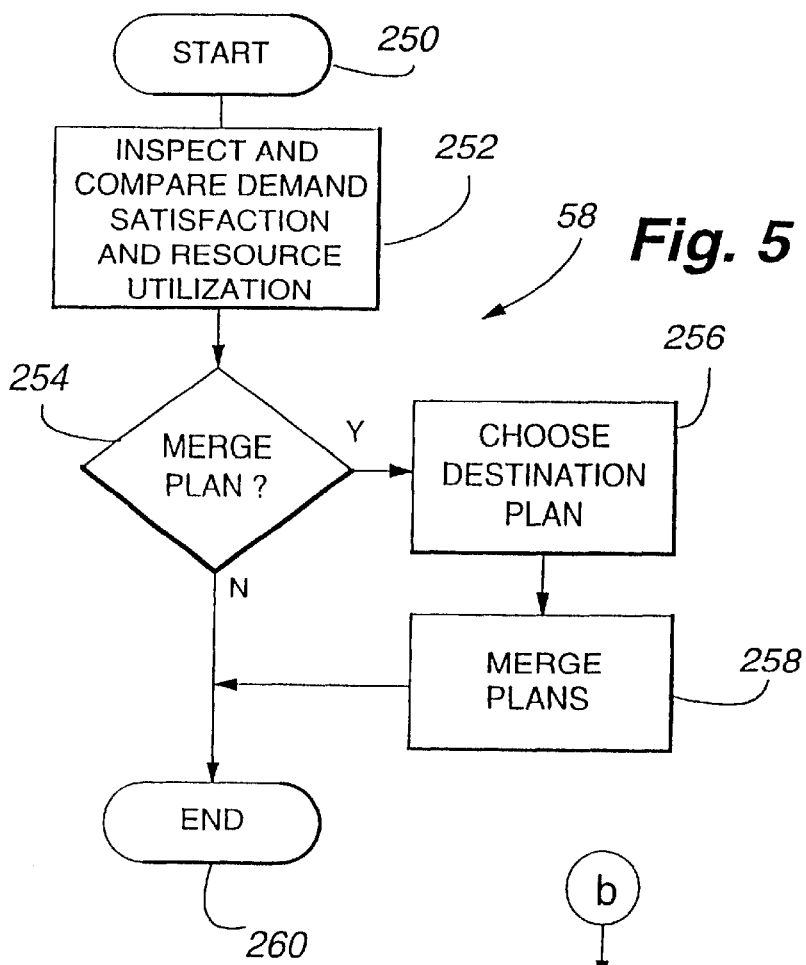
FIG. 5 is a flow diagram of steps involved in performing the more generic step of "Evaluate Plan" shown in FIG. 1.

The process flow involved in evaluating the plan 58 which was previously scheduled (step 56, FIG. 1), is described more completely in FIG. 5. The step 58 of evaluating the plan begins at 250 and progresses to a step 252. At step 252, the user has the opportunity to inspect the scheduled plan, particularly with respect to inspecting the demand to determine if it is adequately satisfied and to compare the demand to the resources used in executing the plan. The inspection and comparison at step 252 allows the user to make the final determinations as to the suitability of the plan for satisfying the demand with the resources available to be used. Step 252 offers the user the opportunity to mentally evaluate the plan.

Following the inspection and comparison step at 252, a determination is made at step 254 of whether or not to merge or combine the scheduled plan (step 56, FIG. 1) with a pre-existing plan. A pre-existing plan will exist as a result of other demand which has been previously scheduled. The pre-existing plan may be related to the plan just scheduled as, for example, a result of scheduling two separate but closely related orders for the same customer. A merger might also be selected when two or more unrelated customers order the same product. The determination at step 254 involves comparing the plan previously scheduled and a previously existing plan and combining those plans.

A determination to merge the two plans inherently involves increasing the quantity associated with the chosen plan, which is referred to as a destination plan. The step of choosing the destination plan occurs at 256. Thereafter the two plans are merged into a single plan as shown at 258.

After merger of the plans at step 258, or if the determination at step 254 was not to merge the immediately scheduled plan with a pre-existing plan, the process flow 58 of evaluating the plan terminates at step 260.

The step 58 of evaluating the plan is conveniently and effectively accomplished by the use of screen displays with editing capability, as is described more completely below in conjunction with FIGS. 23–26. The use of these screen display editors allows the user to evaluate alternative plans, as well as partial plans, to achieve the best information for conducting the business.

4e. Schedule Orders or Schedule Demand—FIGS. 6A and 6B

Figure 6B:
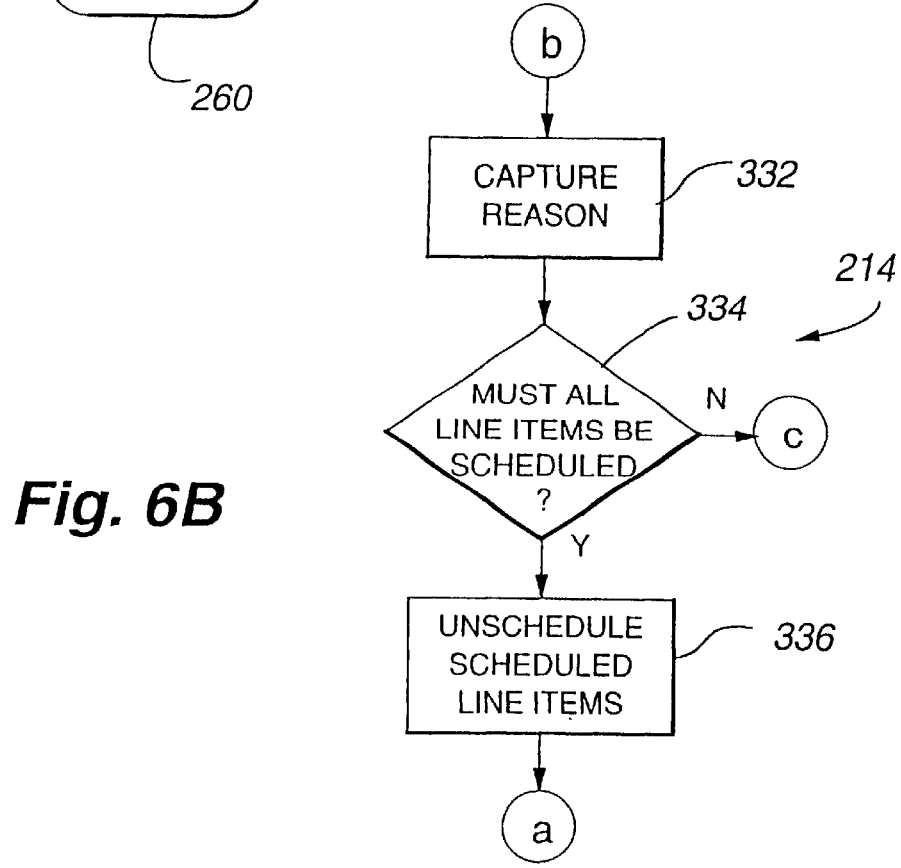
FIG. 6 is a flow diagram of steps involved in performing the more generic step of "Schedule Orders" shown in FIG. 4.
Figure 6A:
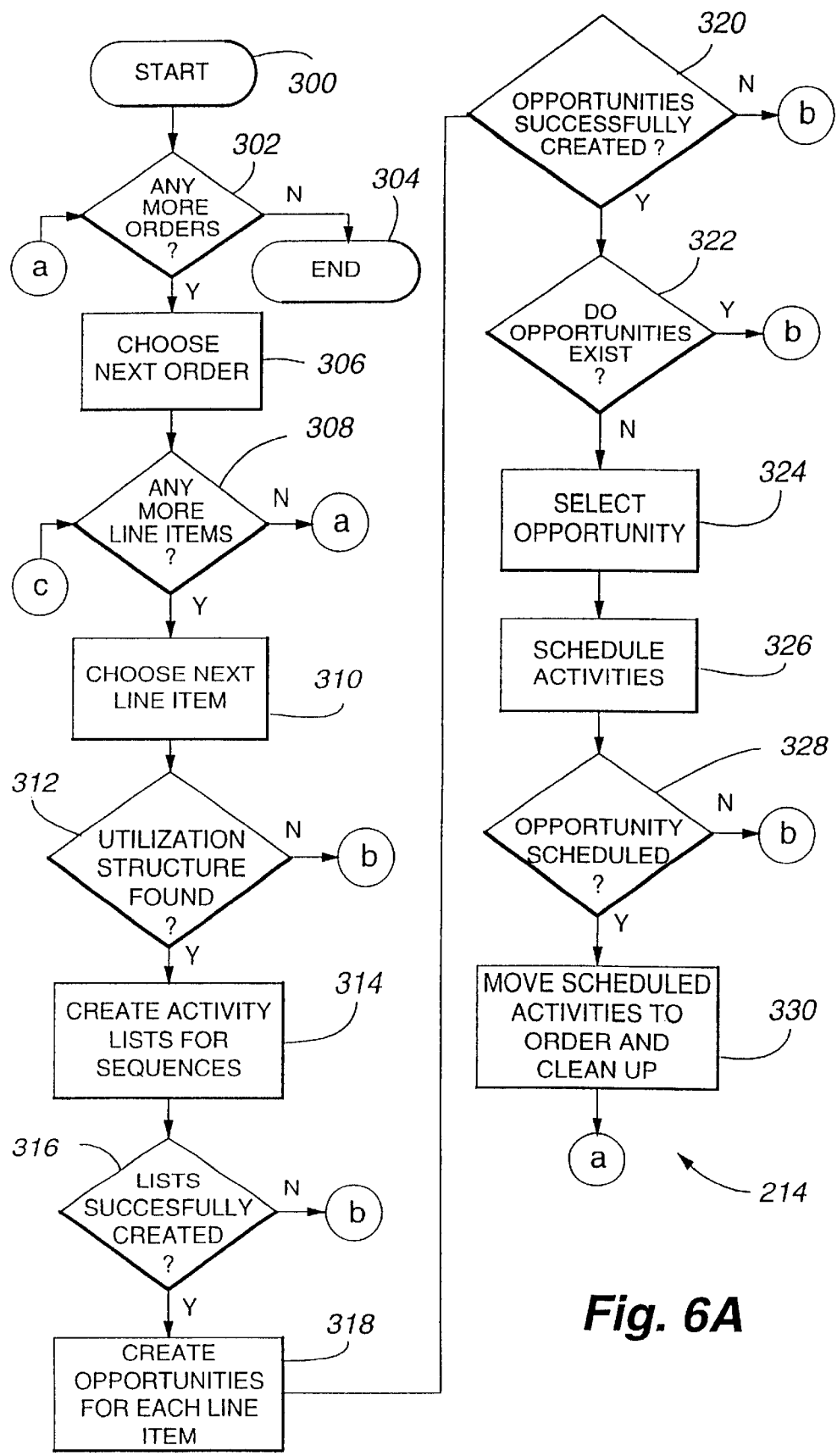

The step 214 of scheduling orders is shown in greater detail in FIGS. 6A and 6B. The process of scheduling orders begins at 300, followed by a first determination at 302 of whether any more orders exist to be scheduled. If all of the orders have been scheduled previously, the process of scheduling orders is not needed and the process ends as shown at 304.

When additional orders are to be scheduled, as determined at 302, the next order is chosen at 306. The choosing the next order at step 306 allows the user to invoke any particular form of priority or selection which may be desirable or necessary, until all of the orders have been scheduled.

The next step at 308 involves determining whether there are any further line items of the selected order to be scheduled. The order will consist of one or more line items. Each line item may be for a single component or product to be manufactured. Thus, a singular order may consist of multiple different products, each of which is identified by a single line item. Once all of the line items of the selected order have been scheduled, the order is completely scheduled.

The ability to schedule orders by line item is an important feature of the present invention. Each of the line items on the order may be individually modeled. Many prior MS processes and software techniques can not model each individual line item because the individual line items represent highly complex and difficult-to-execute routines which nest within one another and are therefore recursive. The models employed in such prior MS processes and software techniques simply are unable to accommodate this degree of complexity. Accommodating multiple line items per order achieves a highly expressive description of demand. The expression of relationships between the line items of the order is also facilitated. By scheduling individual line items, part of an order can be scheduled if necessary, rather than requiring the rejection of the total order even though part of it could be accommodated or scheduled.

At step 310, a selected line item of the order is next chosen. The default pattern is to select the next occurring line item, but the user has the option of selecting among all of the line items which are still available to be scheduled. This selection capability again allows the user to impose a particular type of preference for certain line items to accommodate a particular circumstance.

The next step at 312 is to locate and retrieve the utilization structure which will be employed to accomplish the objective represented by the line item chosen at 310. The utilization structure defines the business capabilities and requirements which must be performed to produce the objective. An objective is or may be the goal or end result, or even an immediate result, of the sequence of operations defined by the utilization structure. The objective may be the output product of the business, or a sub-component of the output product.

After obtaining the utilization structure at 312 to accomplish the objective represented by the line item chosen at 310, activity lists for sequences are created using this utilization structure, as shown at 314. The step of creating activity list for sequences is explained in greater detail in conjunction with FIG. 7. In general terms the activity list represents different sequences of operations for accomplishing the objective and the different operations required in each sequence.

Step 316 determines whether the activity lists were successfully created. If the activity lists were successfully created at step 216, opportunities are next created for each line item as shown at step 318. Creating the opportunities for each line item is explained in greater detail in FIG. 8. In general however, creating the opportunities for each line item requires using the objective of the line item and the utilization structure to create activities and requests. Thereafter, this information is employed to determine when activities can be scheduled. The opportunities refer to the times when the activities can be scheduled. Opportunities are created when the resources to accomplish the activities are available for use.

A determination is made at step 320 of whether the opportunities have been successfully created. If the opportunities were successfully created, a determination is made at 322 as to whether those opportunities actually exist. The step 322 recognizes the possibility there may be no practical opportunities even if the opportunities did theoretically exist as determined at step 320.

Once an opportunity has been identified, it is selected as shown at 324. Offering the capability to select among the opportunities at 324 allows the user to make individual decisions about selecting the opportunities. For example, one opportunity may result in lower costs but the other opportunity may result in a more rapid completion of the objective. The selection at 324 is explained in greater detail in FIG. 9.

After selecting the opportunity at 324, the activities associated with the selected opportunity are scheduled at 326. Scheduling the opportunity is described in greater detail in FIG. 10, but in general scheduling the activities for the selected opportunity results in updating the state of the resources and the state of the activities.

Thereafter, a determination is made at 328 as to whether the activities for the selected opportunity were successfully scheduled. If the activities were successfully scheduled, the process flow moves to step 330 where all of the scheduled activities are moved, linked or otherwise correlated to the order which was chosen at step 306. In addition, all of the other opportunities which were not scheduled at step 328 are eliminated. Eliminating these unused opportunities is referred to as "cleaning up."

After the scheduled activities have been moved to the order at step 330, the program flow reverts to step 302, where the described process flow starts again. Another order is selected at 306, or the one of the remaining line items of the previously selected order can be processed beginning at step 308. Once all of the orders and the line items of the all of the orders have been processed, the process flow of scheduling the demand terminates at 304.

The steps at 312, 316, 320, 322 and 328 all involve determinations which are indicative of a failure or discrepancy in the normal process flow 214 of scheduling the demand. In each such case, the program flow proceeds from such determinations to step 332 (FIG. 6B) to capture the reason for the failure or discrepancy. The reason is presented to the user so that the user may take those actions necessary to correct the failure or discrepancy.

Providing the user with information concerning the reason for the failure or discrepancy is an important improvement over many prior scheduling processes and software techniques. Many of the prior processes and techniques inform the user only of the fact of failure, not the reason for the failure. With the information gained at step 332, the user may be able to take corrective action to improve the manufacturing process, which would be impossible to precisely identify if the user was employing a prior art MS technique or process.

Following capture of the reason at step 332, a determination is made at step 334 of whether all of the line items are required to be scheduled. Some line items of an order may be optional, or may be treated as optional by the user. In the case where the line items are optional, the process flow will transition from step 334 to step 308 (FIG. 6A), where the process flow continues in the manner described. On the other hand, if the determination at 334 (FIG. 6B) reveals that all line items must be scheduled, the process flow continues to step 336.

At step 336, the previously scheduled line items associated with the selected order are unscheduled. The step 336 is accomplished under the assumption that a customer will not accept an order unless all of the line items can be supplied. Since the order could not be scheduled as determined at one of the steps 312, 316, 320, 322 or 328, and because all of the line items could not be scheduled as determined at step 334, the previously scheduled line items associated with that order are unscheduled, thereby eliminating the order from consideration.

The step 214 of scheduling orders as described in FIGS. 6A and 6B therefore generally involves the decomposition of the orders into line items, the correlation of the line items to the utilization structure for those line items, the creation of sequences for the line items and the identification of the opportunities for each sequence, all of which occurs prior to selecting a desired opportunity and scheduling that desired opportunity. The ability to capture and identify reasons for the failure of each of these determinations as the process flow continues is an important feature allowing the user to make improvements to more readily accommodate a desired solution to the FCP problem.

4f. Create Activity Lists for Sequences—FIG. 7

Figure 7:
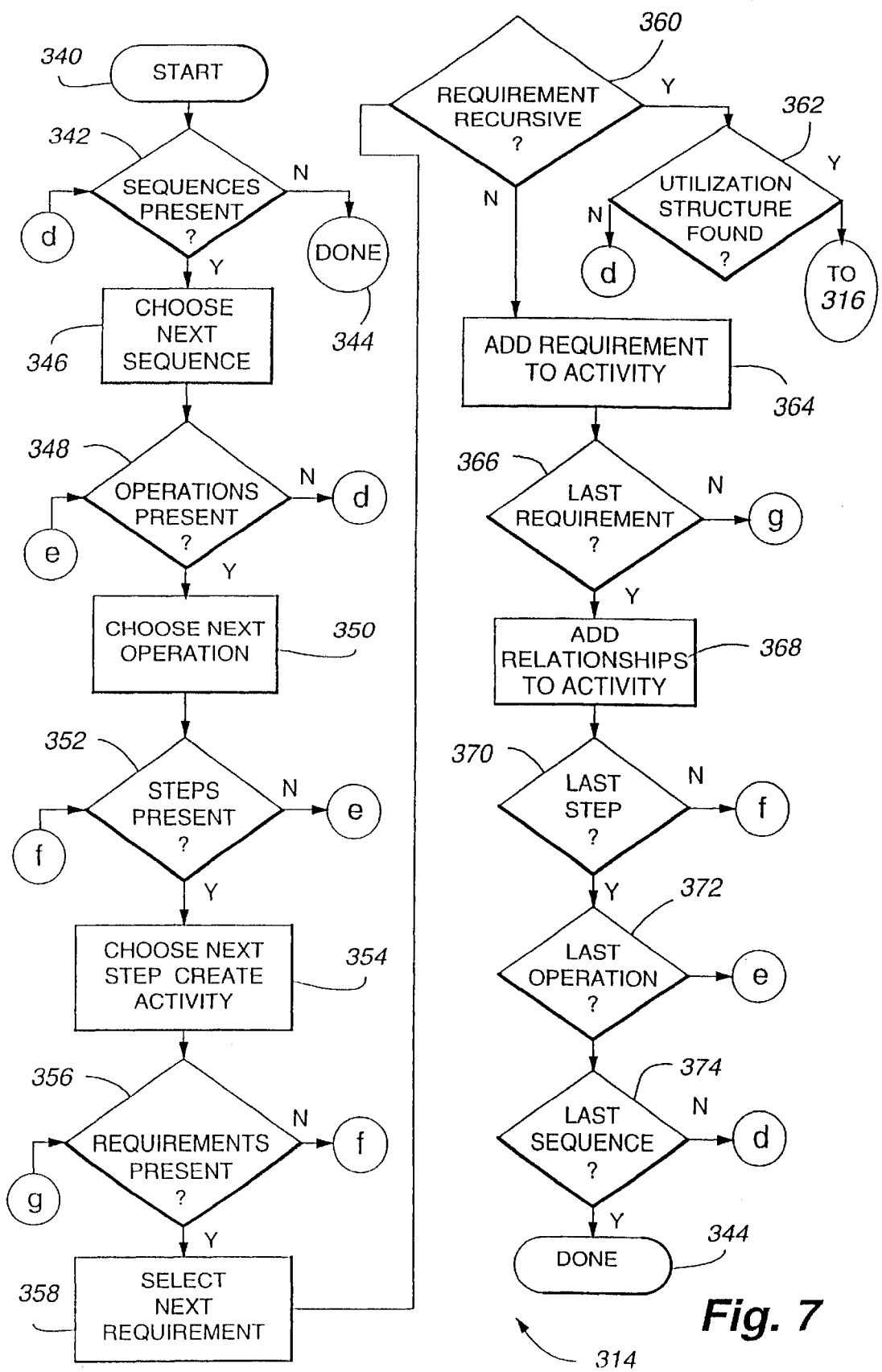
FIG. 7 is a flow diagram of steps involved in performing the more generic step of "Create Activity Lists for Sequence" shown in FIG. 6.

A more detailed explanation of the step 314 (FIG. 6A) of creating activity lists for a sequence is shown in FIG. 7. A sequence is part of the utilization structure, and a list of activities define each sequence. The utilization structure governs the creation of the activity lists.

The process flow to create activity lists for sequences begins at 340 and moves to step 342 when a determination is made of whether sequences are present. The determination 342 is to address the circumstances where there is an objective without a sequence to accomplish that objective. If there are objectives with no sequences, this is an indication that the objective can not be accomplished and the process flow of creating activity lists for sequences ends at 344.

If, however, there are multiple different sequence combinations to accomplish the objective, the step at 346 allows the user to choose among the different sequences to accomplish the objective. Multiple different sequence possibilities exist when the business has the capability to achieve the objective by different production techniques. For example, a product (objective) may be manufactured using either one of two completely separate assembly lines. The activities used in each assembly line comprise separate sequences. By allowing a choice among the different of sequence possibilities the user can identify and determine the best sequence according to the information available to the user. If only one sequence is available, it will be chosen at step 346.

The chosen sequence may or may not have operations, which is determined at 348. If the chosen sequence combination does not have operations, as determined at 348, this is an indication of an error in the utilization structure to achieve the objective.

The operations of the sequence are next chosen at 350. If no operations for the sequence exists, this is an error in the utilization structure as then defined. For the chosen operation, a determination is made at 352 if steps are involved in the chosen operation. If no steps exist for the chosen operations, the utilization structure will not be capable of producing the objective. The steps are next selected at 354. The steps chosen at 354 are the activities.

A determination is thereafter made at 356 as to whether the activity represented by the step chosen at 354 has requirements associated with it. If the chosen step does have associated requirements, the relevant requirements associated with the step are chosen at 358. Each of the requirements selected at 358 may or may not be recursive, as determined at 360. Recursive requirements are themselves defined by a utilization structure, and that utilization structure is found at step 362. With the utilization found for a recursive requirement, the program flow proceeds on to step 316 in the program flow shown in FIG. 6A. If the utilization structure for a recursive requirement is not found, the program flow transitions to step 342 shown in FIG. 7, where the previously discussed steps of process flow continue.

If the requirement is determined not to be recursive at step 360, the requirement is added to an activity as shown at step 364. The current step is thereafter evaluated at 366 to determine whether the requirement is the last requirement. If the requirement is not the last one, the process flow continues at step 356. Continuation of the process flow at step 356 allows the next requirement to be added to the step. This process flow continues between steps 366 and 356 until all of the requirements have been added to the step. When all of the requirements have been added to the step and therefore the last requirement has been added to the step, the determination at step 366 causes the process flow to continue to step 368.

The determination at step 368 involves adding the relationships to the activity. The relationships generally describe the temporal or functional order of the steps or activities.

The foregoing process is accomplished for all of the steps, with the determination at 370 causing the process flow to revert to step 352 until all of the steps have been dealt with. Until the last step is encountered, the process flow continues from step 370 to step 352. This continuation assures that all the steps will be associated with each activity list. When all of the steps have been dealt with, the process flow continues to step 372.

Similarly, the described process flow proceeds until all of the operations have been accumulated in the activity list for the sequence. Until all of the operations have been accumulated in the activity list, the program flow transitions from step 372 to step 348. The determination of the last operation of the activity list causes the process flow to move from step 372 to step 374.

In a similar manner, all of the sequence combinations are processed as described. Until the last sequence is reached, the determination at step 374 causes the program flow to move from step 374 to step 342. This continuation assures that all the sequences will be accumulated on the activity list. However, once the last sequence is encountered as determined at step 374, the program flow 314 of creating activity lists for sequences terminates at 344, and the process flow 214 continues at step 316, as shown in FIG. 6A.

The activity lists created according to the process flow shown in FIG. 7 result in one or more sequence possibilities that can be used to fulfill an objective. More than one sequence may satisfy a line item objective. The activity list of each sequence represents one alternative for satisfying the line item objective.

4g. Create Opportunities for Line Items—FIG. 8

Figure 8:
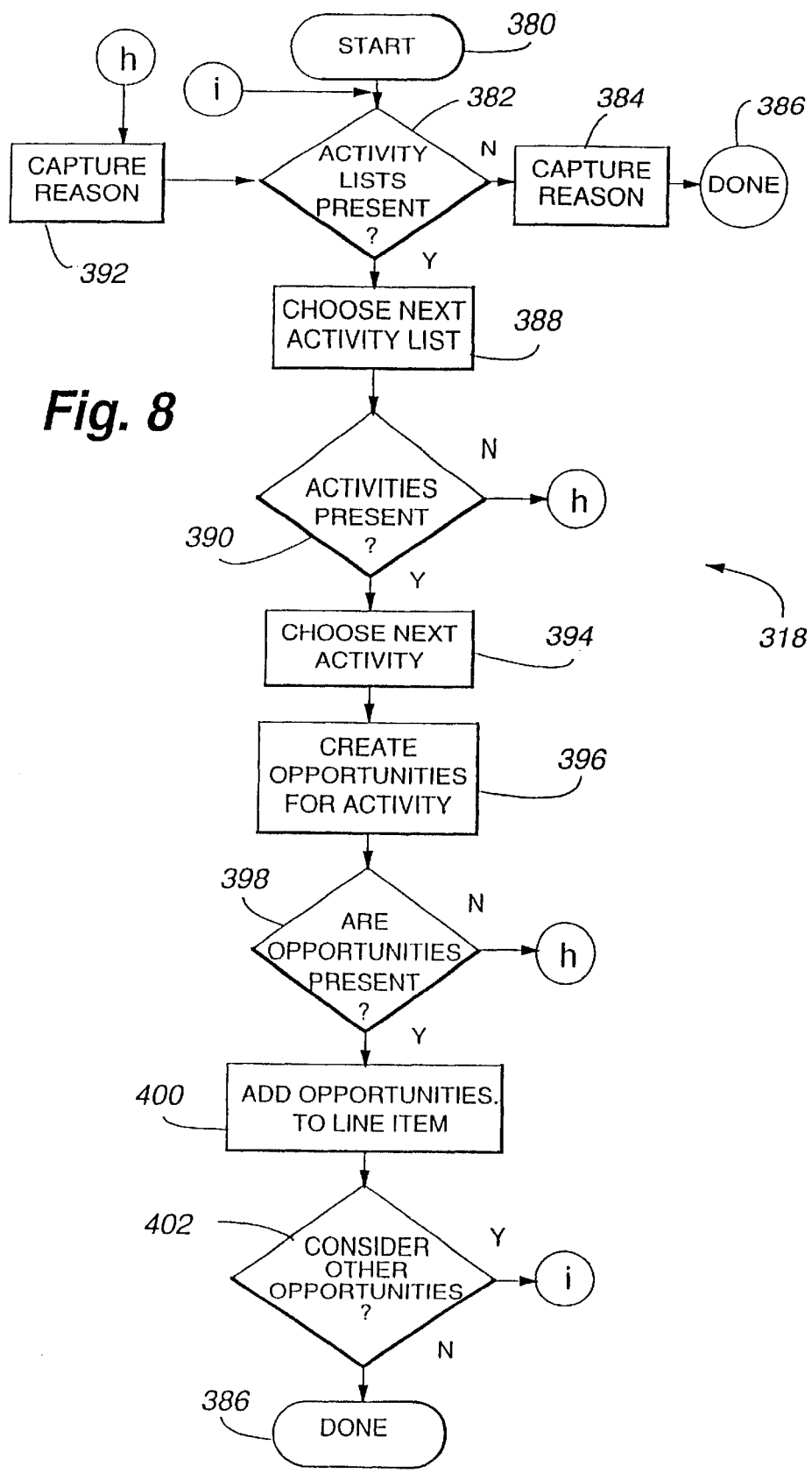
FIG. 8 is a flow diagram of steps involved in performing the more generic step of "Create Opportunities for Line Item" shown in FIG. 6.

With the activity lists for each line item, opportunities for the line items are created as shown generally at step 318 (FIG. 6A) and as shown more particularly in FIG. 8.

The process flow begins at step 380 and transitions to step 382 where a first determination is made of whether activity lists are present. If no activity lists are present, the reason for the absence of the activity lists is captured and made available to the user at step 384. Once the reason has been captured at 384, the process flow associated with step 318 is completed as shown at 386, and the process flow associated with step 318 transitions to step 320 (FIG. 6A).

If activity lists are present as determined at 382, the next activity list is chosen at step 388. The determination made at step 390 is to guard against the possibility that a list could exist which does not contain activities. When a list exists that is devoid of activities, the determination at 390 causes a transition in the program flow to step 392, where the reason for the absence of activities in the list is captured and presented. After capturing the reason at 392, the program flow continues with step 382. On the other hand, when the determination at step 390 reveals that activities are present in the activity list, thereby indicating the proper formulation of the activity list, the process flow continues and the next activity is chosen at step 294.

Opportunities are created for each of the activities of the list as shown at step 396. A more detailed explanation of the manner in which opportunities are created for the activities is described in conjunction with FIG. 11. The determination at 398 recognizes the possibility that opportunities may exist, but those opportunities can not be executed. For example, all of the resources associated with an opportunity may currently be in use. When opportunities do exist, those opportunities are added to the line items as shown at step 400.

The determination at 402 allows the user to evaluate multiple, alternative opportunities for each line item. The extent to which the alternative opportunities are evaluated depends on the particular circumstances and the constraints surrounding the operation of the user's facilities. If the determination is made at 402 to consider other opportunities, the program flow reverts back to step 382 to establish the alternative opportunities by progress through the steps illustrated. If, on the other hand, the opportunity presented at 400 is sufficient, the determination made at step 402 is to accept the presented opportunity and not consider further opportunities, causing the process flow 318 of creating opportunities for the line items to terminate at 386.

As is apparent from the description associated with FIG. 8, the activity lists are used as the basis to create opportunities for each line item. If more than one opportunity exists, the user may evaluate the various opportunities and select a desired opportunity. In this manner the user is offered the possibility of considering optional opportunities to accomplish the line item.

4h. Select Opportunities—FIG. 9

Figure 9:
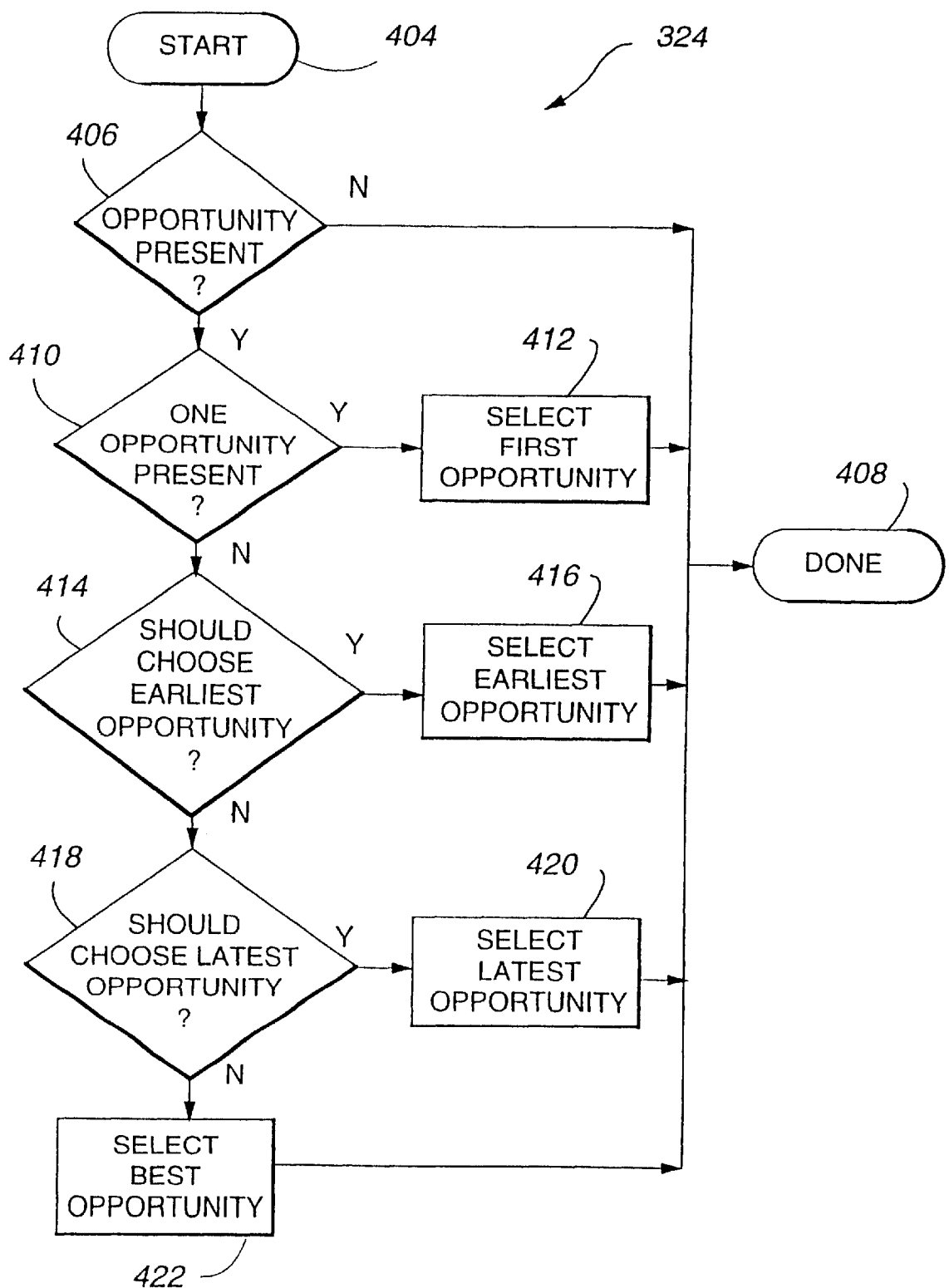
FIG. 9 is a flow diagram of steps involved in performing the more generic step of "Select Opportunity" shown in FIG. 6.

Details concerning the step 324 (FIG. 6A) of selecting the opportunities is shown in greater detail in FIG. 9. The process flow 324 begins at 404 with a transition from step 322 (FIG. 6A). The process flow 324 ends at 408 with a transition to step 326 (FIG. 6A).

The first step in the process flow 324 begins with a determination at step 406 of whether an opportunity is present. If no opportunity exists, the process flow 324 transitions to step 408 were it ends. The non-existence of an opportunity makes it impossible to schedule a plan. However, if the determination at step 406 reveals an opportunity, the process flow continues at step 410.

If only one opportunity is present as determined at 410, that single opportunity will be selected as shown at step 412. Thereafter the program flow terminates at 408. However, if more than one opportunity is present as determined at step 410, the process flow transitions to step 414. The determinations at steps 406 and 410 make the affirmative determination at step 410 indicative of the fact that multiple opportunities are present.

The determination made at step 414 allows the user to determine whether to select the earliest one of the multiple opportunities. If the earliest opportunity is desired, it is selected at step 416. An earliest opportunity is generally the one which is completed the soonest. After selection of the earliest opportunity at step 416, the process flow 324 ends at step 408.

If the earliest opportunity is rejected, the determination at step 418 allows the user to select the latest one of the multiple opportunities. The latest opportunity is thereafter selected at step 420. The latest opportunity is one which is usually completed at the latest time. The latest opportunity is usually referred to as the just-in-time (JIT) opportunity. After selection of the latest opportunity at step 420, the process flow 324 terminates at step 408.

In the case of more than three opportunities where the user has not selected the earliest or the latest opportunity, the user is presented with the possibility of selecting the best opportunity at step 422. The best opportunity must be defined by the user in terms which are applicable to its business. Separate considerations could be combined and rated to derive a weighted scale for the best opportunity. A metric would be applied to the opportunities to determine what is the best. A typical definition of best opportunity would be in terms of cost. For example, a changeover of a resource will typically involve a cost. The cost associated with the changeover may vary depending upon the nature of the changeover and other circumstances. The opportunity may require one or more changeovers under different circumstances, and thus the number and nature of the changeovers may be the primary determinant of the best opportunity.

With the possibilities of different opportunities, the user may easily look at the information associated with each opportunity to evaluate the relative merits of each, and thereafter make the decision based on that individual evaluation. Another basis for making a best determination may simply be the preference of the user.

4i. Schedule Activities—FIG. 10

Figure 10:
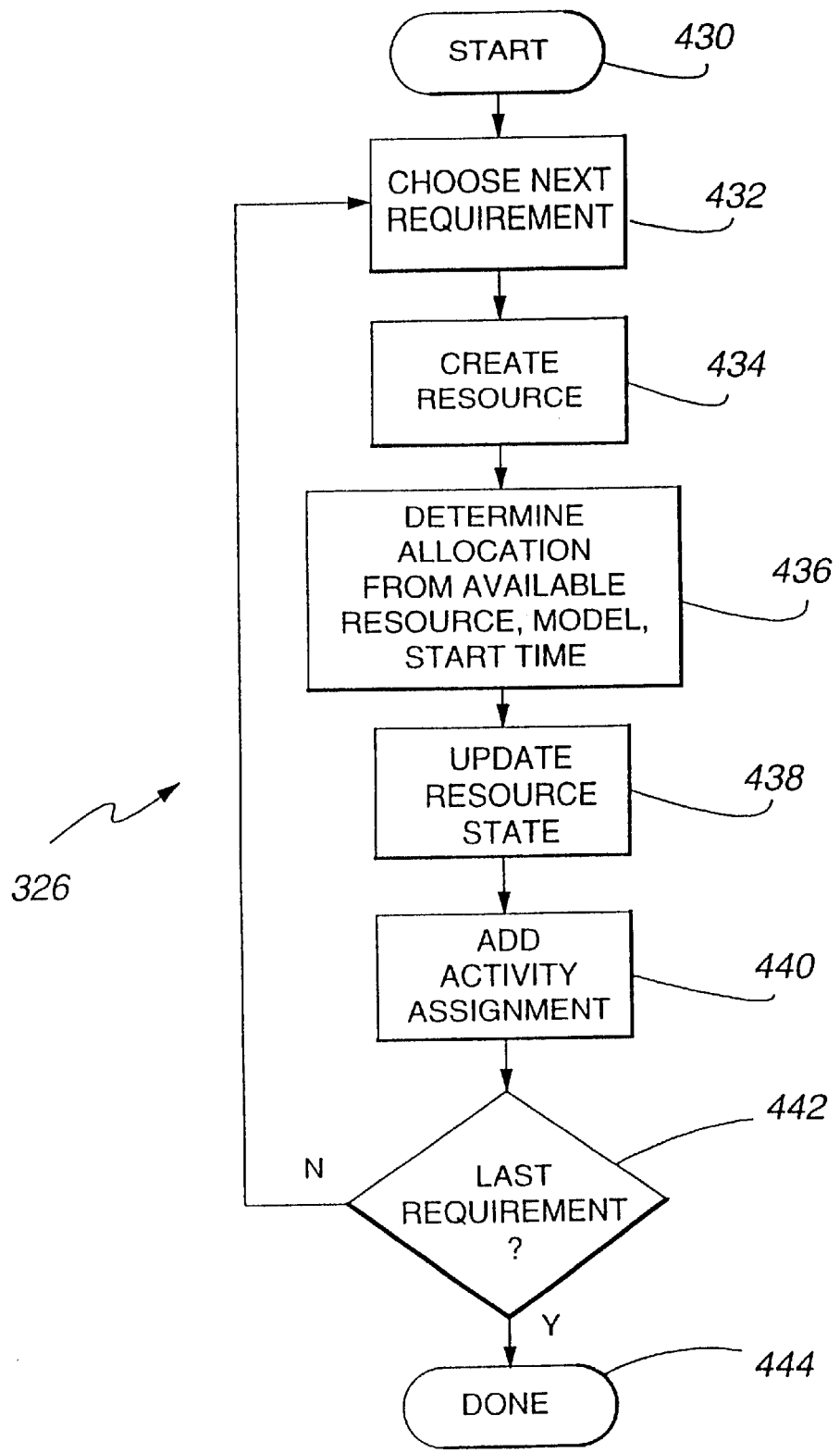
FIG. 10 is a flow diagram of steps involved in performing the more generic step of "Schedule Activities" shown in FIG. 6.

The step 326 (FIG. 6A) of scheduling activities is shown in greater detail in FIG. 10. The process flow 326 begins at 430 as a transition from step 324 (FIG. 6A) and ends at step 444 with a transition to step 328 (FIG. 6A).

Each activity has a number of requirements associated with it, and the overall program flow shown in FIG. 10 involves iterating through the steps shown until all of the requirements are associated with an activity. The first substantive step 432 involves choosing a requirement associated with each activity. Of course, with the first iteration through the program flow 326, the first requirement is chosen at step 432. The next step 434 involves creating the resource associated with the requirement. Since the resource is something which has a state through time, the step 434 may involve obtaining the resource or finding the availability of that resource from the information available in the system. The resource may be work in process. In general the resource must be available to satisfy the activities and the requirements of those activities.

Thereafter, the allocation of the resource is determined at 436. In general the allocation occurs during an interval of time when the resource is available to be used in the activity. Allocation intervals are suggested from the use of a rate model, the start times, and the available intervals. The modeling capabilities are related to the consumption of resources and are based on predictions of the time required for consumption or use of the resource. This information is compared to the start times and the open time intervals available. From this information, the time intervals for allocating the activity to the resource are determined. A variety of different rate models can be employed in this determination, as well as preferences for the starting times. In general the step 436 involves establishing a range of possibilities for allocating the activity and its requirements to the resource.

Once the allocation has been determined at step 436, the activity is specifically allocated or assigned to the resource at step 438. This allocation or assignment causes the state of the resource to be updated, meaning that the resource is committed during the allocation interval. In many cases, this means that the resource is not available for use in any other activity since all of the other use possibilities associated with that resource are precluded during the allocated intervals assigned to that resource.

After the resource state has been updated at step 438, the assignment is added to the activities as shown at step 440. In the scheduling model, every resource is either committed or available through time. Similarly, every activity in the scheduling model is related to the resources it will consume and the time when that consumption will occur. The activities and resources are both correlated so that each can be understood from the other. This correlation allows a display of the resources associated with the activity, and conversely allows a display of the activities associated with the resource. The user may desire to view the situation from the resources perspective or from the activities perspective.

The determination at step 442 causes the process flow of the schedule opportunity step 326 to iterate to step 432 until all of the requirements for an activity have been scheduled. Once all of the requirements have been scheduled as determined at 442, the process flow 326 terminates at step 444.

4j. Create Opportunities for Activities—FIG. 11

Figure 11:
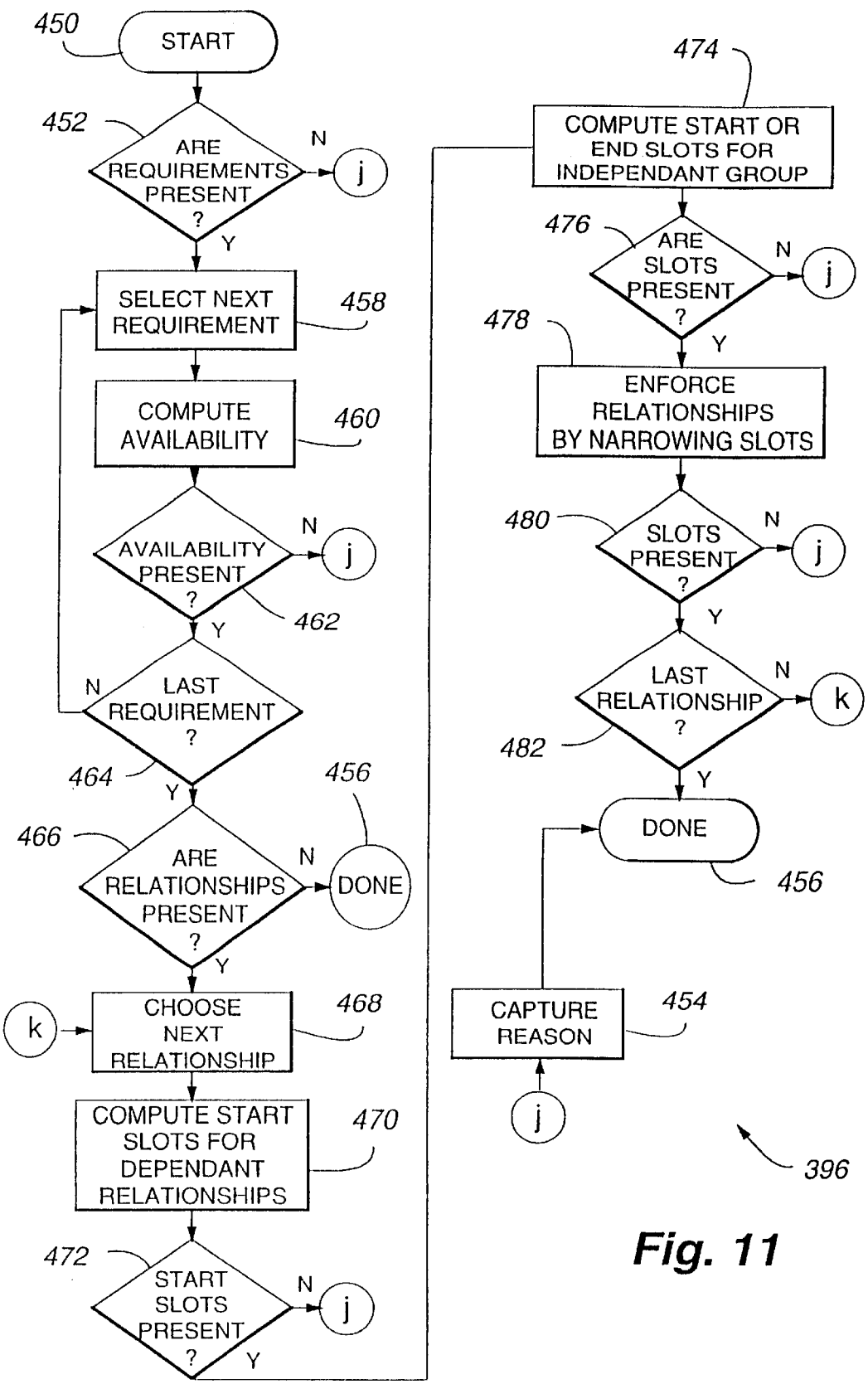
FIG. 11 is a flow diagram of steps involved in performing the more generic step of "Create Opportunities for Activity" shown in FIG. 8.

More details concerning the step 396 (FIG. 8) of creating opportunities for the activities are presented in FIG. 11. A transition to step 450 in the program flow 396 of creating opportunities for activities occurs from step 394 (FIG. 8), and a transition from the ending step 456 of the program flow 396 to the step 398 (FIG. 8) occurs after completion of the process flow 396.

The first substantive step 452 shown in FIG. 11 is a determination of whether requirements are present for the activities to be scheduled. If no requirements are present, the reason is captured at step 454 and the program flow ends at step 456. However requirements will typically be present as determined at 452, and the next requirement will be selected at step 458. The next requirement selected at step 458 may be the first requirement, because the selection process will iterate until all of the requirements have been selected. The next step 460 involves computing the availability for the requirement. Computing the availability for the requirement involves determining whether there is a capability for performing the requirements associated with the activities. If there is no availability for the requirement, as determined at step 462, the reason is captured at step 454 and the program flow 396 is completed.

However, if the availability is established at step 462, a determination at step 464 causes the program flow 396 to revert back to step 458 where the next requirement is selected. The availability of the next selected requirement is computed at step 460 and the presence of the availability is determined at step 462. Iterations through the loop formed by steps 464, 458, 460 and 462 are continually executed until all of the requirements and the availability associated with them is computed, as determined at step 464.

Next, the determination at step 466 determines whether relationships are present. If no relationships exist, the program flow 396 is completed at step 456. When relationships are present, the next relationship is chosen at step 468. For the relationship selected at step 468, a start slot is computed for each dependent relationship, as shown at step 470. Thereafter the availability or presence of start slots is determined at step 472. If no start slots are available, as determined at step 472, the reason is captured at step 454 and the program flow 396 terminates at step 456.

The start or end slots for the independent group of relationships is next computed at step 474. The determination at step 476 establishes whether slots for the independent group of relationships is present as determined at step 466. If not, the reason is captured at step 454 and the program terminates at step 456. When slots are present as determined at 476, the next step 478 involves enforcing the relationships by narrowing the slots. In general, enforcing the relationships by narrowing the slots involves reducing the number of available slots for each relationship to accommodate all of the relationships.

After enforcing the relationships by narrowing the slots at step 478, a determination is made at step 480 of whether any slots remain after the narrowing step 478 has been accomplished. If not, the reason is captured at 454. If so, a next determination is made at step 482 of whether all of the relationships have been dealt with. If not, the program flow 396 reverts to step 468, where all of the described steps are again performed for the next relationship. When the determination at step 482 reveals that the last relationship has been accounted for, the process flow 396 terminates at step 456.

The program flow 396 thus accounts for the requirements and the relationships associated with each step or activity involved in the activity list. In this manner, the opportunities for accomplishing the activities are defined as has been discussed in more general form in association with FIG. 8.

5. Computer System—FIG. 12

Figure 12:
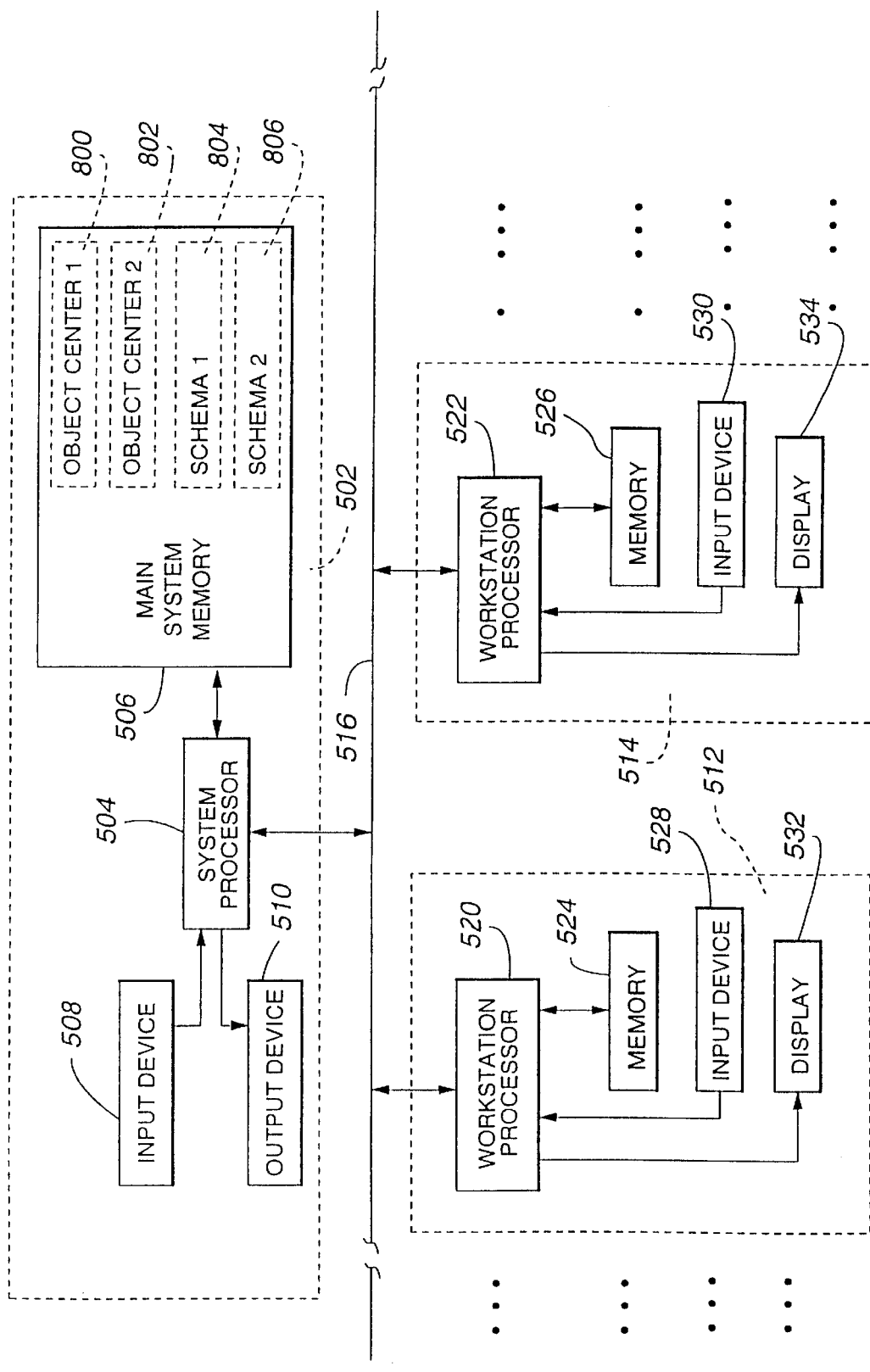
FIG. 12 is a block diagram of a typical computer system upon which the FCP process and program of the present invention is executed.

A block diagram of a typical computer system 500 employed in the present invention is illustrated in FIG. 12. In general, the computer system 500 includes at least one main computer 502. The main computer 502 includes a system processor 504 to which a main system memory 506 is connected. The system memory 506 may typically include a variety different memory devices such as disks, tapes and random access memory. In general the software program of the present invention will be resident in the main system memory 506. An input device 508 is connected to the system processor 504 by which to directly enter information. Similarly, an output device 510 is also connected to the system processor 504 by which to present information. The input device 508 may be a keyboard, and the output device 510 may be a CRT display or a printer, for example.

In many cases, the main computer 502 will not include individual input and output devices 508 and 510, respectively, because the information is supplied and presented at one or more workstations. Two workstations 512 and 514 are illustrated, but any number of workstations could be employed depending upon the size and capabilities of the main computer 502. Each workstation 512 and 514 is connected to the main computer 502 by a conventional bus or local area network 516. The local area network 516 provides the capability for the workstations 512, 514 to communicate with one another and with the main computer 502. In a similar manner, the main computer 502 can communicate with the workstations.

The workstations 512 and 514 each include workstation processors 520 and 522, memories 524 and 526, input devices 528 and 530, and displays 532 and 534, respectively. The memories 524 and 526 typically contain the software programs necessary for the workstations to function. Some of the functionality associated with the present invention may also be distributed to code recorded permanently or temporary in the workstation memories. For example, the relevant portion of the code defining the present invention and data may be transferred over the network 516 to the workstation and between workstations to cause the workstations to function. Thus, information from the main computer 502 and from each workstation is available to be communicated to the users at the displays 532, 534 and 510.

In addition to recording the program code and data associated with the present invention, the system memory 506 of the main computer 502 will typically contain the other important manufacturing information and data of the user. This information may be recorded in other programs and associated with data files in those programs. Some of this information in other programs may be accessed and used by the present invention in the manner described more completely below in Part 7b.

6. Graphical User Interface

The control and use of the program flow shown in FIGS. 1–11 and the computer system shown in FIG. 12 is preferably accomplished through use and presentation of a graphical user interface (GUI). The GUI is illustrated by a series of display screens shown in FIGS. 13–53. These display screens are presented to the user on the output device 510 and on the displays 532 and 534 of the computer system shown in FIG. 12. Selections made from the choices presented on the display screens of the GUI are accomplished by use of the input devices 508, 528 and 530 of the computer system shown in FIG. 12.

6a. Main Screen—FIG. 13

Figure 13:
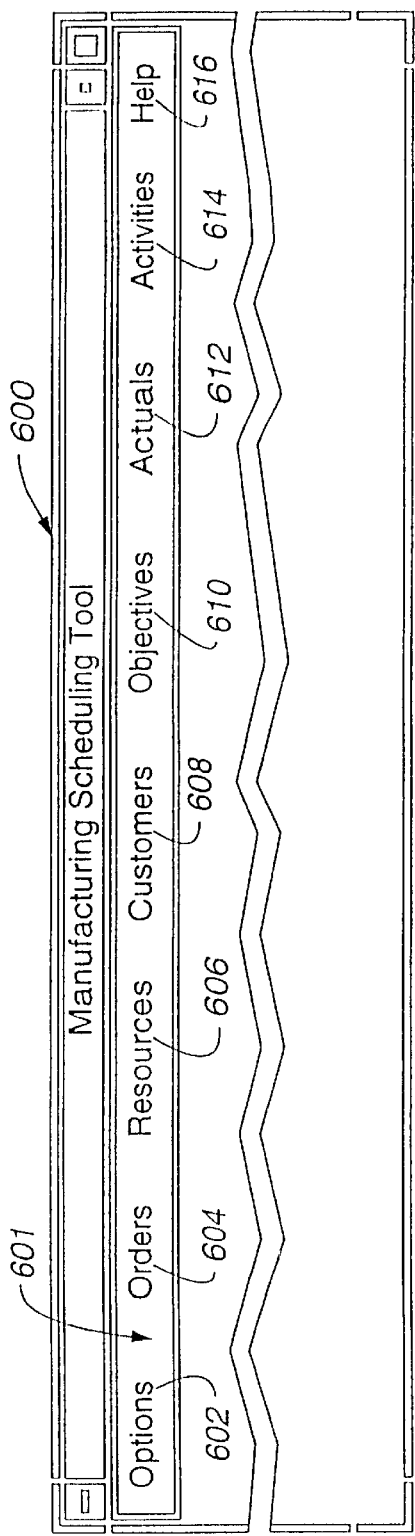

The main or upper level screen 600 the GUI is shown in FIG. 13. A menu bar 601 of the screen 600 illustrates the menu items which are available. The menu items are "options," "orders," "resources," "customers," "objectives," "actuals," "activities," and "help," all of which are shown in the menu bar 601. The user selects the menu item to gain access to its subject matter for use. The subject matter available when selecting the main menu items is further illustrated in the display screens 602, 604, 606, 608, 610, 612, 614 and 616, shown in FIGS. 14–21, respectively. Each of these subject matter screens 602–616 are discussed in greater detail below, with the exception of the help screen 616 shown in FIG. 21. The help screen is conventional in that it presents information to guide the user in the use of the system.

6b. Options—FIG. 14

Figure 14:
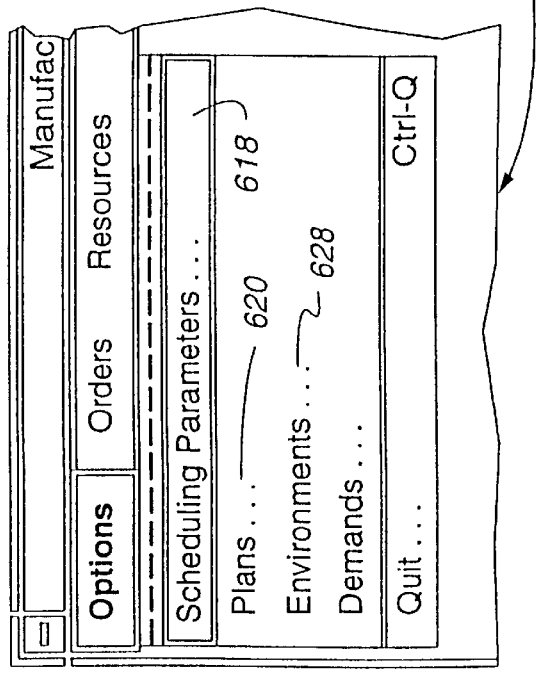

Upon selecting "options" from the menu bar 601 of the main menu 600 shown in FIG. 13, the subject matter categories of the options are presented in the screen 602 shown in FIG. 14. Those subject matter categories include "scheduling parameters," "plans," "environments," "demands" and "quit." Each of the subject matter categories is discussed below in conjunction with FIGS. 22–34. In general, these subject matter categories of plans, environments, demands and scheduling parameters generally relate to the overview concepts shown in and dealt with in FIG. 1. The "quit" subject matter category from the options menu simply allows the user to terminate use of the screen 602 and return to the main screen 600 (FIG. 13).

6b.1. Scheduling Parameters—FIG. 22

Figure 22:
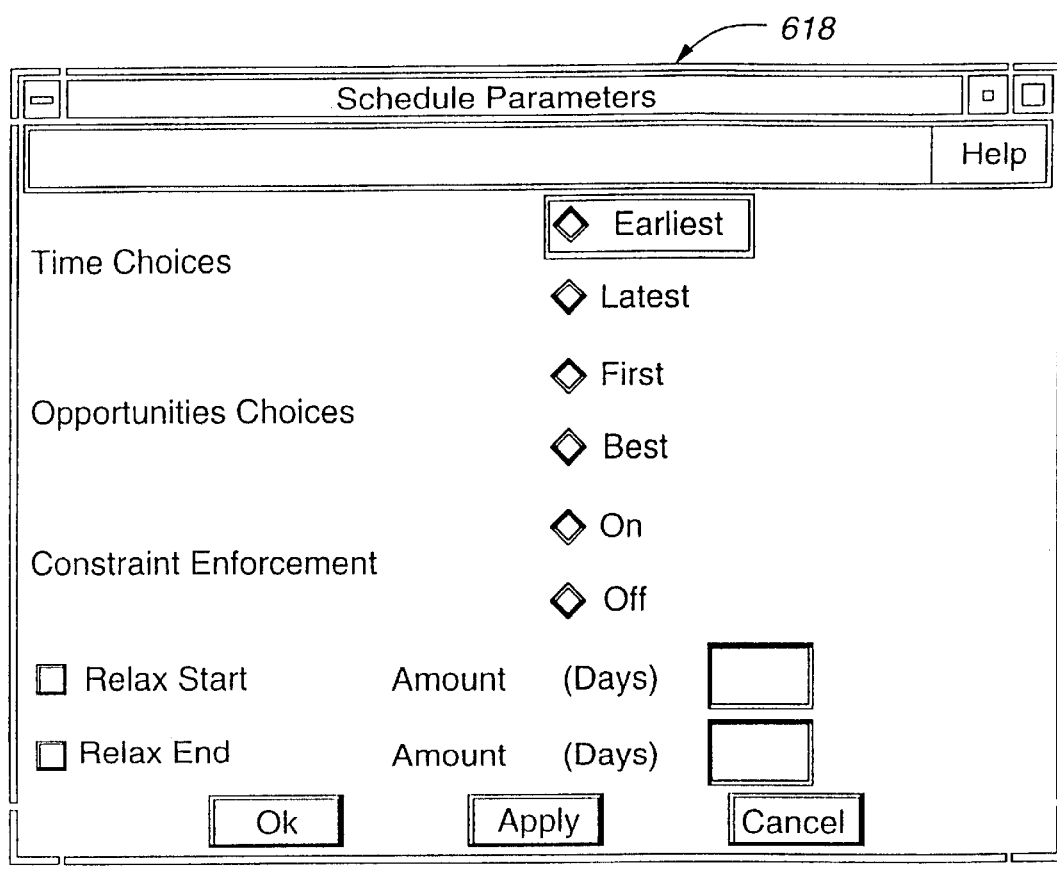

Selecting the "scheduling parameters" subject matter from screen 602 (FIG. 14) results in the presentation of screen 618 shown in FIG. 22. The information presented in screen 618 is used in scheduling parameters associated with a particular order. One of the parameters available from screen 618 relates to "time choices." The two time choices are "earliest" start and "latest" end. When a number of opportunities are presented to schedule a particular order, selection of the earliest start results in the selection of the earliest one of the available opportunities. Typically the earliest start opportunity will be the opportunity which is started first. The latest end opportunity will typically be the one which is completed last. A just in time philosophy for scheduling will be executed by selection of the latest opportunity. An earliest scheduling philosophy will be executed by selecting the earliest start.

The "opportunity choices" presented by screen 618 relate to the possibilities of sequences which may be available. Many different sequences may exist to schedule an order, for example hundreds of possibilities may exist. The two selections of opportunity choices available from screen 618 are "first" and "best." Selection of the first opportunity choice will result in the first opportunity which complies with the time choice selection. Thus, rather than require the user to evaluate many different sequence possibilities each of which represents an opportunity choice, selection of the first opportunity choice will result in selection of the first workable sequence. The criteria for establishing the "best" opportunity choice is determined based on information supplied by the user. The selections relating to time choices and opportunity choices establish the program flow associated with the select opportunity step 324 shown in FIGS. 6A and 9.

The "constraint enforcement" selection available from screen 618 is a global flag which allows the individual constraint enforcement settings of all of the resources to be defeated. Constraint enforcement can be turned on or off by the user. Turning on constraint enforcement will prevent scheduling the demand when the resources are inadequate to accomplish the objective. Turning off constraint enforcement will allow scheduling the demand, even though the plan may become infeasible or impossible to conclude.

As is discussed in conjunction with the resource editor described below (Part 6d.3.1), each resource can be in an "on," "off," or "track" mode. In the "on" mode, if the resource does not contain enough capacity, no scheduling using that resource will be permitted. In the "off" mode, the capacity of the resource is not constraining and scheduling is permitted apart from the actual capacity of the resource. Scheduling without regard for the capacity of a resource proceeds under the assumption that the user will take appropriate action to correct the capacity problem before manufacturing is disrupted. This is referred to as the "track" mode, because the user must track or monitor the progress of the use of the resource to prevent disruption. When the constraint enforcement is "off," all of the resources are placed in the "track" mode. When the constraint enforcement is "on," the mode (on or off) initially attributed to the resource is employed.

The "relax start" and "relax end" selections available from screen 618 relate to a time horizon or window associated with each order. The window is defined by a requested start date and a required delivery date. The window defines the time within which the order must be scheduled. If an order can not be scheduled during its desired window, selection of the relax start or the relax end possibilities will allow the beginning or ending times of the window to be adjusted before or after the desired start and end times of the window, respectively. These choices are therefore available to the user to schedule orders where the window of opportunity for starting and delivering the order need not be absolutely adhered to.

The relax start and relax end choices are adjustable in time length by the "amount" windows associated with each as shown in the screen 618. The user inserts the number of days in the window associated with either the relax start or relax end choices to control the amount of relaxation or adjustment associated with each choice.

The constraint enforcement, relax start and relax end selections are part of the program flow associated with the step 396 of create opportunities for activities and the step 402 of consider other opportunities shown in FIG. 8. The selections made at screen 618 (FIG. 22) narrow the opportunities to the only ones which are feasible. The selections made at screen 618 determine the program flow through the steps 396 and 402 shown in FIG. 8.

6b.2. Plans—FIGS. 23–26

Figure 23:
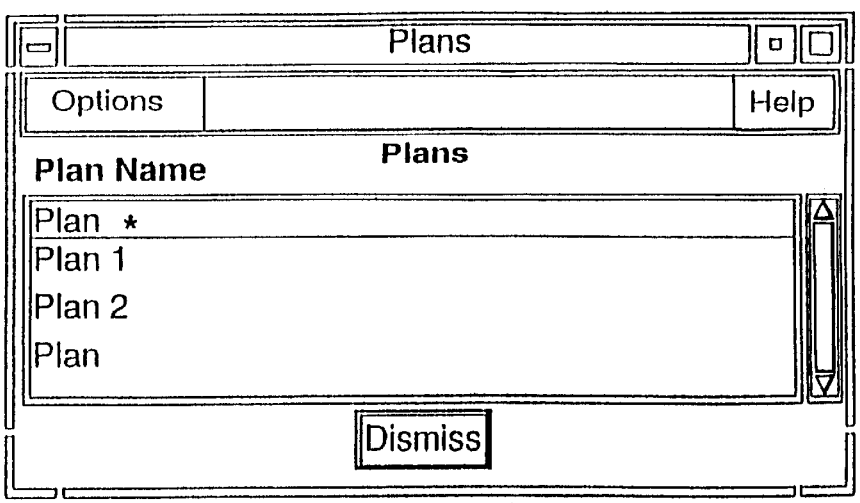

Upon selecting "plans" from the options menu 602 (FIG. 14), a list of all plans in the system is presented, as is shown on a plans list screen 620 shown in FIG. 23. The "*" denotes the active or default plan upon which orders are scheduled. After selecting the active plan, an options choice is presented with respect to the selected plan. The options are shown in screen 622 in FIG. 24. The options available from screen 622 allow a plan to be created, copied, edited, deleted, and merged with another plan. In addition, a default plan can be set.

Figure 24:
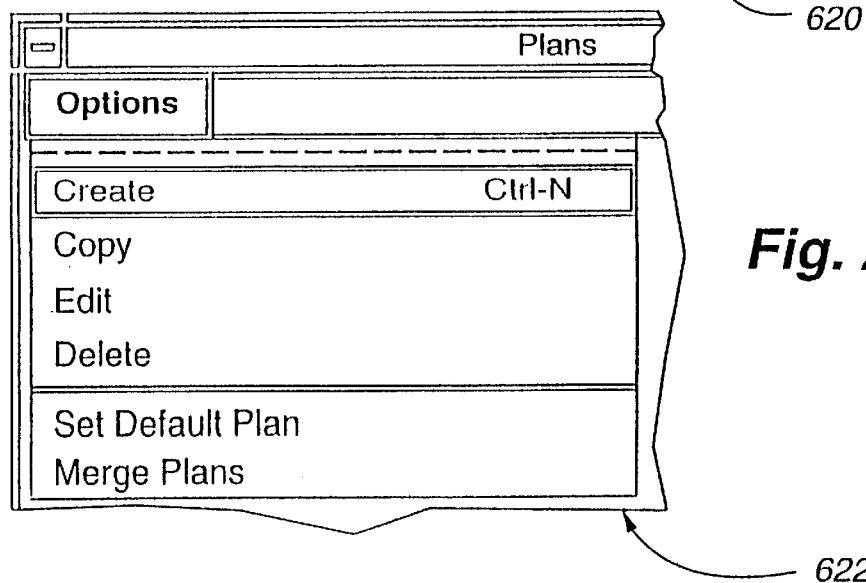
Figure 25:
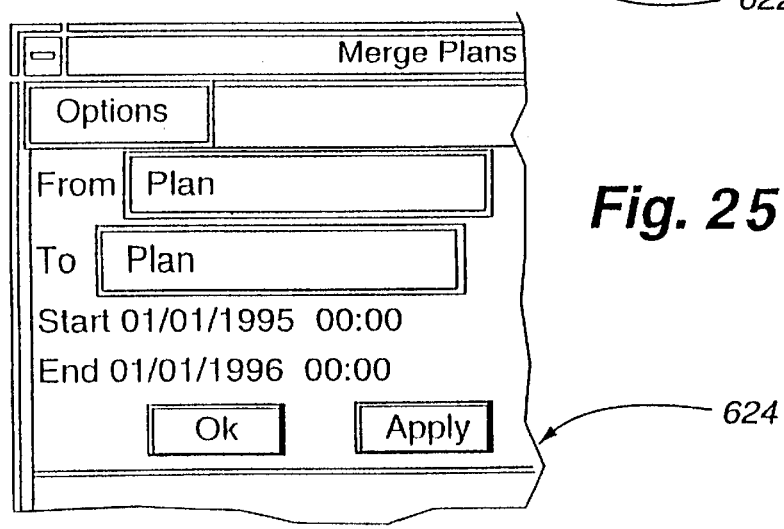

Selecting merge plans from screen 622 (FIG. 24) results in the screen 624 being presented as shown in FIG. 25. Screen 624 allows the user to select a starting plan designated as the "from" plan to be merged into a new plan designated as the "to" plan. After merger of the plans, the merged plan is dealt with similarly to any existing plan.

Figure 26:
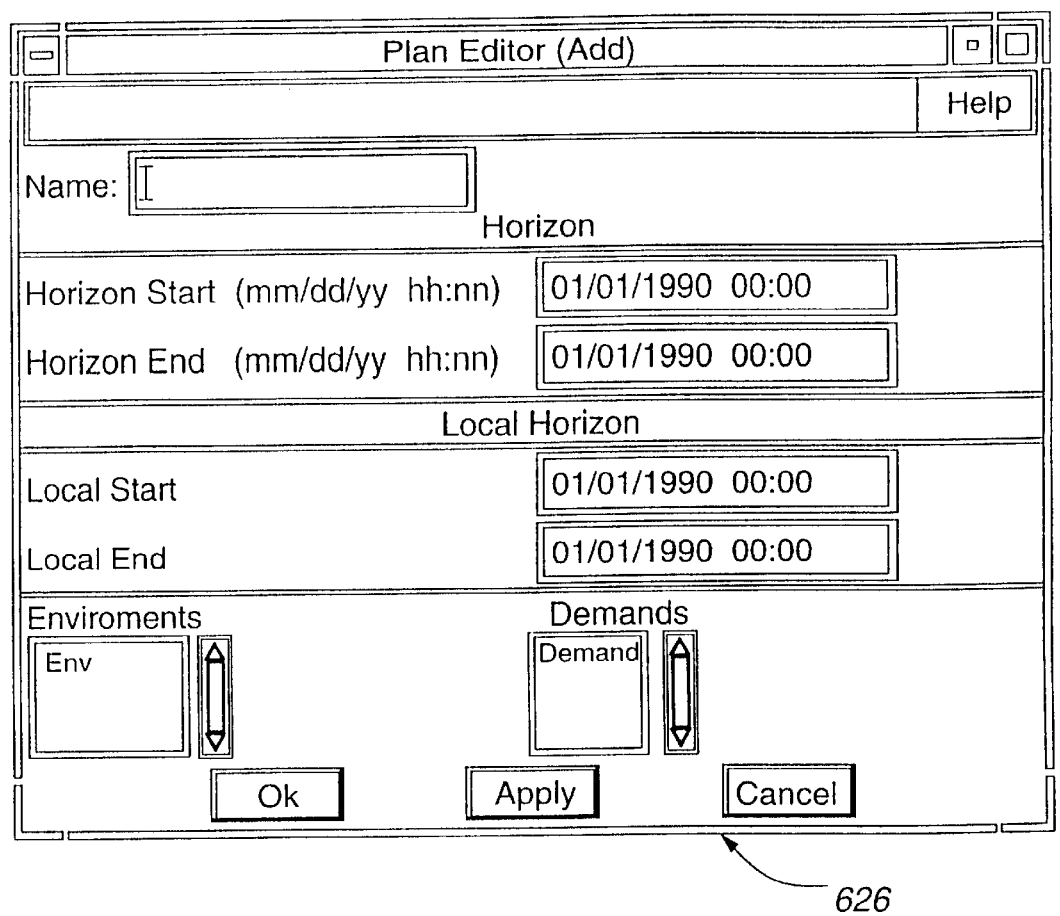

The default plan, or any other plan created or copied, may be edited by selecting "edit" from screen 622 (FIG. 24). Upon making the edit selection, screen 626 shown in FIG. 26 is presented. Screen 626 is divided into three parts. One part relates to the horizon start and end dates, the second part relates to the local start and end dates, and the last part describes the associations of the plans to be edited with the demands and the environments. The horizon start and end dates describe the beginning and ending times during which resource states exist. The horizon start and end dates relate to the boundaries of time during which it is possible to schedule the plan. The local start and end dates are limited time points within the broader horizon defined by the horizon start and end dates which are used to narrow the entire time horizon. By utilizing the local start and end times, the amount of information to be considered is selectively reduced. Since each plan is associated with a list of environments and demands, those lists will be presented on screen 626. The resources associated with and used by the plan are shown in the environments list, and the orders associated with the plan are shown in the demands list. More details concerning the environments and demands lists are discussed below in Parts 6b.3 and 6b.4, respectively.

The activities associated with the plan are part of the "schedule demand" step 56 shown in FIG. 1. The program flow associated with the plan begins at step 202 and ends at step 203 in FIG. 4. The selections made at screens 622 and 626 (FIGS. 24 and 26) control this portion of the program flow. The plan created becomes the default plan indicated at step 203 in FIG. 4, and it is upon the default plan that the scheduling is made. The default plan is used at step 336 (FIG. 6B) to schedule activities. The horizon start and end times and the local start and end times, which are selected from screen 626, form part of the step 214 of schedule orders shown in FIG. 4.

6b.3. Environments

Selecting "environments" from the options menu 602 (FIG. 14) presents a list of all environments on screen 628, as shown in FIG. 27. After selecting environments from the list presented on screen 628, an options choice is presented with respect to the selected environment. The options are shown on screen 630 in FIG. 28. The options available from screen 630 allow the environment to be copied, edited or deleted. Electing to edit the selected environment results in the presentation of screen 632 shown in FIG. 29. An environment can be associated with any plan, and a plan can be associated with any demand. Screen 632 allows the environment to be associated with any plan, by applying the environment added or selected in the window to the plan shown in the lower part of the screen 626.

The functionality associated with the operations controlled by the user from the screens 602, 628, 630 and 632 are found in the program flow at the step 102 of create new environment, step 104 of choose default environment and step 106 of create new environment, all of which are shown in FIG. 2.

6b.4. Demands

Selecting "demands" from the options menu 602 (FIG. 14) presents a list of all demands in the system on a list screen (not shown) similar to the environments list screen 628 shown in FIG. 27. The only different will be that instead of presenting a list of environments, a list of demands will be presented. After selecting a demand from the list presented, an options choice is presented with respect to the selected demand. The options will be presented on an option screen similar to the screen 630 shown in FIG. 28. The options available from screen will allow the demand to be copied, edited or deleted. Electing to edit the selected demand results in the presentation of a screen similar to the edit screen 632 shown in FIG. 29. Just as an environment can be associated with any plan, a demand can be associated with any plan. The demand edit screen presented (not shown) allows the demand to be associated with any plan, by applying the demand added in a window to one of the plans shown. Once a demand has been selected, the default plan and the environments for the default plan are established.

The functionality associated with the operations performed by the user from the described screens that relate to the demands is found in the program flow at FIGS. 1, 3, and 4.

6c. Orders—FIG. 15

Figure 15:
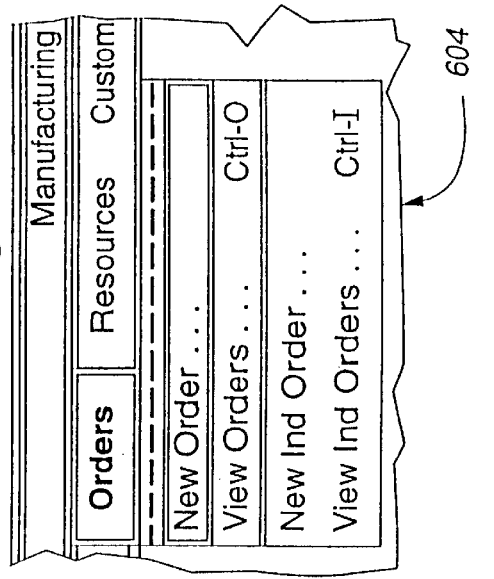

Selecting "orders" from the menu bar 601 of the main menu window 600 (FIG. 13) presents the user with screen 604 shown in FIG. 15. The screen 604 allows the user to accomplish the step 54 of defining the demand within the system. Demand is primarily determined by the orders which the business receives, and use of the orders screen 604 in the manner described below allows that information to be entered and manipulated by the user.

The subject matter categories of the orders presented in the screen 604 shown in FIG. 15 include "new order," "view orders," "new independent order" and "view independent orders." The subject matter associated with an order and with an independent order is generally similar. An order is intended to refer to a dependent order. Because of the similarity in subject matter, the screens presented for the dependent orders and for the independent orders are essentially the same. Therefore, the discussion of the orders presented below should be understood to also be applicable to the independent orders. The subject matter of the order (and independent order) categories is discussed below in conjunction with FIGS. 30–38.

6c.1. Orders List—FIG. 30

Selecting any of the subject matter categories shown in screen 604 (FIG. 15) results in the presentation of a list of orders on the screen 634 shown in FIG. 30. The screen 634 is presented if a new or independent order is to be added, or if a new or independent order is to be viewed. Each order has a name, status, a start date and an end date. Each order also includes associations which relate to names and types of the order, both of which are also presented in screen 634. Names and types of orders are established by the user and are particularized to the user's business.

6c.2. Filter and Sort—FIGS. 31–32

Because there may be hundreds or thousands of orders recorded in the system, the numbers of orders presented on a window 635 of the screen 634 may be quite large. The numbers of orders therefore may make it difficult for the user to find a desired order from the extensive list. To assist the user in locating the desired order, the capability to filter and sort the list of orders is presented. The filtering capability is obtained by selecting "filter," resulting in the presentation of a screen 636 shown in FIG. 31. The sorting capability is obtained by selecting "sort," and the sort selection results in the presentation of a screen 638 shown in FIG. 32. The filtering and sorting capability are provided as a means to manage and manipulate the information available to the user.

The "filter" screen 636 shown in FIG. 31 offers the user the capability of filtering based on criteria selected by the user. A typical filtering criteria is the "scheduled" or "not scheduled" status of the order. Selection of one of these filtering criteria limits the list of orders in window 635 to those which are scheduled or not scheduled. After selecting the desired criteria, the "filter" functionality is selected and the orders on the list in the window 635 are limited accordingly. Filtering in this matter results in the presentation of the order list of the scheduled or unscheduled orders.

From the list of scheduled or unscheduled orders, further filtering criteria can be applied in the form of the name of the order or the type of the order, as allowed in the windows 640 and 642 presented at the bottom of screen 636. The user types or enters the name of the order in window 640, and those orders which are then presented in the main window 635 are further limited to those having the name entered at window 636. A similar filtering criteria based on the type of the order is also available by entering the type in the window 642 and selecting the filtering capability.

If the filtering criteria selected by the user is incorrect, or if the user has made an error, or if filtering criteria does not result in a meaningful limitation, the user may select the "reset" functionality from the screen 636. Selecting the reset capability restores the list of orders in the main window 635 to its previous status prior to the immediately preceding filtering attempt.

Figure 32:
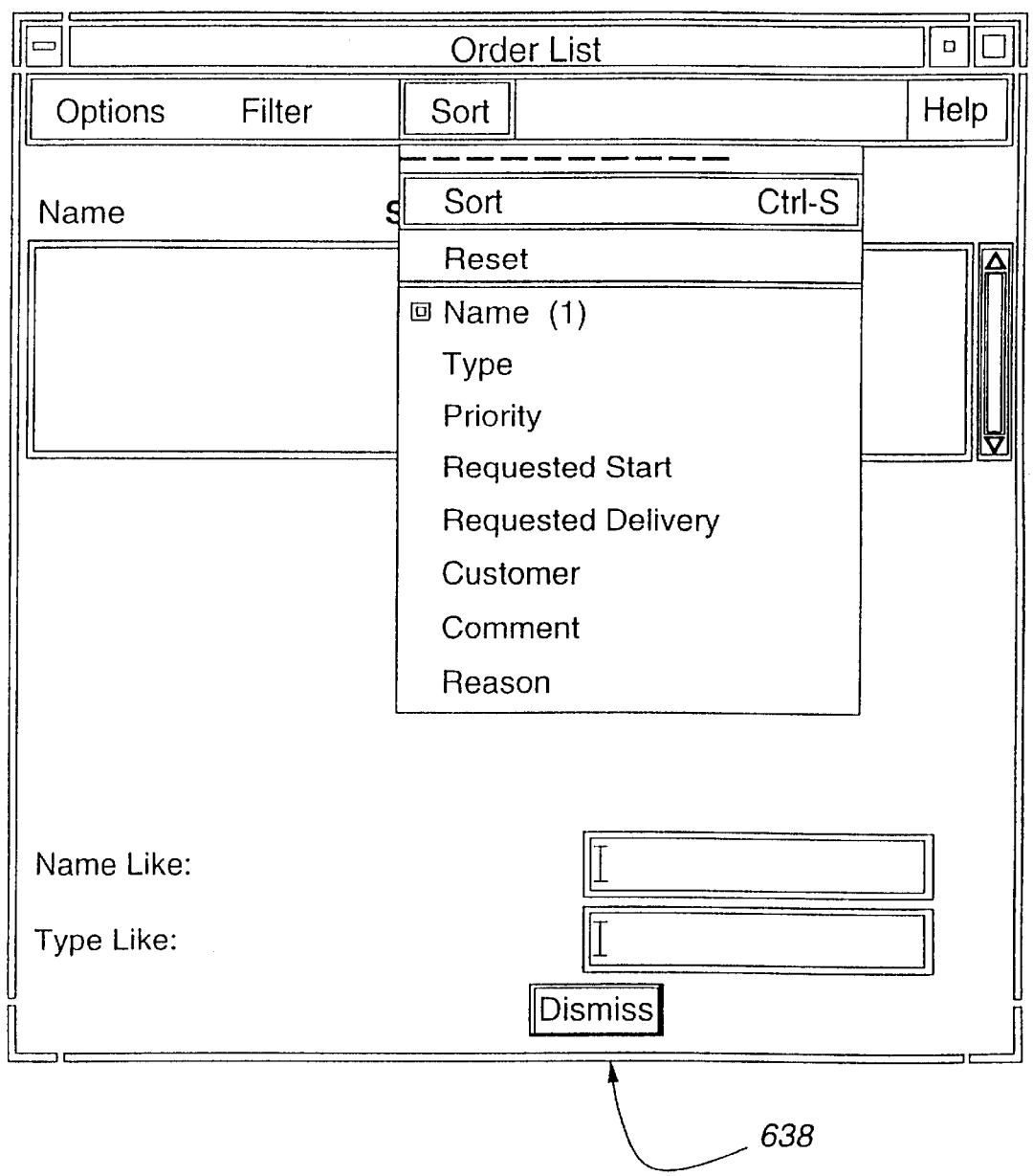

Selection of the sort capability from the orders list presented in screen 634 results in the presentation of screen 638 shown in FIG. 32. Screen 638 offers the user the capability of sorting the orders based on criteria selected by the user. Sorting is a function of reordering or reorganizing the sequence in which the orders are presented in the main window 635. Those orders may or may not have previously been filtered.

Typical sorting criteria for the orders may be the name of the order, the type of the order, the priority associated with the order which the user will determine upon entry of the order into the system, the requested start time for producing the order, the requested delivery time for delivering the order, the name of the customer, any comments associated with the order which the user may add when the order is entered into the system, and reasons associated with the order which the user may enter.

After the appropriate sorting criteria is selected, the sorting functionality is accomplished by the user selecting "sort." If the sorting criteria is not helpful, or if it is in error, or for any other reason that the user may desire, the list of orders presented in its previously existing form may be obtained on the main window 635 by selecting the "reset" functionality.

The filtering and sorting functionality described in conjunction with FIGS. 31–32 is also generally replicated in many of the other screens discussed below in conjunction with the GUI. The filtering and sorting capability is essentially similar to that which has been described, although the criteria applied for the filtering and sorting capabilities in those other screens may differ from the criteria described in FIGS. 31–32. Nonetheless, the essential functionality associated with the filtering and sorting capability is similar to that described.

6c.3. Options—FIG. 33

Figure 33:
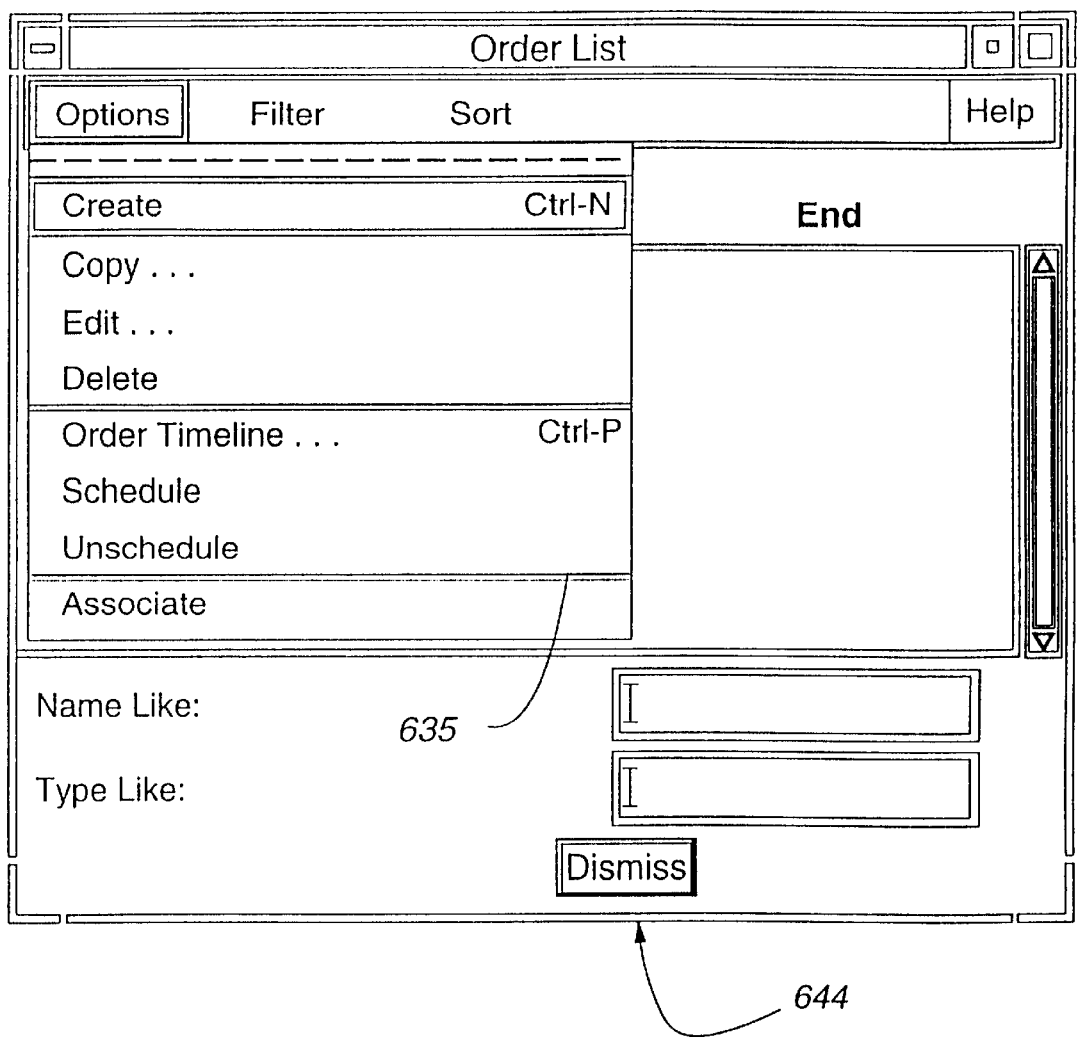

Selection of the "options" capability from the orders list presented in screen 634 results in the presentation of screen 644 shown in FIG. 33. Screen 644 offers the user the capability of creating, copying, editing, deleting, scheduling, unscheduling or associating an order. In addition, the function of displaying the order timeline may also be selected from the options presented on screen 644. The order to which these functions is applied is one which is displayed on the main window 635. This order may have been identified through the use of the filtering and sorting functions previously described.

6c.3.1. Order Editor—FIG. 34

Figure 34:
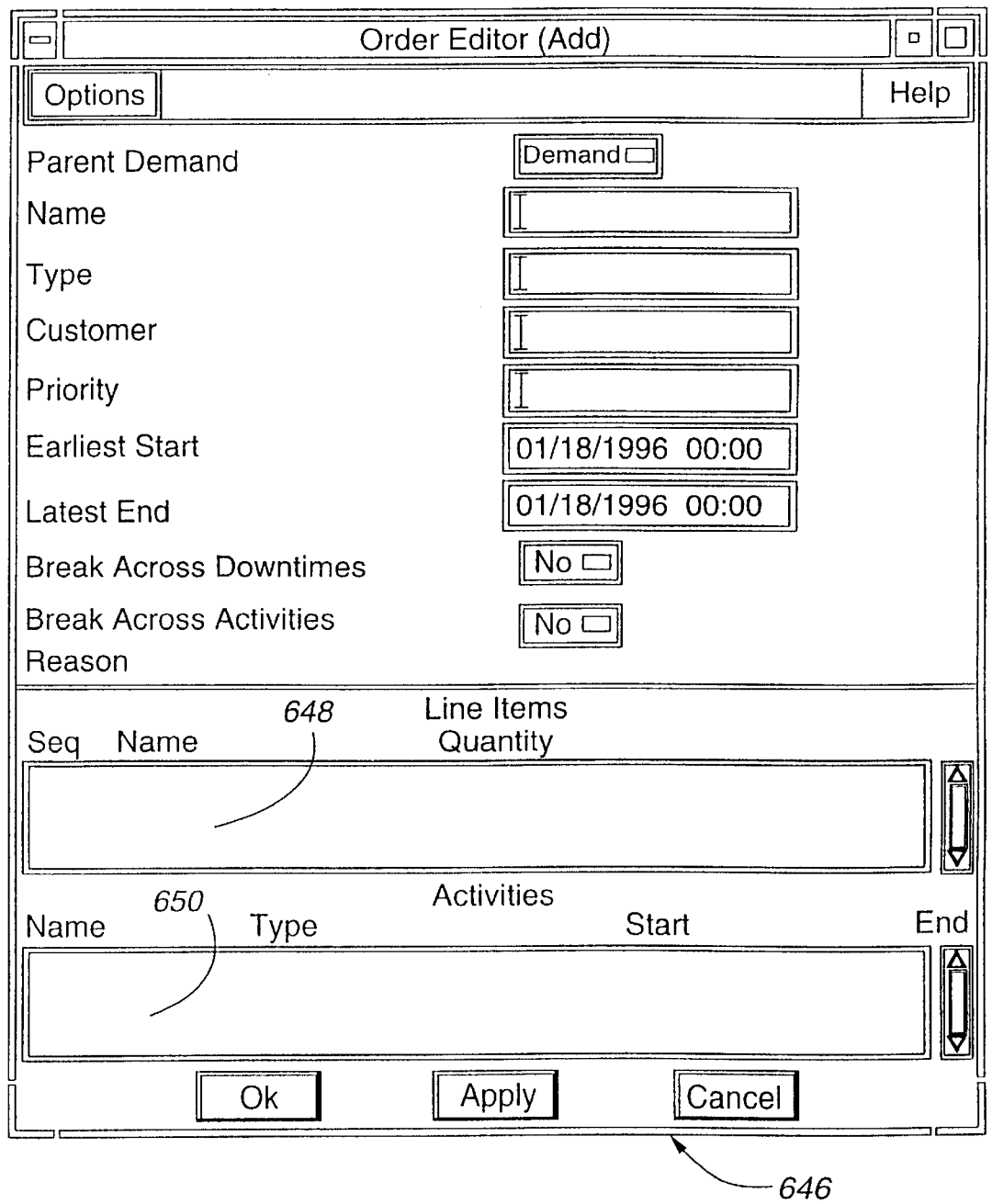
Figure 35:
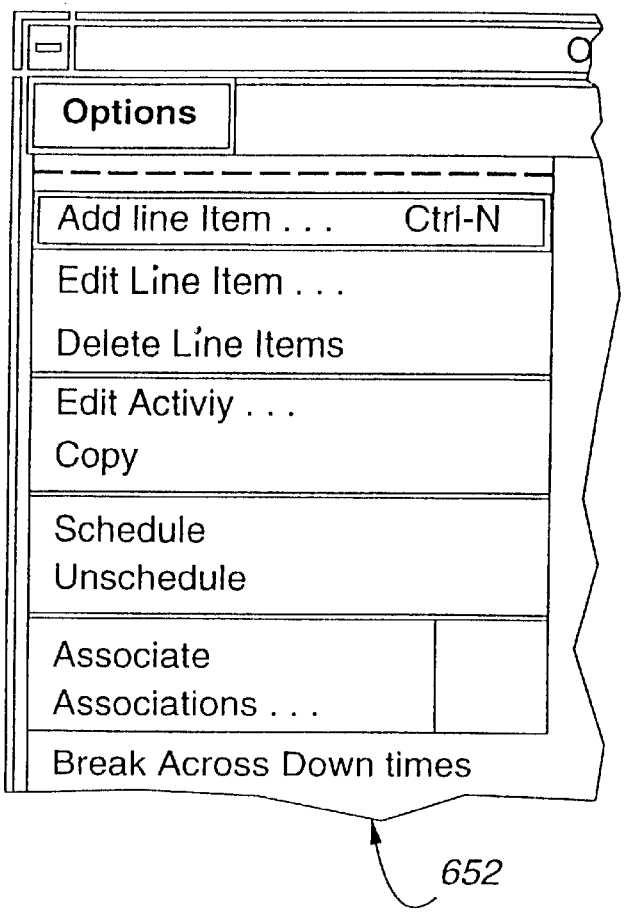
Figure 36:
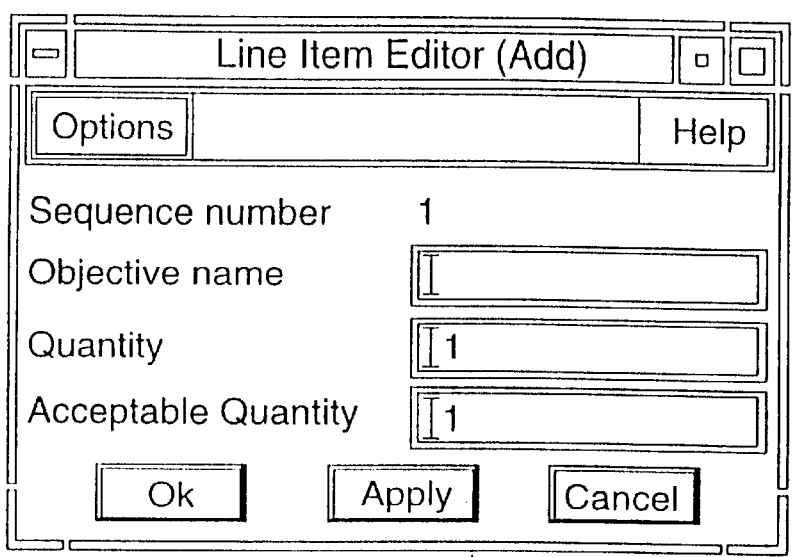

To create or to edit an order, the user selects the appropriate function from screen 644, and that selection results in the presentation of the order editor screen 646 shown in FIG. 34. The order editor screen 646 presents the user with the capability to enter information associated with the order, as would be the case when a new order is entered or when a pre-existing order is added. The information associated with the order includes an opportunity to link the individual order with a parent demand. Setting a flag for the particular order links it to its parent demand.

The name of the order, the type of order, the customer's name, and the priority associated with the order are then entered by the user when a new order is created, or this information is presented when a pre-existing order is edited. Similarly, an earliest start time for producing the order and a latest end time for producing the order may also be entered or displayed, depending upon whether a new order is created or a pre-existing order is edited.

The user has the option of selecting to break across downtimes. Downtimes are those times during the operation of a business, for example during a weekend, when the business or the resource upon which the order is scheduled is normally not in use. Breaking across downtimes would be selected if the user knows that the normal downtime would not be applicable to the order or if the user anticipates taking action so that the downtime will not be applicable, among other reasons.

A similar selection is available to allow breaking across activities. Breaking across activities allows the user to schedule orders when some of the activities needed to complete the order are not scheduled to be accomplished. Breaking across activities is selected when the user knows or anticipates that the normally unacceptable break in the activities can be overcome for whatever reason. Reasons for the break in downtimes and in activities can be entered as an explanation.

Obviously, breaking across downtimes and across activities may present additional opportunities to schedule an order. In some circumstances, breaking across downtimes and activities may provide the user with the only opportunity to schedule the order.

Once the information associated with the order has been entered, the line items associated with the order can be viewed in the window 648 of the screen 646. A sequence of activities for each line item may also be viewed at window 650 of screen 646. The name, type, start date and end date of each activity is presented. For those orders which have not been scheduled, no activities will appear in window 650 of screen 646.

After having identified or entered the order from the screen 646 shown in FIG. 34, the edit options associated with that order can be invoked by selecting edit options from a menu bar associated with the screen 646. An options selection results in the presentation of a screen 652 shown in FIG. 35. The options include adding, editing or deleting a line item, editing an activity, copying the order, scheduling or unscheduling the order, associating the order with another order, and selecting the associations with which the order may be made.

Adding, editing and deleting the line items is accomplished with respect to those line items shown in the window 648 in FIG. 34. The functions of adding, editing and deleting are accomplished through the use of a line item editor presented in screen 654 shown in FIG. 36. The sequence number is presented, and the user enters the objective name, the quantity and the acceptable quantity associated with the line item to add, edit or delete. It is in this manner that the line items may be established in the order.

6c.3.2. Order Timeline

Another option which can be selected from screen 644 shown in FIG. 33 is the option of showing the order timeline. The order timeline is a Gantt-like chart which displays the schedule for the order relative to a time window during which the order is produced. A display of this order timeline is not presented, because Gantt charts are conventional.

6c.3.3. Order Associations

Figure 37:
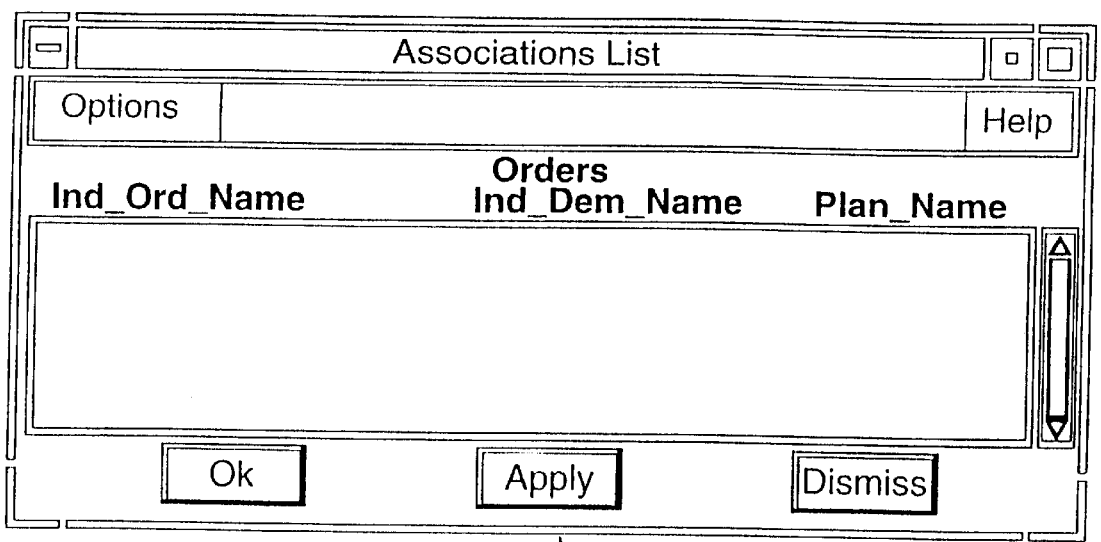
Figure 38:
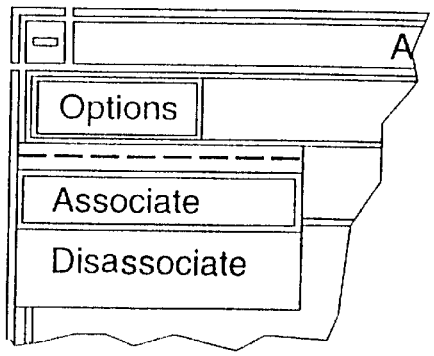

Another option which may be selected from the screen 644 shown in FIG. 33 is "associate." Selecting "associate" results in the presentation of a list of associations with which the order is related, and that list is shown on screen 656 shown in FIG. 37. Each of the associated independent orders, independent demands and plans are named on the list shown on screen 656. Selection of the options available from screen 656 results in the presentation of screen 658 shown in FIG. 38. The independent orders may be associated or disassociated with a dependent order by making the selection presented on screen 658.

As mentioned above, the features associated with the new and existing independent orders presented on screen 604 shown in FIG. 15 are similar to those which have been described in conjunction with FIGS. 30–38. Since this functionality is essentially the same as that for independent orders, a description of the independent orders will not be presented.

The functionality described in conjunction with FIGS. 30–38 is generally associated with the step 212 of choose orders to schedule shown in FIG. 4 and with the step 158 of create orders in demand shown in FIG. 3.

6d. Resources—FIG. 16

Selecting "resources" from the menu bar 601 of the main menu 600 shown in FIG. 13, allows the user to accomplish the step 52 of describing the environment of the business within the software (FIG. 1). The environment includes the resources available to the business to accomplish its objectives. Before the software of the present invention is effective in providing FCP solutions to MS problems, the particular information associated with the environment of the business must be entered. The screen 606 shown in FIG. 16 is the upper level screen of the GUI for controlling the entry and manipulation of the information relating to the resources.

Figure 16:
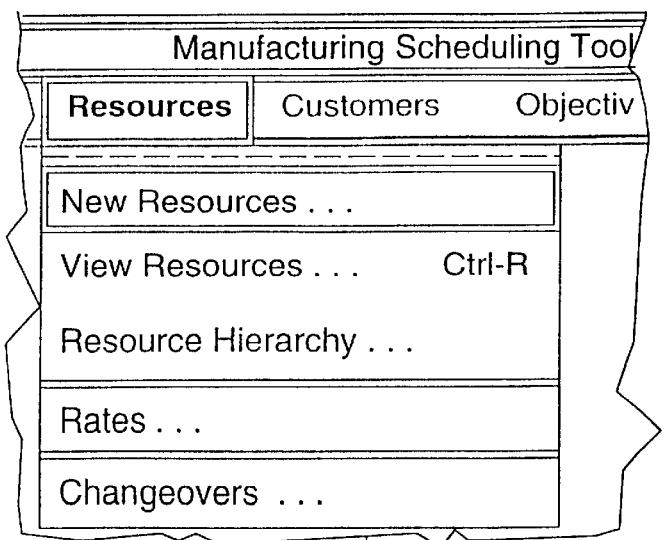

The subject matter categories of resources presented in screen 606 shown in FIG. 16 include the capability to add a new resource, to view existing resources, to obtain and edit information describing a hierarchy of resources, to obtain and edit information describing the rate at which resources are consumed or degenerated, and to obtain and edit information concerning changeovers.

6d.1. Resource List

Upon selecting either the new resource or the view resource from the screen 606, a resource list screen (not shown) is presented to the user. The resource list screen is similar to the screen 635 shown in FIG. 30, except that the resource list screen identifies the resources by name, by name like and by type like.

6d.2. Filter and Sort

The resource list screen also includes the capability to filter and sort the resources listed. Selecting the filtering and sorting capability results in the presentation of filtering and sorting screens similar to those screens 636 and 638 shown in FIGS. 31 and 32, respectively, except that the information to be filtered and sorted relates to resources rather than orders. Filtering criteria for the list of resources are parentless resources, childless resources and infeasible resources. Parentless resources are those which do not depend upon the existence of other resources for their existence. Childless resources are those which have no other resources which depend upon them for existence. Infeasible resources are those which are impossible or improbable of existence. The sorting criteria available for the resource list include name, type and constraint. For both filtering and sorting, name like and type like capabilities are also available.

6d.3. Option—FIG. 39

Figure 39:
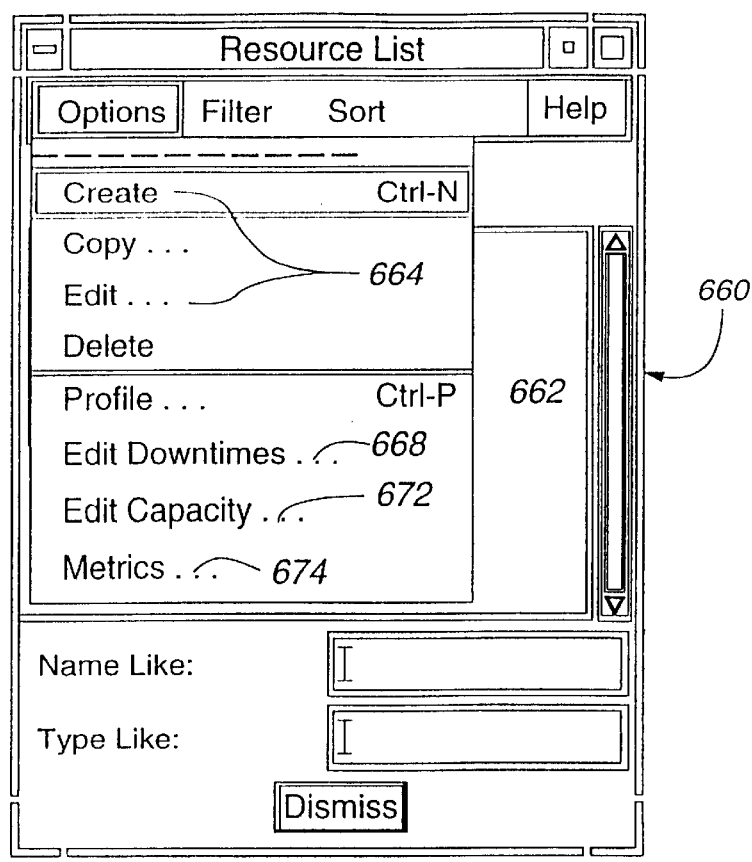

The resource list screen, like the order list screen 644 shown in FIG. 33, also includes user-selectable options. Upon selection of the options associated with the resource screen, a list of functions is presented as shown in the screen 660 shown in FIG. 39. The list of functions include the ability to create, copy, edit, and delete the resources. The functions also includes options to view a profile of the resource, to edit the downtime associated with the resource, to edit the capacity of the resource, and to display metrics or other parametric information associated with the resource. The screen 660 shown in FIG. 39, is thus the resource list screen upon which the noted functional capabilities are superimposed in a window 662.

6d.3.1. Resource Editor—FIG. 40

Figure 40:
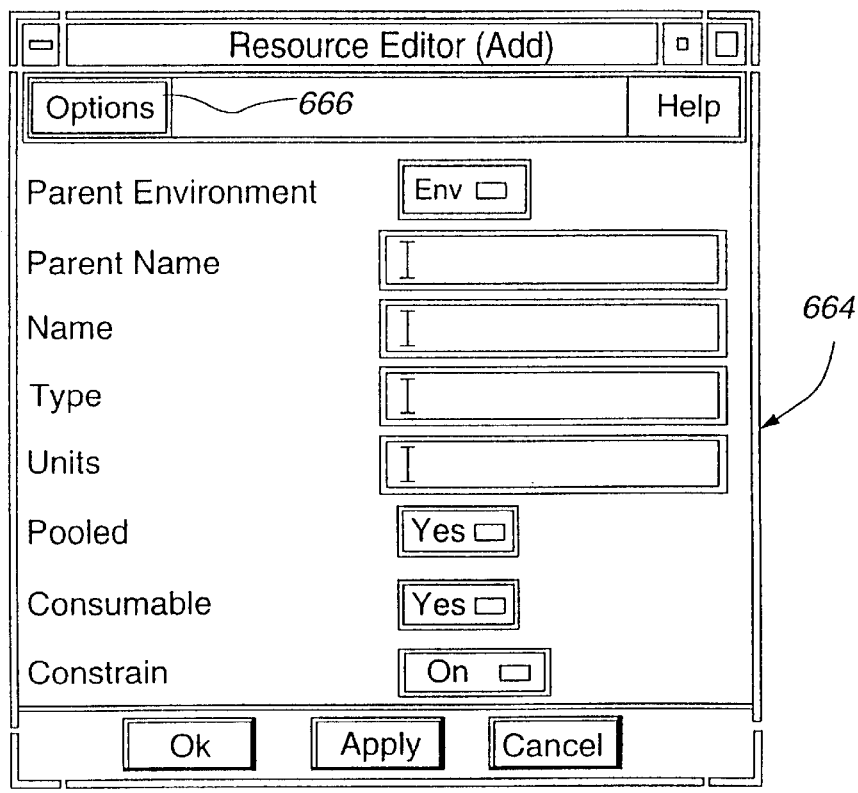

The ability to create or edit a resource is obtained from a resource editor screen 664 shown in FIG. 40. The resource editor is used to establish the information which describes the resources of the user's particular business. The resource editor screen 664 is similar in appearance and function to the order editor screen 646 shown in FIG. 34. Windows in the screen 664 are available for the user to enter the parent name, name, type and units of the resource. From this information, the amount and the relationship of the resource to the business is defined. In addition, the user may select a parent environment which associates a resource with the selected environment. The user may also identify the resource as a pooled resource. A pooled resource is one which is available from a larger pool or quantity of the resource. A consumable resource is one which is used up, and a resource which is not consumable may be one which is an objective of the manufacturing processed, meaning that the non-consumable resource is generated by the operation of the business. Constraints may be turned on or off with respect to each particular resource and this selection becomes the default selection for the resource when used for scheduling.

6d.3.2. Resource Timeline

Figure 41:
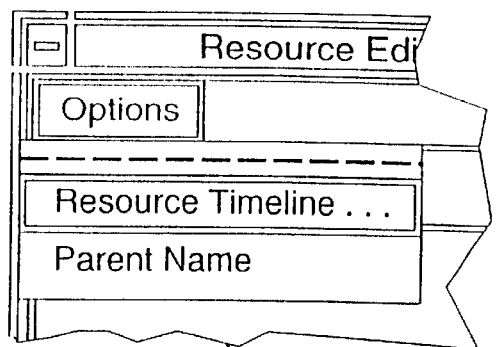

An option from the resource editor screen 664 shown in FIG. 40 is to obtain a resource timeline, as shown by the screen 666 shown in FIG. 41. A resource timeline is essentially a Gantt-like chart which profiles the status of the resource over time. A screen illustrating the Gantt-like resource timeline is not shown because it is conventional.

6d.3.3. Resource Profile

The information available from the profile option shown in FIG. 39 on screen 660 is also similar to a Gantt-like chart. A screen showing the information presented from the profile option is also not shown for the same reasons that it is substantially conventional.

Figure 42:
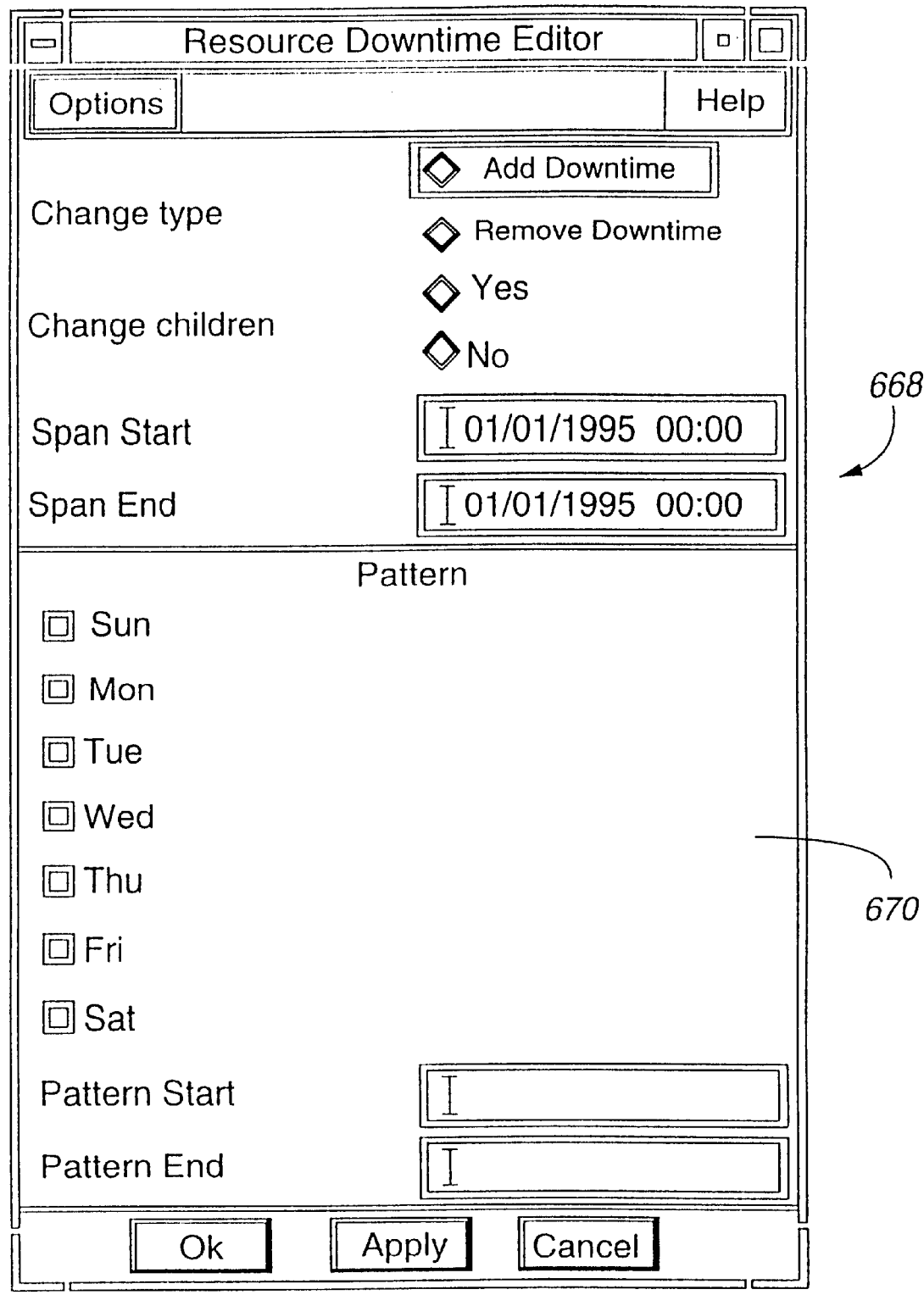

Selecting the edit downtimes option from the screen 660 shown in FIG. 39 results in the presentation of screen 668 shown in FIG. 42. By use of the screen 668, the user can change the type the resource by adding downtime or by deleting downtime. The children associated with the resource can be changed. A window is provided for the user to enter information concerning the time span of start and end of the resource consumption. A repetitive weekly pattern of consumption of the resource may be established by entering a start time and an end time for the pattern in a window portion 670 of the screen 668. The days during which the pattern is effective are then selected on the screen portion 670.

6d.3.5. Resource Profile Editor—FIG. 43

Figure 43:
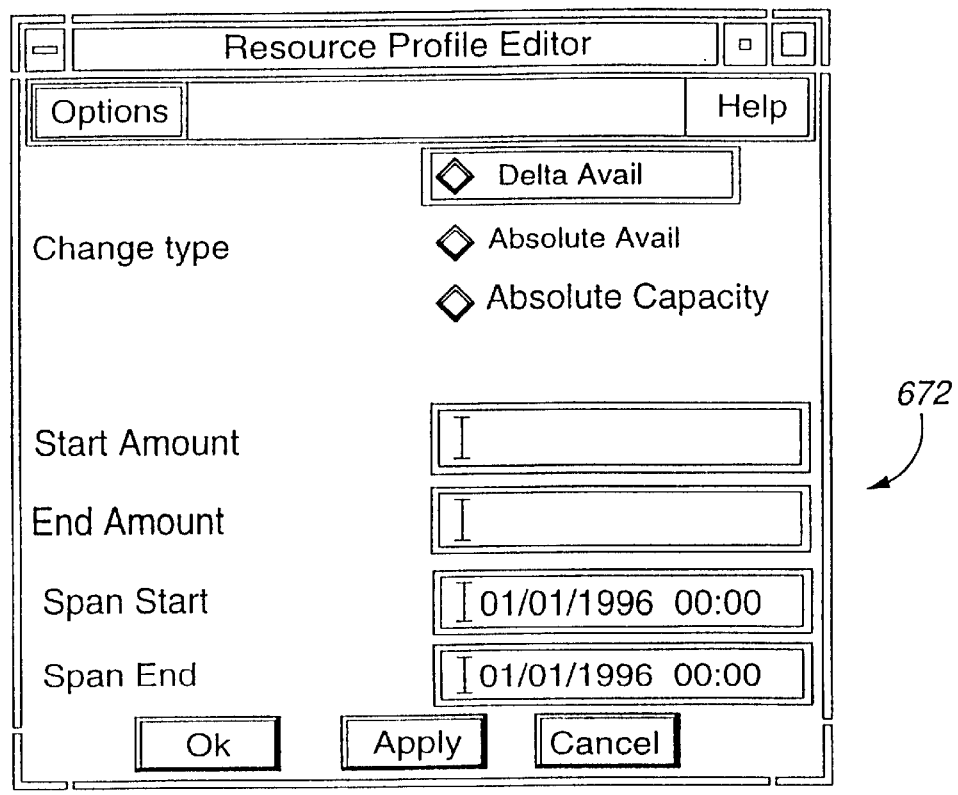

To edit the amount or capacity of a resource from screen 660 shown in FIG. 39, a screen 672 is presented to the user in the form shown in FIG. 43. Windows are presented for the user to enter the start amount of the resource and the end amount of the resource. The span of time during which the resource will be consumed is entered in a start window and in an end window. The type of the resource can also be changed to one which is based on a change in availability of the resource, one which is based on absolute availability of the resource and one which is based on absolute capacity.

6d.3.6. Metrics Editor—FIG. 44

Selecting the option of "metrics" from the screen 660 results in the presentation of a screen 674 shown in FIG. 44. Screen 674 displays information associated with the selected resource. The information may be established by the user, but in general this information describes how well resources are used and how well demand is met.

The functionality associated with the screens presented in FIGS. 39–44 represents the functions associated with the step 52 of describe environment within the program flow 50 shown in FIG. 1.

6e. Customers—FIG. 17

Selecting "customers" from the menu bar 601 of the main menu 600 (FIG. 13), is the first step in defining the demand shown at step 54 (FIG. 1). Demand is primarily determined by the orders which the business receives. The orders originate from customers, therefore customers are an integral part.

6e.1. Customer List

Figure 17:
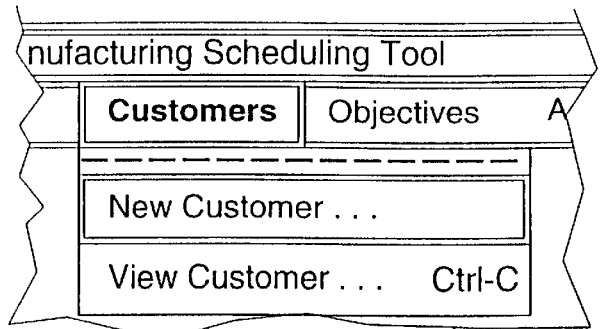

The selections available on the "customers" screen 608 shown in FIG. 17 are to view existing customers or to add new customers. Selection of either of these options presents the user with a customer list screen which contains the names of customers. The customer list window is not shown because it is similar to the resources list screen and the orders list screen previously describe. In addition, the customer list screen includes a window where the name of a new customer may be added.

6e.2. Filter and Sort

The capability to filter and sort the customer list is also an option from the customer list screen. The filtering and sorting capability is similar to that which has previously been described in conjunction with the order lists and the resources lists. The filtering capability is by name, and the sorting capability is by name and priority.

6e.3. Options

Options from the customer lists screen are to create, copy, edit and delete the customers. To create or edit customers, a customer editor screen (not shown) is presented. The customer editor screen allows the user to enter a name of a customer and to assign a priority to that customer. The priority assignment is one which the user selects based on the relative importance of that customer to the user's business. The customer editor screen is similar to the other editor screens described above, and is therefore not shown.

6f. Utilization Structure

The user invokes the utilization structure by selecting "objectives," "actuals" and "activities" options from the menu bar 601 of the main menu 600 (FIG. 13). Invoking the utilization structure is part of scheduling the demand shown at step 56 in FIG. 1 and describing the utilization structure as shown at step 110 in FIG. 2.

Figure 18:
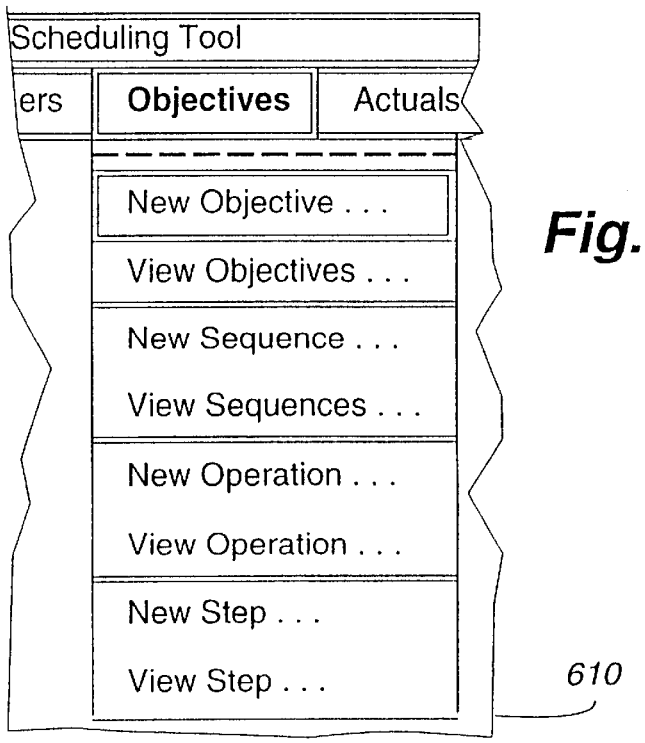

The utilization structure is entered by selecting the "objectives" from the main menu 600 (FIG. 13). The screen 610 is presented to the user as shown in FIG. 18. The screen 610 illustrates the steps of the utilization structure. Objectives can be added as "new objectives," or pre-existing objectives can be edited by selecting the "view objectives." Sequences are used to create the objectives according to the utilization structure, and those sequences can similarly be viewed or added from the screen. Operations form the sequences, and the operations can be viewed or added from screen 610. Similarly, the steps which form the operations may be added or viewed from screen 610. Responses to the selection of any of the features shown in screen 610 (FIG. 18) are described below.

6f.1. Objectives

Objectives are evoked by selecting either the "new objective" or the "view objective" selections from the screen 610 (FIG. 18). In response, an objective list is presented on a screen to the user.

6f.1.1. Lists, Filter and Sort, and Options

The objective list screen is not shown because of its similarly to the other list screens previously described. A filtering and sorting capability is also providing with respect to the list of objectives presented. Again the filtering and sorting capability is similar to that previously described. Options associated with the objectives presented in the list are to create, copy, edit and delete the objectives shown on the list presented in the objective list screen. Again, these options are similar to those which have been described previously with respect to other list screens. The lists screens, filtering and sorting screens and the option screens are not shown.

6f.1.2. Objective Editor—FIG. 45

Figure 45:
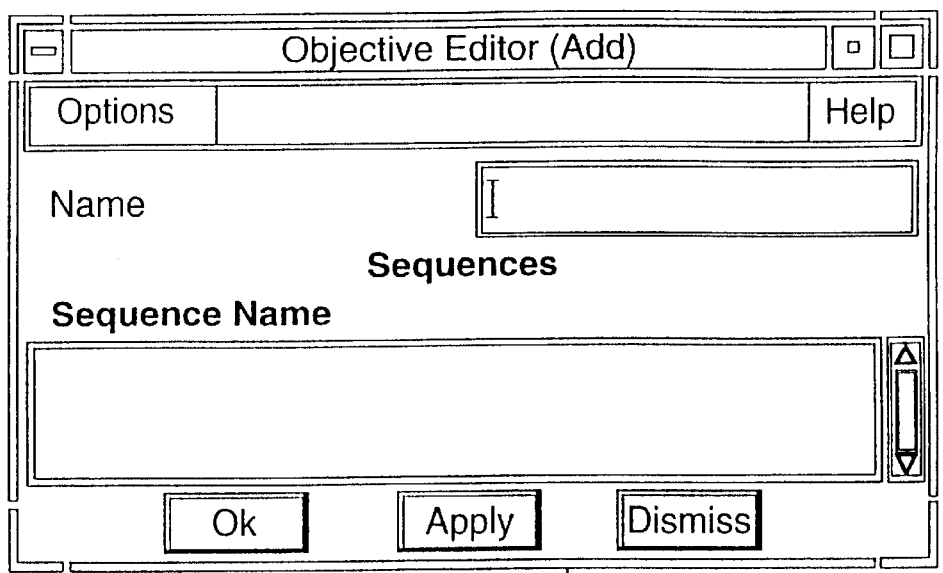
Figure 46:
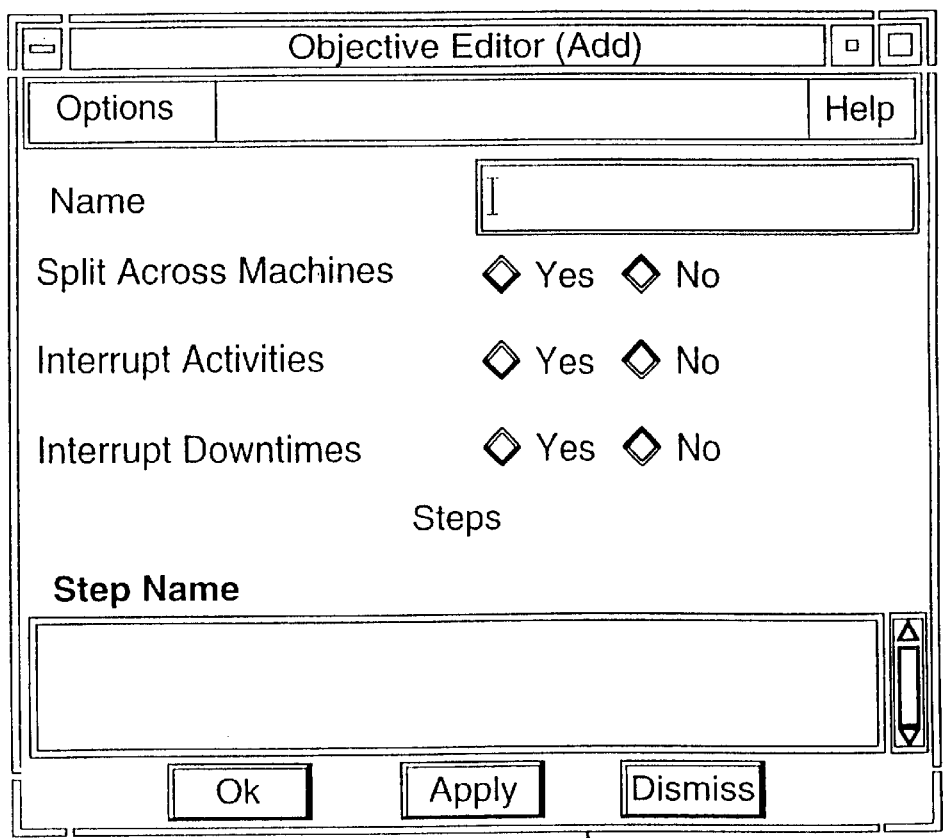

Upon electing to create or edit an objective from the objective list, an objective editor screen 676 shown in FIG. 45 is presented to the user. The objective editor screen 676 presents a list of sequences which are required to accomplish the objective. Because utilization is a multi-tiered structure, editing the objective requires that the sub-parts of that multi-tiered structure be first identified. Thus, the objective editor screen 676 presents a list of the sequences associated with the objective. Those sequences are identified by name. A window is presented to the user for adding a new sequence to an objective if required.

6f.2. Sequences

Options associated with the objective editor screen 676 are to obtain a list of sequences on a sequence list screen (not shown). The sequence list screen is similar to the other list screens described above, and contains options for filtering and sorting. Other options from the sequence editor screen are to create, copy, edit and delete a sequence from the list presented.

Upon selecting the option to create or edit a sequence on the list, a sequence editor screen (not shown) is presented. The sequence editor screen is similar to the objective editor screen 676 shown in FIG. 45, except that the sequence editor screen shows operations rather than the sequences shown on the objective editor screen 676. Of course, operations are shown on the sequence editor screen because the operations are the next sub-part below the sequences in the utilization structure.

6f.3. Operations

From the sequence editor screen, lists of operations are presented in a operation list screen (not shown). The operations shown on the operation list screen may be filtered and sorted in the manner similar to that previously described. The operations may also be optionally created, copied, edited and related. Creating or editing an operation results in the presentation of an operation editor screen 678 shown in FIG. 46.

6f.3.1. Operations Editor—FIG. 46

The operation editor screen 678 presents a list of steps associated with the operation. The steps associated with the operation are those constituting the next lower tier of the utilization structure for that operation. In addition to the steps presented in the operation editor screen 678, a window is available for the user to add or select the name of the step.

Further still, the operation editor screen 678 allows the user to determine whether the step is to be split across machines. This capability allows the step to be partially performed on one machine and completed on one or more additional machines. Not allowing the step to be split across machines requires the step to be completely performed by one of the machines. Similarly, the user can select to interrupt activities and downtimes. These functions are essentially the same as break across downtimes and break across activities, which have previously been described in conjunction with the order editor shown in FIG. 34. If those flags are set not to allow these breaks, then none of these child activities will be allowed to break. For example, if the break option is allowed, the operation may be performed on multiple different machines or the operation is performed on the same machine but may be discontinued over the weekend.

6f.4. Steps

From the operation editor screen 678, selecting the options results in the presentation of a steps list screen (not shown). The steps list screen is similar to the other list screens described above. The steps list screen also provides the capability for filtering and sorting the steps listed on the screen. In addition, steps can be created copied, edited and deleted from the steps list screen.

Creating or editing a step listed results in the presentation of a step editor screen (not shown). The step editor screen is similar to other editor screens described above, except that the step editor screen provides the names of requests and a window to add the name of a request associated with a step.

The functionality associated with selecting the option of "objectives" is associated with the step 110 shown in FIG. 2 of the program flow.

6g. Actuals—FIG. 19

Selecting "actuals" from the menu bar 601 of the main menu 600 (FIG. 13), allows the user to monitor or otherwise use the utilization structure. Information concerning activity actuals and resource actuals can be added to the system from the screen 612 shown in FIG. 19. In addition, information concerning pre-existing activity and resource actuals can be viewed.

When the option to view pre-existing actuals is selected, the actuals are presented on an actual list screen (not shown). The information concerning each actual in the list includes the name of the actual, the resource requirement ("req") associated with the actual, the amount of the actual and the time period of the actual. In this regard the actual list screen is similar to the other list screens discussed above.

The actuals from the actual list screen can be filtered and sorted in the same manner as previously described. In addition, options selected from the actual list screen are to create, copy, edit, delete and apply the actuals listed on the screen. These options are again similar to those which have been discussed above.

6g.1. Activity Actual Editor—FIGS. 47–48

Figure 19:
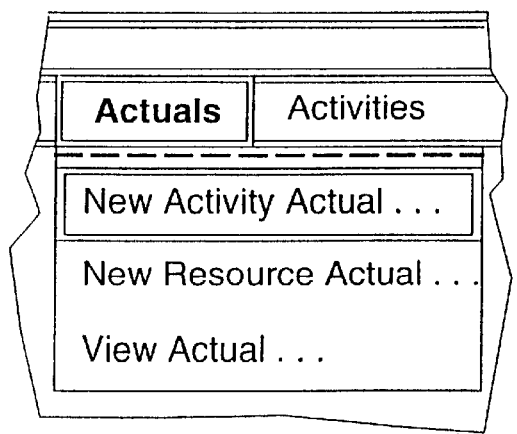
Figure 47:
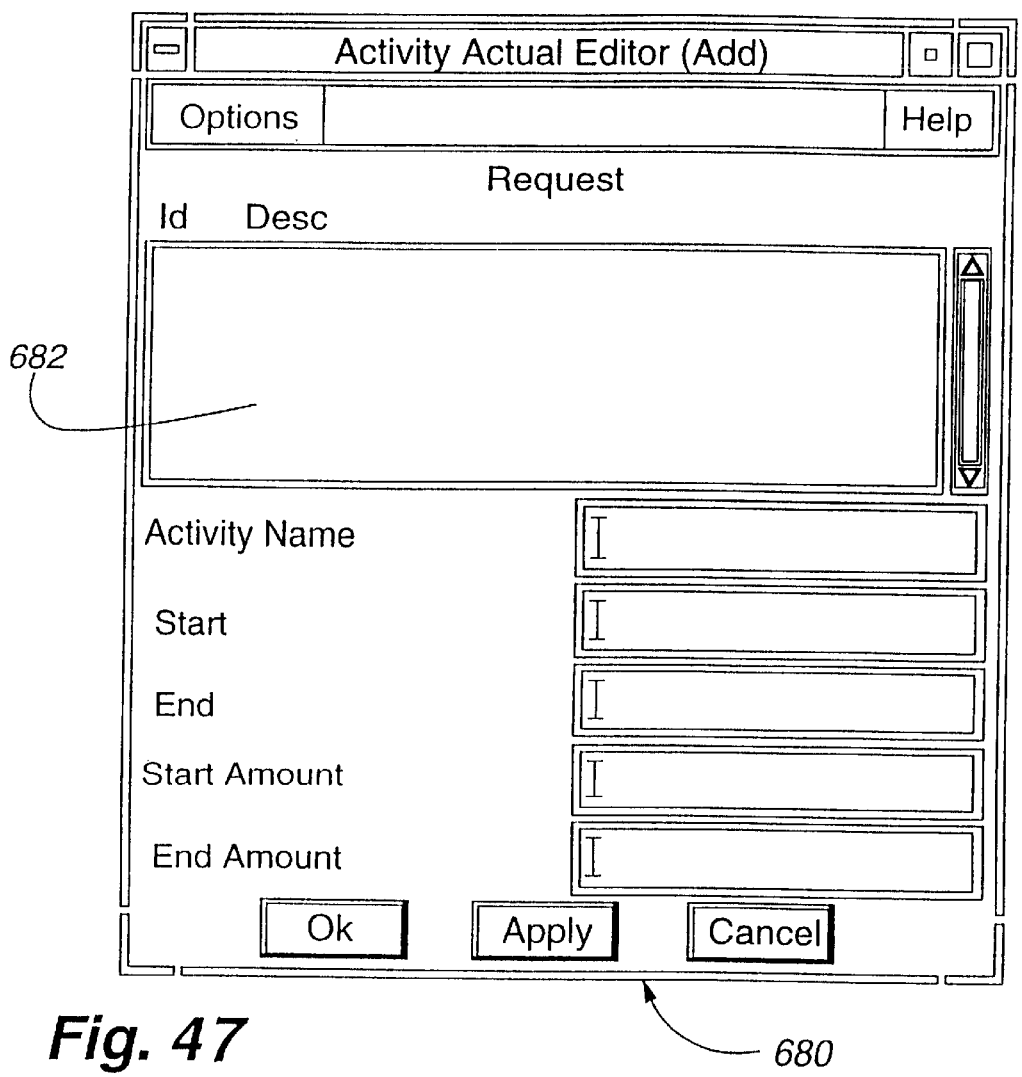
Figure 48:
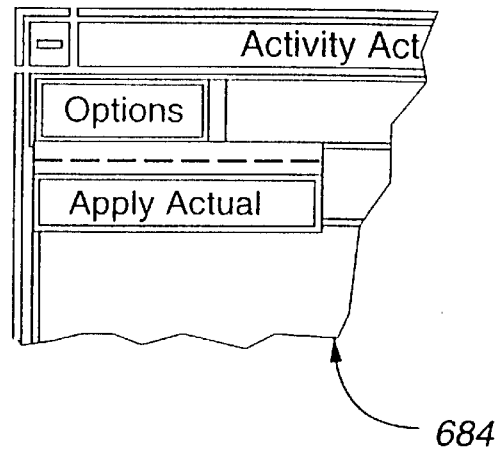

When an activity actual from the actual list screen is selected to be created or edited, or when a new activity actual is to be created from the screen 612 shown in FIG. 19, an activity actual editor screen 680 shown in FIG. 47 is presented to the user. The activity actual editor screen 680 includes windows for the addition of the activity name, the start date and end date for the activity, the start amount and the end amount of the activity. Furthermore, the screen 680 includes a window 682 for the identification and description of each request associated with the selected activity. Once the activity actual information is satisfactorily entered, it is applied for use by selecting an option of "apply actual" from a menu bar of the activity actual editor screen 684, as shown in FIG. 48.

6g.2. Resource Actual Editor

A resource actual editor screen (not shown) is presented to the user when the user selects a resource actual to be created or edited from the actual list screen (not shown), or when the user selects the option to add a new resource actual from the screen 620 shown in FIG. 19. The resource actual editor screen is similar to the activity actual editor screen 680 shown in FIG. 47, except that the resource actual editor does not include a window with information related to requests. The information available from the resource actual editor screen is the resource name, the start and end times for use of the resource, and the start and end amount of the resource. The resource actual which is created or edited is been applied by selecting an apply actual option similar to that at 684 shown in FIG. 48, thereby making that resource actual available for use in the system.

6h. Activities—FIG. 20

Figure 20:
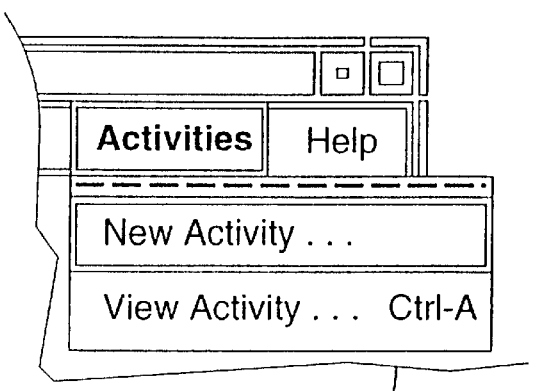
Figure 21:
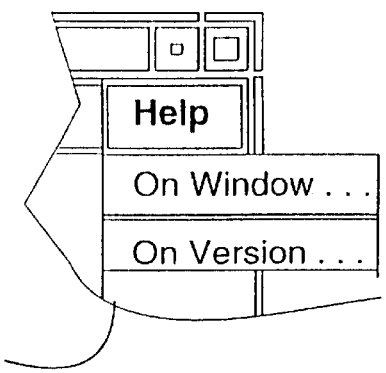

Selecting "activities" from the menu bar 601 of the main menu 600 (FIG. 13), presents the user with the screen 614 shown in FIG. 20. The screen 614 allows the user to create a new activity or to view a pre-existing activity.

When the "view activities" option is selected from screen 614 (FIG. 20), an activity list screen is presented to the user. The activity list screen is similar to the list screens described above. Furthermore, the filtering and sorting options are available to the user with respect to the activity listed on the activity list screen. Other options from the activity list screen include creating, copying, editing and deleting activities from the list. These functions are similar to those described above.

Figure 49:
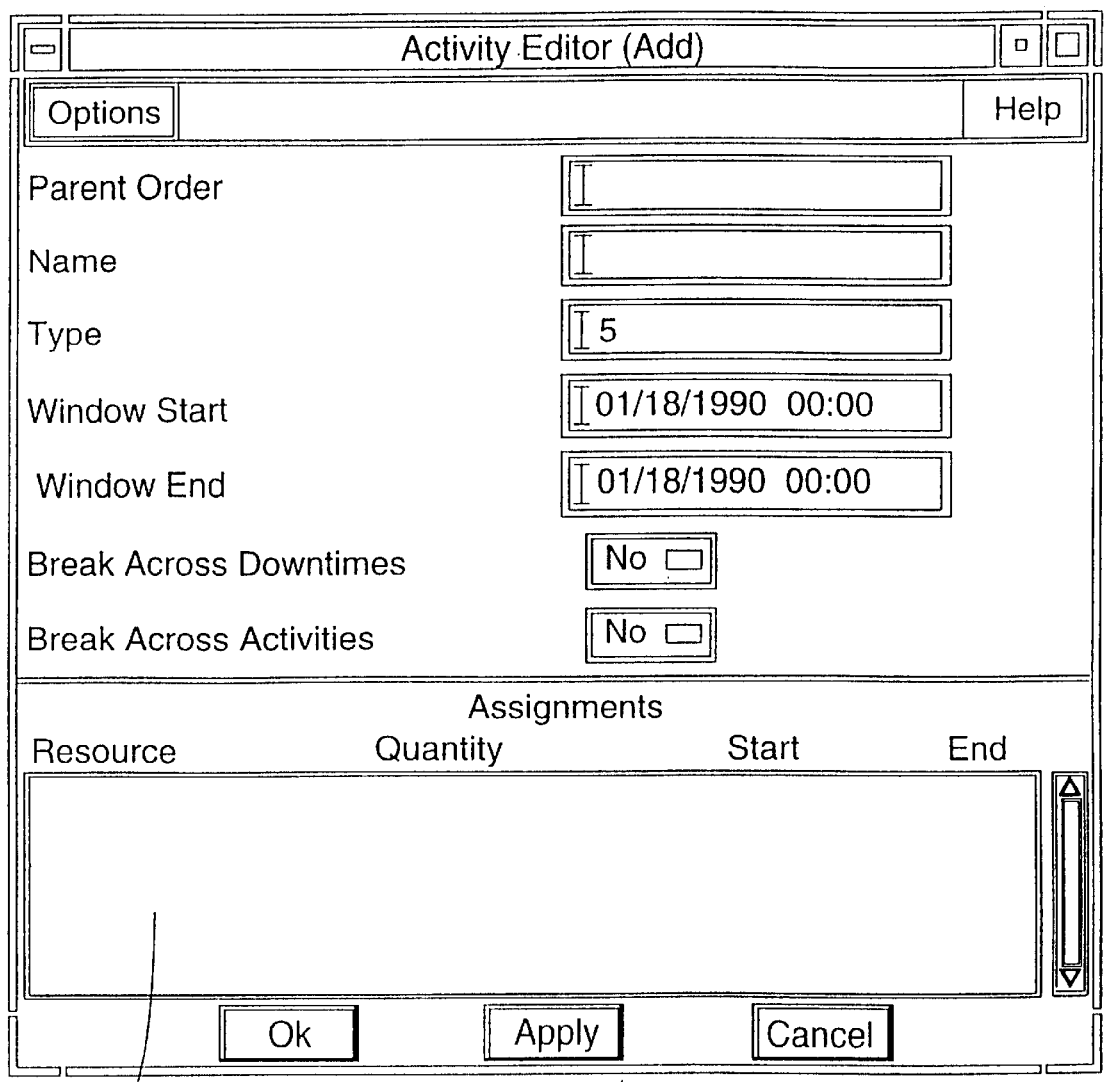
Figure 50:
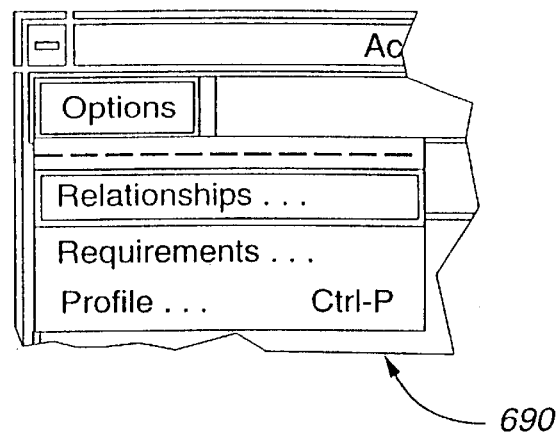

Creating or editing an activity is accomplish through an activity editor screen 686 which is shown in FIG. 49. The activity editor screen 686 presents windows to accommodate the entry of information describing the parent order with which the activity is associated, the name and the type of the activity, and the window start and window end times. Additionally, the user is presented the option of breaking the activity across downtimes and across activities. Furthermore, a window 688 of the screen 686 provides information concerning the assignments of that activity. The assignments involve the resource which will be consumed by the activity, the quantity of that resource which will be consumed, and the start and the end times for consuming the resource.

In the utilization structure, relationships and requirements are associated with each activity. The relationships and the requirements are the lower tier of the utilization structure which describe activities. Options from the activity editor screen 686 allow the selection of relationships, requirements and a profile, as shown by the screen 690 in FIG. 50. Selection of the profile presents a Gantt-like chart illustrating the activity relative to time. The Gantt-like chart available from the profile option is not described because of its conventional nature.

6h.2. Activity Relationships—FIG. 51

Figure 51:
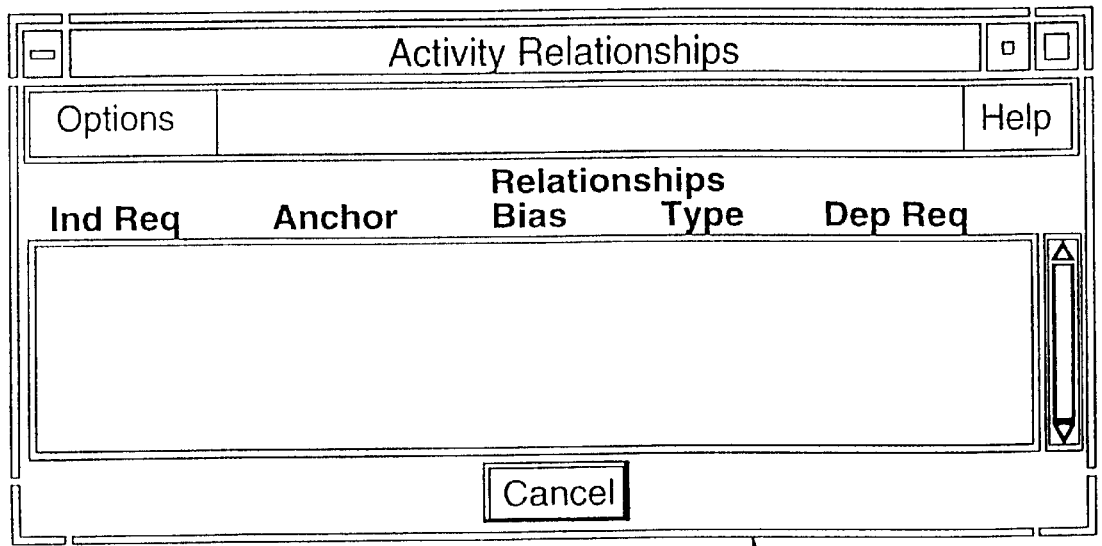
Figure 52:
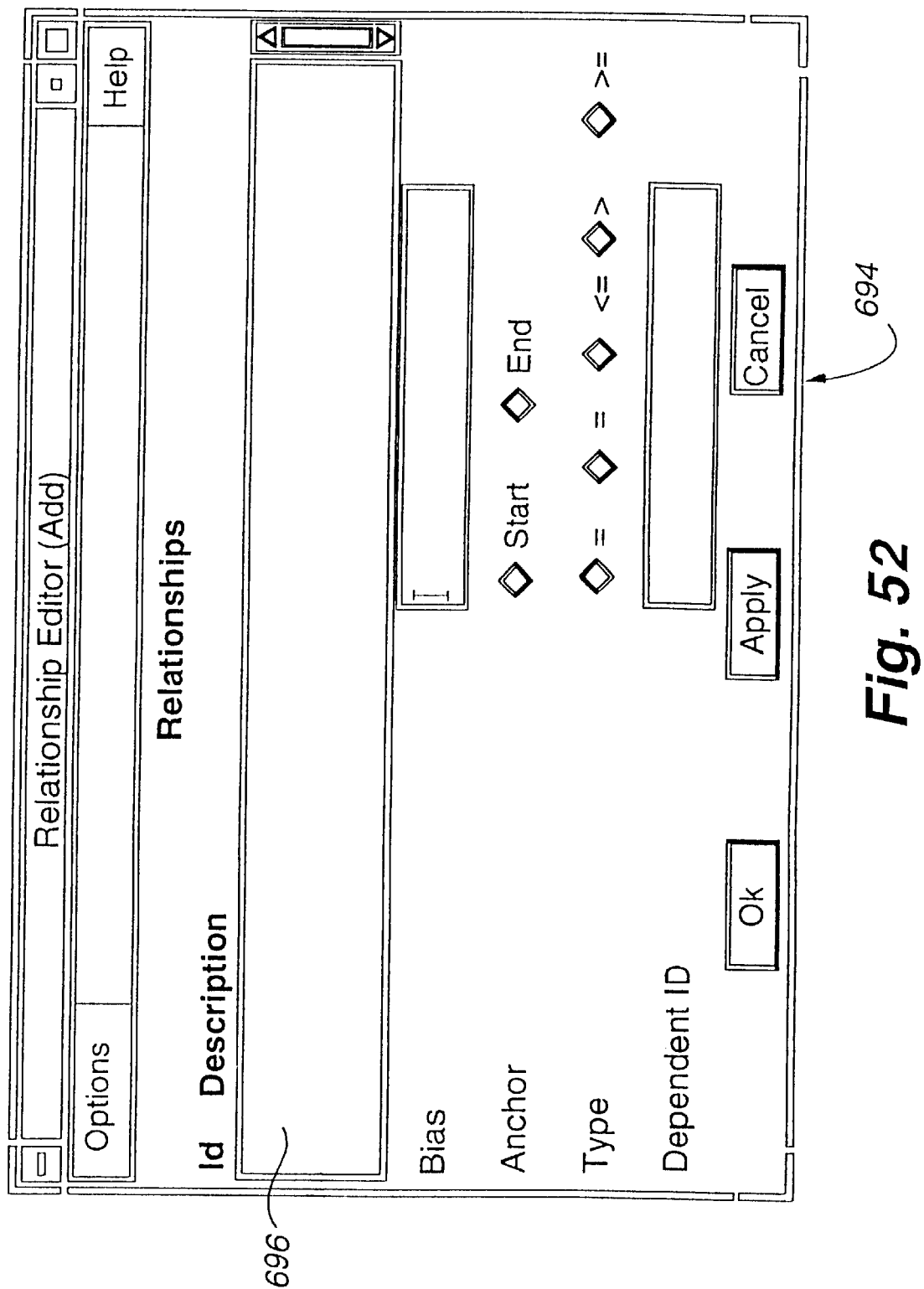

Selection of the relationships option from the screen 690 (FIG. 50) results in the presentation of an activity relationships screen 692 shown in FIG. 51. The activity relationships screen 692 presents a list of relationships which specifies any relative timing relationship between activities.

From the options available from the activity relationships screen 692, the user may create, copy, edit or delete activity relationships. Creating and editing activity relationships presents the user with a relationship editor screen 694 shown in FIG. 52. A window 696 and the screen 694 present each relationship by an identification and by its description. The terms "bias," "anchor," and "type" are used to describe the timing relationship between activities. A "bias" may refer to length of time it takes to perform an activity, "anchor" may refer to the beginning of an activity, and "Dependent ID" is the name of the activity to which the edited/created activity is being related.

6h.3. Activity Requirements

If the user selects a requirement from the screen 690 (FIG. 50), an activity requirements list screen (not shown) is presented. The activity requirements list screen is similar to the other list screens discussed above. Options from the activity requirements list screen are creating, copying, editing and deleting an activity requirement.

6h.3.1. Requirements Editor—FIG. 53

Figure 53:
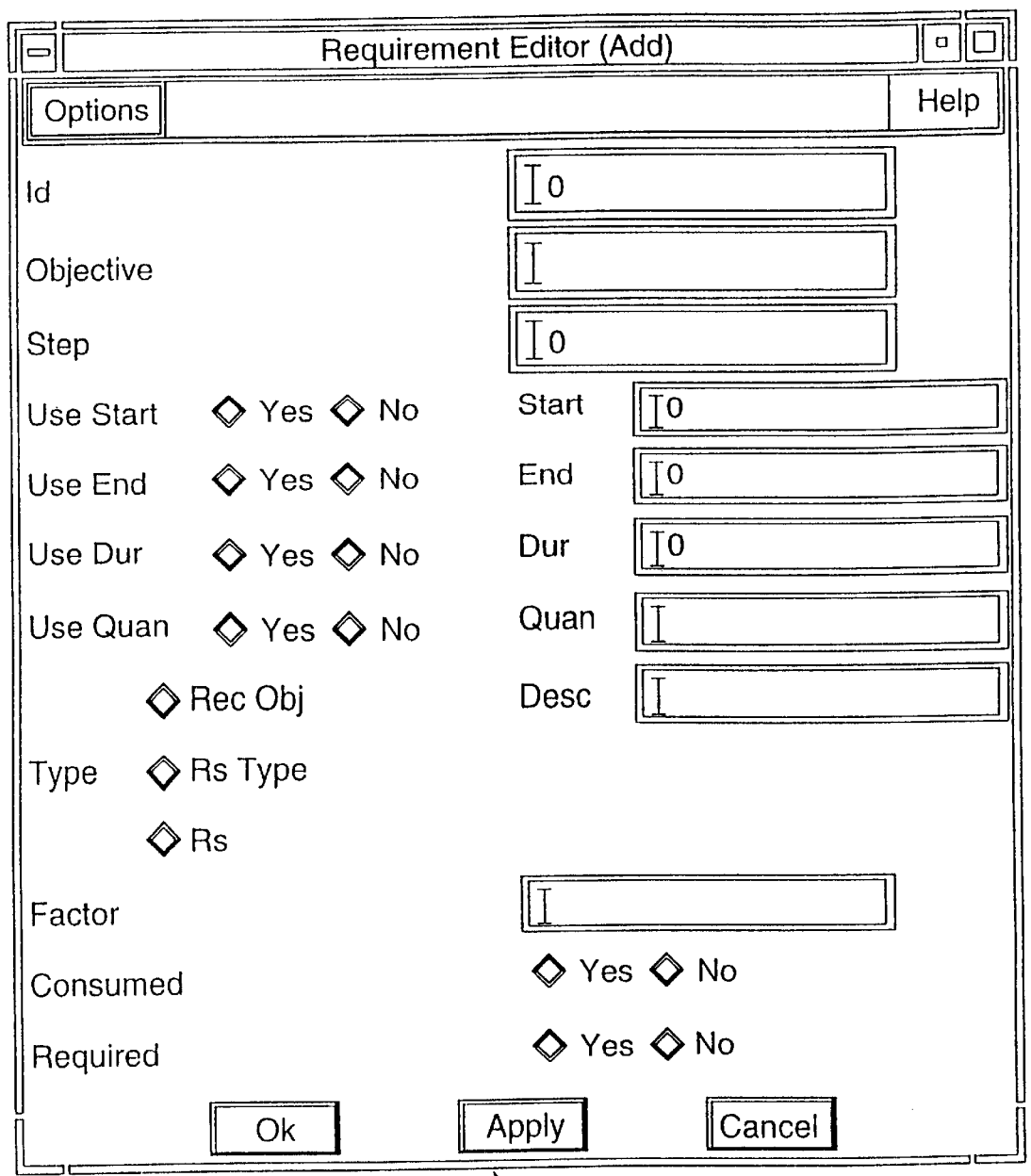

To create or edit an activity requirement, a requirement editor screen 698 is presented as shown in FIG. 53. The requirement editor screen 698 includes windows to add or modify the identification of the requirement, the objective and the step with which the requirement is associated, the start and end times, the duration and quantity of the requirement, a description of the quantity, and a factor. Choices are presented of using the start and end times and using the duration and quantities. Choices of the type of the requirement are also presented. Types of requirements are recursive objective resource type (e.g., sewing machine), and resource (e.g., sewing machine No. 1). The factor associated with the requirement is a multiplier which may be applicable if multiple numbers of a requirement are required to accomplish a step. For example, two sleeves are required to complete a shirt, so a factor of two would be applied. Selections are also available to indicate whether the requirement is consumed or not and required or not.

The GUI screens shown and described in conjunction with FIGS. 13–53 more completely illustrate the types and details of information employed in the program flow shown in FIGS. 1–11. This information is employed by the MS algorithm to accomplish the program flow according to the present invention. One of the additional benefits available from the present invention beyond those associated with the MS algorithm to solve FCP problems is the capability described in Parts 7–8 below.

7. Information Communication Capability

One of the important features of the invention relates to its capability to communicate information between multiple users and to update the status of the information describing the environment, demand and schedule, according to new plans which are scheduled. This is particularly important in the circumstance where multiple users of the system are entering information and scheduling orders. With multiple users, the status of the environment and demand is constantly in a dynamic state, thereby making it difficult or impossible to schedule new demand on a reliable basis.

The feature of the present invention which continually updates the status of the system for all users and keeps all users appraised of changes in the system is referred to as inter-process communications (IPC). IPC is important in obtaining the most effective, reliable and realistic scheduled plans to meet demand. The IPC capability is also very useful to monitor the state of the resources, demand and environment, and to predict events which alter the condition of these factors. The ability to monitor these factors allows the user to anticipate problems and to make adjustments and offer solutions, thereby avoiding problems.

Another advantageous capability of this invention is the ability to accept information from pre-existing files in relational databases typically maintained by a customer. By accessing this information, it is not necessary to establish separate memory files to contain the information necessary to practice this invention, or to enter pre-existing information into files associated only with this invention. The convenience to the user is that its relational database information is preserved and updated according to the use of this invention. The user thereby maintains the accessibility and utility of its relational database and obtains the additional functionality available from this invention without compromising either its MS-FCP capabilities or is relational database capabilities. The feature of this invention which obtains these improvements is referred to below as a relational database schema.

7a. Inter-Process Communications

The inter-process communication capability of the present invention can generally be understood by reference to FIG. 12. The network 516 offers the workstations 512 and 514 the ability to communicate with one another and with the system processor 504 of the main computer system 502. As plans are scheduled, and as the status of the resources and the demands is updated, the updated information is stored in the main system memory 506. This updated information may then be accessed by the other users at the other workstations. This updated information also forms the basis for scheduling additional demands.

The preferred technique for achieving inter-process i communications is through software which provides entities known as object centers. Object centers are data structures in the main system memory 506. A first object center 800 and a last object center 802 are shown in FIG. 12. Although only two object centers are shown, any number could be provided in the main memory 506. The object centers are accessed by the processors 520 and 522 of each workstation 512 and 514 over the network 516. The object centers may also be accessed by the system processor 504. Object centers accept and deliver messages and contain information regarding the status and content of the other object centers. Once any of the desired system information is changed, messages will be sent to the object centers to update the status of the system. An example is of a resource. Its state in time changes as the objective is produced, and its status is therefore updated as the state changes with respect to time.

The advantage of IPC is that there is no necessity for synchronization between the entry of the various demands (orders), the use of the resources, and the scheduling of the demand. IPC allows the relevant information to be continuously updated on a dynamic basis. For example, if a manufacturing machine fails, that information is employed to update all of the plans scheduled which depend upon the broken machine, and to reflect an almost instantaneous change in the state of resources of which the broken machine was previously a part. The IPC capability of the present invention is extremely useful for these and other purposes.

7b. Relational Database Schemas

The lists and other information used by the software of the present invention are preferably organized as tables in data structures. Each table has a row and column characteristic to make the information contained in the table relatively easy to access and edit. A collection of different tables is referred to as a schema in the present invention. In the schema, there will be one table for each of the problem domain entities. Tables will exist for resources, activities, plans, demands, etc. The tables also capture the modeling and are intrinsically coupled to each other.

Because many relational database programs also employ tables to organize and present data, the schemas employed in the present invention are easily mapped to or formulated by the tables of the user's conventional relational databases programs. Each schema can be easily defined by use of the relational database table and populated with information from that table. The present software program therefore easily incorporates the pre-existing user-specific information, and allows that user-specific information to be updated by using the present program.

Two exemplary schemas 804 and 806 are shown in FIG. 12. The schemas 804 and 806 may be specifically dedicated to the present program, or they may be the same tables employed in a separate relational database program. The present invention is easily adaptable to access the existing tables of relational database programs, thereby avoiding the necessity to create schemas specifically for use in this program.

8. Object Oriented Program Framework

The FCP software program provided to a user for a user-specific application is preferably developed using a object-oriented framework. The organization of one such framework 900 for developing user-specific FCP software programs is shown in FIG. 54.

A framework is a structure for developing software programs. Basically the framework consists of groups of subprograms or subroutines for accomplishing certain functions which are related to one another in a manner where the functionality of those subroutines can effectively utilize similarity. Each group of related subroutines is called a class library. The class libraries are related to one another by their application in the overall software program.

By using the class libraries repeatedly for their particular and limited functions, the amount of software code which must be written on an original basis is substantially reduced. Furthermore, since the code for the class libraries can be made essentially free of errors, each reuse of the class library is also relatively free of errors.

Furthermore, a substantial amount of the generic code within the class libraries can be adapted into the user-specific software program without having to write new code to address specific issues. However, in those circumstances where an existing code is not available, a relatively small amount of new code can be written to address the issue or bridge existing functionality available from the class libraries.

Another very important characteristic of a framework is its inheritance. The class libraries within the framework are established in a hierarchical arrangement. Each class library of higher hierarchical position inherits all of the functionality of the class libraries of a lower hierarchical position, and in addition, adds its own new functionality. This inheritance capability is very important in developing complex software, such as FCP software, because of the necessity to assure that all of the important functionality of the various routines are carried forward to all higher level routines. Otherwise, the ability to deal with problems on a consistent basis by reuse of the class libraries is significantly limited.

One of the very important benefits of using a framework for developing user-specific MS—FCP software programs is the flexibility and expressive capability of capturing and utilizing specific information applicable to different businesses. The ability to slightly customize the reliable framework software accommodates the individual distinctions in businesses more accurately and readily. In contrast those MS software programs which are written specifically for user applications require much more time and effort to create and to debug. Furthermore, alterations in the program are also very difficult to make because the alterations must be consistent with the underlying program. By use of the framework, the generic capabilities of the framework may be employed to make alterations in a more convenient and efficient manner.

An example of a framework 900 organized to address FCP problems in general is shown in FIG. 54. The framework 900 is organized into three hierarchies 902, 904 and 906 (horizontal levels). Each hierarchy 902, 904 and 906 is further divided into divisions (vertical columns). The class libraries in each division are correlated with the class libraries in its vertically adjacent hierarchical level to establish the inheritance between the class libraries. The hierarchical levels and inheritance characteristics are effective in efficiently developing software according to the flow charts previously described in conjunction with FIGS. 1–11.

The lowest hierarchical layer 902 of the framework 900 is applicable to solving a variety of different generic computer science programming problems. The class libraries (CL) represented in the lowest layer 902 are a basic class library (BCL), a display class library (DCL), a time line class library (TLCL) and inter-process communication class library (ICL). The BCL is used as the foundation for the basic program functionality. The DCL is employed to create various screen displays for the user of the program, as well as to provide editors for adding information to the system or changing information previously within the system. The TLCL has the infrastructure for creating time lines. The ICL is used to achieve the inter-process communications capability. Preferably the ICL is a conventional program known as Berkeley Sockets.

There is no vertical division of the lowest hierarchical level 902. Therefore, all of the class libraries within the middle and upper hierarchical levels inherit all of the capabilities of the class libraries of the lowest level 902.

The middle hierarchical layer 904 deals with the resource aspects of the present invention. The level 904 is therefore referred to as a resource class library (RCL) layer. The RCL level 904 contains the class libraries which are used to describe the resources contained within the environment. In general, the resource class layer 904 is the modeling for scheduling in general.

The upper hierarchical level 906 deals with the modeling aspect of the present invention. The modeling class library hierarchical level 906 contains the programs to model the components of environment, demand, plan, resource and utilization. The concepts of order, line item, manufacturing and customer are modeled in the level 906.

Since all FCP problems can be addressed with resources, the organization of the resource hierarchical level 904 below the modeling hierarchical level 906 assures a more generic capability to describe resources, while the modeling aspects of the present invention will usually be oriented more in a user specific manner. Thus the modeling class library level 906 inherits the functionality and information from the resource class library level 904 and that of the basic class library level 902.

The specific divisions of the resource hierarchical level 904 and the modeling hierarchical level 906 are similar and are related to the specific functions necessary in the FCP program. The layer 904 includes a resource class library (RCL) which describes the resources. The layer 906 includes a modeling class library (MCL) which describes the scheduling model. The other components or divisions of the RCL and MCL layers 904 and 906 are similar, but focused on the resources and the modeling aspects of their respective hierarchical levels. The functionality of the RCL and MCL is primarily embodied in the concepts shown in FIG. 11.

The scheduling capabilities of the FCP program are achieved through a scheduling resource class library (SRCL) and a scheduling modeling class library (SMCL). The SMCL has the capability to schedule activities and orders on resources, for example. The functionality of the SRCL and SMCL is primarily embodied in the concepts shown in FIGS. 6A, 6B, 7, 8, 9, 10 and 11.

The display capability of the FCP program is obtained through a display resource class library (DRCL). The DRCL offers the capability to present screen displays of the resource information. A display modeling class library DMCL offers the capability to present screen displays of the modeling information. The DRCL includes the plan editor and the environment editor, previously described in conjunction with FIGS. 1 and 5, as well as the actual editors for the plan, environment, demand and resource activity. The functionality of the DRCL and DMCL is primarily embodied in the concepts shown in FIGS. 1 and 5.

Persistent storage of resource and modeling information is obtained from the persistence resource (PRCL) and persistence modeling (PMCL) class libraries, respectively. Persistence generally relates to the divisions of the plan, demand, activities and resources. The functionality of the PRCL and PMCL is primarily embodied in the concepts shown in FIGS. 1, 2, 4, 5, 6B and 10.

Inter-process communications concerning resources and modeling information is obtained through a resource inter-process communication class library (IRCL) and a inter-process modeling communication class library (IMCL). The functionality of the IRCL and IMCL is primarily embodied in the concepts shown in FIGS. 1, 4 and 6B.

A generic resource class library (GRCL) and a generic modeling class library (GMCL) both contain basic display programs. The GRCL and GMCL are used in conjunction with the basic display class library (DCL) to provide specific displays for resources and for modeling. The concepts of the GRCL and the GMCL are not specifically embodied in any of the previous flow charts shown in FIGS. 1–11.

Application specific information is dealt with in an application resource class library (ARCL) and an application manufacturing class library (AMCL). The ARCL and the AMCL are oriented for accommodating the information specific to a particular users business. The functionality of the ARCL and AMCL is primarily embodied in the concepts shown in FIGS. 3, 4 and 5.

A file resource class library (FRCL) and a file modeling class library (FMCL) are employed primarily for the purpose of checking the functionality of the FCP program. The FRCL and the FMCL contain test drivers for evaluating the configuration of files within the resource class layer 904 and the modeling class layer 906, respectively. The concepts of the FRCL and FMCL are not specifically shown in the flow chart of FIGS. 1–11.

A presently preferred embodiment of the present invention and many of its improvements have been described with a degree of particularity. This description is a preferred example of implementing the invention, and is not necessarily intended to limit the scope of the invention. The scope of the invention is defined by the following claims.

The invention claimed is:

1. A computer-implemented method for deriving a desired plan for scheduling a use of available resources to satisfy one or more demands for goods or services, said method comprising:

describing an environment which models the available resources and alternative ways to utilize said resources to reach objectives;

defining each of the demands as one or more orders where each of the orders has one or more line items;

scheduling the demands according to a set of possible plans based upon the environment; and evaluating each possible plan of said set of possible plans for purpose of either (a) accepting the possible plan being evaluated because it is desired to be implemented, or (b) rejecting the possible plan being evaluated.

2. The method of claim 1 wherein said step of describing an environment further comprises:

describing each of the available resources and a capacity of each of the available resources; and describing a utilization structure which describes the use and limitations on use of substantially all of the available resources.

3. The method of claim 2 wherein the step of describing an environment further comprises describing one or more customers associated with the demands.

4. The method of claim 2 wherein the step of describing a utilization structure further comprises describing the utilization structure in terms of an objective having one or more sequences having one or more operations having one or more steps, where each step may be associated with relationships and with requirements.

5. A method according to claim 1 wherein the step of scheduling the demands further comprises the steps of:

associating the plan with the environment and the demand; and selecting which of the one or more orders to schedule; and scheduling the selected orders.

6. A method according to claim 5 wherein the step of scheduling the demands further comprises, for each selected order, the steps of:

creating activity lists for one or more sequences, each sequence having one or more operations and each operation having one or more steps, where each step may be associated with one or more relationship and with one or more requirements;

creating opportunities for each line item of the selected orders, each opportunity having associated with it one or more activities;

selecting opportunities;

scheduling the activities associated with the selected opportunities;

verifying each selected opportunity for which the associated activities were successfully scheduled; and correlating each of the activities of the verified selected opportunities to the selected order.

7. The method according to claim 6 wherein the step of creating activity lists further comprises:

selecting a sequence from the one or more sequences;

selecting one or more of the operations of the selected sequence;

selecting one or more of the steps of the selected operations;

creating an activity based upon the selected steps, the activity having one or more requirements associated therewith and the one or more requirements each having a resource associated therewith;

selecting relevant requirements from said associated requirements;

adding the selected requirements to the created activity;

selecting one or more relationships; and adding the selected relationships to the created activity.

8. The method of claim 6 wherein the step of creating opportunities comprises:

selecting one of the activity lists;

selecting an activity from the selected activity list;

creating an opportunity for the selected activity; and adding the created opportunity to the line item.

9. The method according to claim 6 wherein the step of scheduling activities comprises:

selecting a requirement from the one or more requirements associated with one of the activities associated with the selected opportunities;

creating the resource associated with the selected requirement, said resource having an availability state;

determining how to allocate the created resource to an activity associated with the selected opportunities;

updating the availability state of the created resource; and adding the created resource to the determined activity.

10. The method according to claim 1 wherein the step of defining demands comprises:

selecting a demand where the demand may be chosen from a one or more default plans or a new demand may be created and selected; and creating one or more orders specifying the selected demand, each of the one or more orders having one or more line items.

11. The method according to claim 1 wherein the step of evaluating the plan comprises:

inspecting the relationship between the selected plan and each of the demand and the resources, including what resources will be used in executing the plan;

determining whether the demand is adequately satisfied;

comparing the demand to the resources which will be used in executing the plan; and determining whether the plan is satisfactory based in part on results of one or more of said steps of inspecting the relationships, determining whether demand is satisfied, and comparing the demand to the resources.

12. A computer program product having a computer readable medium having computer readable code recorded thereon for solving finite capacity problems in a variety of different environments, said computer readable code comprising:

first receiving means for receiving information about available resources;

second receiving means for receiving information about demands;

modeling means for modeling an environment based upon (a) said information about said available resources and (b) said information about said demands, said environment describing alternative ways to utilize said resources to reach objectives;

defining means for defining said demands as one or more orders where each of said orders has one or more line items;

scheduling means for scheduling the demands according to a set of possible plans based upon said environment; and evaluating means for evaluating each possible plan of said set of possible plans for the purpose of either (a) accepting said possible plan being evaluated because it is desired to be implemented, or (b) rejecting said possible plan being evaluated.

13. The computer program product of claim 12 further comprising:

object centers having (a) means for updating and storing said information about available resources and (b) means for updating and storing said information about demands; and means for updating said plan responsive to updating said information about available resources and said information about demands.

14. The computer program product of claim 13 wherein:

said means for updating and storing said information about available resources comprises one or more schema, each schema having one or more tables where each table comprises one or more rows and one or more columns, and wherein the intersection of one of said one or more rows and one of said one or more columns forms a data cell capable of storing some of said information about available resources; and said means for updating and storing said information about demand comprises one or more schema, each schema having one or more tables where each table comprises one or more rows and one or more columns, and wherein an intersection of one of said one or more rows and one of said one or more columns forms a data cell capable of storing some of said information about demand.

15. The computer program product of claim 12 further comprising:

a framework having plural class libraries hierarchically arranged with respect to each of said other plural class libraries such that a first class library hierarchically adjacent to a second class library is with respect to said second class library one of the group of a parent, a sibling, or an offspring;

wherein each class library comprises one or more routines, each routine having a functionality; and wherein each class library inherits said functionalities of each offspring class library.

16. A computer-implemented method for deriving at least one plan for scheduling a use of available resources to satisfy one or more demands for goods or services, said method comprising:

a step for describing an environment, said environment modeling the available resources;

a step for defining each of the demands as one or more orders where each of the orders has one or more line items;

a step for scheduling the demands based upon the environment according to a possible plan; and a step for evaluating the possible plan for purpose of either (a) accepting the possible plan, or (b) rejecting the possible plan and initiating steps for creating a new plan.

17. The method according to claim 16, wherein said environment comprises:

a description of each of the available resources and a capacity of each of the available resources; and a description of a utilization structure which defines the use and limitations on use of substantially all of the available resources.

18. The method according to claim 16, wherein demand may be chosen from a one or more default plans or a new demand may be created and selected; and wherein said demand comprise one or more orders having one or more line items.

19. The method according to claim 16, wherein the steps for describing, defining, scheduling and evaluating are repeated for a given demand until said possible plan is accepted.

* * * * *